US012319084B2

(12) United States Patent
Little et al.

(10) Patent No.: US 12,319,084 B2
(45) Date of Patent: Jun. 3, 2025

(54) AUTOMATED GREETING CARD CONVEYANCE SYSTEM

(71) Applicant: HALLMARK CARDS, INCORPORATED, Kansas City, MO (US)

(72) Inventors: Gerald Little, Kansas City, MO (US); David Lewis, Kansas City, MO (US); Wesley Lindquist, Kansas City, MO (US); Jennifer Garbos, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 121 days.

(21) Appl. No.: 18/213,913

(22) Filed: Jun. 26, 2023

(65) Prior Publication Data

US 2023/0331015 A1 Oct. 19, 2023

Related U.S. Application Data

(63) Continuation of application No. PCT/US2021/065365, filed on Dec. 28, 2021.

(Continued)

(51) Int. Cl.
*B43M 3/00* (2006.01)
*B41M 3/00* (2006.01)

(Continued)

(52) U.S. Cl.
CPC ............ *B43M 3/045* (2013.01); *B41M 3/005* (2013.01); *B43M 5/042* (2013.01); *B65H 5/021* (2013.01);

(Continued)

(58) Field of Classification Search
CPC .......... G03G 2215/00717; B31M 3/00; B31M 3/008; B41F 19/00; B42D 15/04;

(Continued)

(56) References Cited

U.S. PATENT DOCUMENTS 2,625,392 A 1/1953 Morrison
3,858,381 A * 1/1975 Huber .................... B43M 3/045 53/284.3

(Continued)

FOREIGN PATENT DOCUMENTS

CN 110092234 A 8/2019
CN 111391538 A 7/2020

(Continued)

OTHER PUBLICATIONS

International Search Report and Written Opinion dated May 5, 2022 for related PCT Application, PCT/US2021/065365.

*Primary Examiner* — Leslie A Nicholson, III
(74) *Attorney, Agent, or Firm* — Stinson LLP

(57) ABSTRACT

An automated greeting card conveyance system is disclosed that includes a first conveyor configured to transport pre-decorated greeting cards along a first conveyance path and a second conveyor configured to transport envelopes along a second conveyance path. A control system controls customization of each greeting card and envelope by (a) determining a card identifier of the greeting card, (b) identifying customized content associated with an order for the greeting card having the card identifier, and (c) causing the customized content to be printed on the greeting card and envelope. A coupling system may also be used to automatically insert the greeting card into the envelope. In addition, a sealing system may be used to automatically seal envelope having a pointed envelope flap.

30 Claims, 41 Drawing Sheets

Related U.S. Application Data

(60) Provisional application No. 63/131,006, filed on Dec. 28, 2020, provisional application No. 63/130,994, filed on Dec. 28, 2020, provisional application No. 63/131,012, filed on Dec. 28, 2020.

(51) Int. Cl.

| | |
|---|---|
| ***B43M 3/04*** | (2006.01) |
| ***B43M 5/04*** | (2006.01) |
| ***B65H 5/02*** | (2006.01) |
| ***B65H 9/04*** | (2006.01) |
| ***B65H 43/00*** | (2006.01) |

(52) U.S. Cl.
CPC ............... *B65H 9/04* (2013.01); *B65H 43/00* (2013.01); *B65H 2301/45* (2013.01); *B65H 2301/5142* (2013.01); *B65H 2511/10* (2013.01); *B65H 2511/23* (2013.01); *B65H 2553/82* (2013.01); *B65H 2701/1916* (2013.01)

(58) Field of Classification Search
CPC .. B42D 15/042; B65H 5/30; B65H 2301/453; B65H 2511/512
USPC ............ 101/473; 283/117; 270/52.02, 58.27, 270/58.07, 52.23, 52.19, 58.06
See application file for complete search history.

(56) References Cited

U.S. PATENT DOCUMENTS

| | | | | |
|---|---|---|---|---|
| 4,817,368 | A | | 4/1989 | DePasquale et al. |
| 5,036,472 | A | | 7/1991 | Buckley et al. |
| 5,552,994 | A | | 9/1996 | Cannon et al. |
| 5,555,496 | A | * | 9/1996 | Tackbary ........... G06Q 30/0641 705/26.81 |
| 5,561,963 | A | * | 10/1996 | Sytema .................... B43M 3/04 53/493 |
| 5,618,375 | A | * | 4/1997 | Suzuki ................... B43M 5/042 53/284.3 |
| 5,772,194 | A | | 6/1998 | Huebler et al. |
| 5,950,399 | A | * | 9/1999 | Viens ..................... B43M 5/042 53/284.3 |
| 5,960,412 | A | | 9/1999 | Tackbary et al. |
| 5,993,048 | A | | 11/1999 | Banks et al. |
| 7,370,076 | B2 | * | 5/2008 | Friedman ................ G07F 17/26 709/217 |
| 8,028,982 | B2 | * | 10/2011 | Gorp ................ G07B 17/00467 705/401 |
| 2001/0022064 | A1 | | 9/2001 | Hidding et al. |
| 2004/0205138 | A1 | | 10/2004 | Friedman et al. |
| 2005/0189691 | A1 | | 9/2005 | Sonnack et al. |
| 2010/0152009 | A1 | | 6/2010 | Edel |
| 2011/0257780 | A1 | | 10/2011 | Cosgrove |
| 2014/0312564 | A1 | | 10/2014 | Kudrus |
| 2016/0162966 | A1 | | 6/2016 | Naficy et al. |

FOREIGN PATENT DOCUMENTS

| | | | |
|---|---|---|---|
| DE | 198 11 131 | B4 | 11/2004 |
| GB | 2335421 | A | 9/1999 |

* cited by examiner

AUTOMATED GREETING CARD CONVEYANCE SYSTEM

CROSS-REFERENCE TO RELATED APPLICATIONS

This application claims priority to and is a continuation of International Patent Application No. PCT/US2021/065365, filed on Dec. 28, 2021, which is based on and claims priority to U.S. Provisional Application Ser. No. 63/130,994, filed on Dec. 28, 2020, U.S. Provisional Application Ser. No. 63/131,006, filed on Dec. 28, 2020, and U.S. Provisional Application Ser. No. 63/131,012, filed on Dec. 28, 2020, each of which is incorporated herein by reference in its entirety.

BACKGROUND OF THE INVENTION

1. Field of the Invention

The present disclosure is generally related to greeting cards and, more particularly, to an automated greeting card conveyance system for printing customized content on pre-decorated greeting cards and envelopes, coupling greeting cards and envelopes of varying sizes, and sealing envelopes having a pointed envelope flap.

2. Description of Related Art

A variety of different types of systems are used to print customized content on greeting cards. For example, print-on-demand systems are used to print customized content on a single greeting card (i.e., the cards are printed one at a time) and, thus, these systems are not suitable for applications that require the printing of multiple greeting cards during a mass print run. Also, bulk order printing systems are used to print the same customized content on cardstock blanks to generate a plurality of the same greeting card during a print run. While the capabilities of these conventional systems are sufficient for certain printing applications, there is a need for a greeting card customization system that is not limited to printing a single greeting card or a plurality of the same greeting card. Also, while certain conventional systems enable greeting cards to be inserted into corresponding envelopes and sealed during a print run, those systems do not accommodate greeting cards and envelopes of varying sizes and are only able to seal straight flap envelopes.

BRIEF SUMMARY OF THE INVENTION

The present invention is generally directed to an automated greeting card conveyance system that enables the printing of customized content on a plurality of pre-decorated greeting cards and their corresponding envelopes, the coupling of greeting cards and envelopes of varying sizes, and/or the sealing of envelopes having a pointed envelope flap. Embodiments of the invention may include a conveyor component for transporting individual greeting cards and envelopes along separate conveyance paths. Embodiments of the invention may also include a greeting card identification component, a card opening component, a customized printing component, a validation component, and a card closing component, which are configured to automatically print customized content on each greeting card and envelope during transport the conveyance paths. Embodiments of the invention may further include a card and envelope coupling component, as well as an envelope sealing component.

Various combinations of these components may be used within the scope of the present invention.

An automated greeting card customization system in accordance with one embodiment of the invention described herein comprises a conveyor configured to transport a series of pre-decorated greeting cards along a conveyance path. The system also comprises a reading device configured to read at least a portion of each greeting card during transport along the conveyance path, and a printer configured to print content on each greeting card during transport along the conveyance path. The system further comprises a control system in communication with the reading device and the printer, wherein the control system is configured to control customization of each greeting card by (a) determining a card identifier of the greeting card based on information received from the reading device, (b) identifying customized card content associated with an order for the greeting card having the card identifier, and (c) transmitting information to the printer to cause the customized card content to be printed on the greeting card.

An automated greeting card and envelope coupling system in accordance with another embodiment of the invention described herein comprises a first conveyor configured to transport a series of greeting cards along a first conveyance path and a second conveyor configured to transport a series of envelopes along a second conveyance path. The greeting cards include a first greeting card having a first set of card dimensions and a second greeting card having a second set of card dimensions, wherein the first set of card dimensions is different from the second set of card dimensions. Similarly, the envelopes include a first envelope having a first set of envelope dimensions and a second envelope having a second set of envelope dimensions, wherein the first set of envelope dimensions is different from the second set of envelope dimensions. The system further comprises a coupling system configured to insert each one of the greeting cards into a corresponding one of the envelopes during transport along the first and second conveyance paths, respectively.

An automated envelope sealing system in accordance with another embodiment of the invention described herein comprises a conveyor configured to transport a series of envelopes along a conveyance path. Each of the envelopes comprises a front face and a back with a pointed envelope flap that is foldable along a fold line. The system also comprises a sealing system configured to seal each of the envelopes by securing the pointed envelope flap in a closed position during transport along the conveyance path.

Various other embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

A detailed description of various exemplary embodiments of the present invention is provided below with reference to the following drawings, in which.

Figure 1:
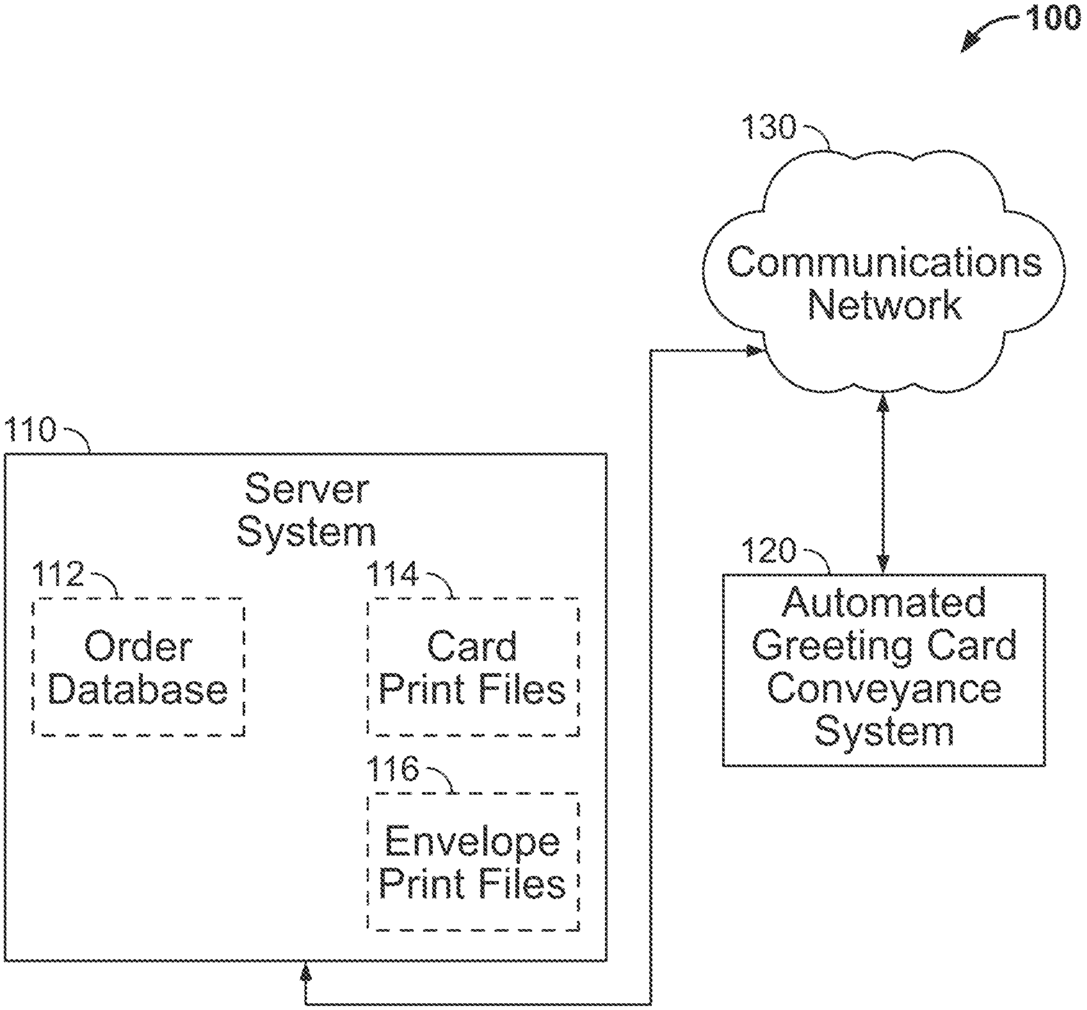
FIG. 1 depicts a block diagram of a system for processing greeting cards and their corresponding envelopes in accordance with one embodiment of the invention.

It should be understood that the components in the drawings are not necessarily to scale and some components may be omitted so as to clearly illustrate certain features of the exemplary embodiments. Further, like reference numerals designate corresponding parts throughout the several views in the drawings.

DETAILED DESCRIPTION OF EXEMPLARY EMBODIMENTS

The present invention is directed to an automated greeting card conveyance system for printing customized content on a plurality of pre-decorated greeting cards and their corresponding envelopes, coupling greeting cards and envelopes of varying sizes, and/or sealing envelopes having a pointed envelope flap. While the invention will be described in detail below with reference to various exemplary embodiments, it should be understood that the invention is not limited to the specific system configurations or processes of these embodiments. In addition, although the exemplary embodiments are described as embodying several different inventive features, one skilled in the art will appreciate that any one of these features could be implemented without the others in accordance with the invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

In some embodiments, the system provides a customization feature that enables the printing of customized content on a plurality of pre-decorated greeting cards and corresponding envelopes—i.e., the same greeting card/envelope pairs that are generally available for purchase at a retail location. In one embodiment, the customized card and envelope content and/or the customization areas for placement of the customized card and envelope content on the greeting card and envelope, respectively, are input or otherwise provided by a user. In another embodiment, the customized card and envelope content and/or the customization areas for placement of the customized card and envelope content on the greeting card and envelope, respectively, are generated or received by the system itself. Various combinations of the foregoing are also possible, such as an embodiment in which (i) the customized card and envelope content are input or otherwise provided by a user and (ii) the customization areas for placement of the customized card and envelope content on the greeting card and envelope, respectively, are generated or received by the system itself. Of course, other embodiments will be apparent to one skilled in the art.

In some embodiments, the system provides a coupling feature that enables the coupling of greeting cards/envelope pairs of varying sizes. In one embodiment, the coupled greeting cards and envelopes comprise pre-decorated greeting cards and blank envelopes of varying sizes in which both the greeting cards and envelopes are customized as described above, i.e., the coupling feature is used in combination with the customization feature in this embodiment. Other types of greeting cards may be used in other embodiments. For example, in one embodiment, the greeting cards comprise cardstock blanks in which all of the content is printed by the system. In another embodiment, the greeting cards comprise pre-decorated greeting cards that are not customized by the system. In another embodiment, the greeting cards comprise pre-decorated greeting cards that are unfolded, whereby the system is configured to fold each card or fold and glue each card (e.g., fold a first panel in relation to a second panel and then glue the first panel to the second panel), dependent on the card type. Of course, other embodiments will be apparent to one skilled in the art.

In some embodiments, the system includes a sealing feature that enables the sealing of envelopes having a pointed envelope flap (although envelopes having a straight flap may be used in other embodiments, as described herein). In one embodiment, each of the envelopes corresponds to a pre-decorated greeting card in which both the greeting card and envelope are customized and coupled as described above, i.e., the sealing feature is used in combination with the customization and coupling features in this embodiment. In other embodiments, other types of greeting cards are used, as described above, including those that do not require customization. In yet other embodiments, one size envelope is used for greeting cards of varying sizes. Of course, other embodiments will be apparent to one skilled in the art.

It should be understood that the present invention encompasses systems that include any one or combination of the customization, coupling and sealing features described herein. Specifically, the system may include (1) only the customization feature, (2) only the coupling feature, (3) only the sealing feature, (4) the customization and coupling features (but not the sealing feature), (5) the customization and sealing features (but not the coupling feature), (6) the coupling and sealing features (but not the customization feature), or (7) the customization, coupling, and sealing features. Thus, systems that include one, two, or all three of the customization, coupling, and sealing features may be provided within the scope of the present invention.

General System Configuration

Referring to FIG. 1, one embodiment of a system that includes all three of the customization, coupling, and sealing features in accordance with the present invention is shown generally as reference number 100. System 100 includes a server system 110 that communicates with an automated greeting card conveyance system 120 (shown in greater detail in FIG. 2) via a communications network 130.

Server system 110 is configured to maintain an order database 112 that stores a plurality of order records each of which is associated with an order for a pre-decorated greeting card and corresponding envelope with customized content printed thereon. The data elements for each order record may include a variety of different types of information, such as: (1) an order identifier; (2) information submitted by the user (e.g., customer information, billing information, shipping information, etc.); (3) known characteristics of the pre-decorated greeting card and envelope (e.g., the universal product code (UPC) of the card, the dimensions (length, width, and depth) of the card, the dimensions (length, width, and depth) of the envelope, the location of the card and envelope at a storage location, etc.); (4) postage information (e.g., the required postage or an indication of additional postage, a unique postage code, etc.) and (5) information related to printing the customized content on the pre-decorated greeting card and envelope (e.g., the file name of the card print file, the file name of the envelope print file, the status of the order, etc.). Of course, other data elements may also be stored in order database 112 in accordance with the invention.

As used herein, "pre-decorated greeting card" means a greeting card that includes text, images, graphics, design elements or other decorative features pre-printed on and/or secured to one or more panels of the greeting card. In this embodiment, each of the pre-decorated greeting cards comprises a greeting card that is available for purchase at a retail location (wherein the purchaser will typically hand-write a personalized message on the greeting card and optionally mail the greeting card to a desired card recipient in the corresponding envelope).

Figure 3A:
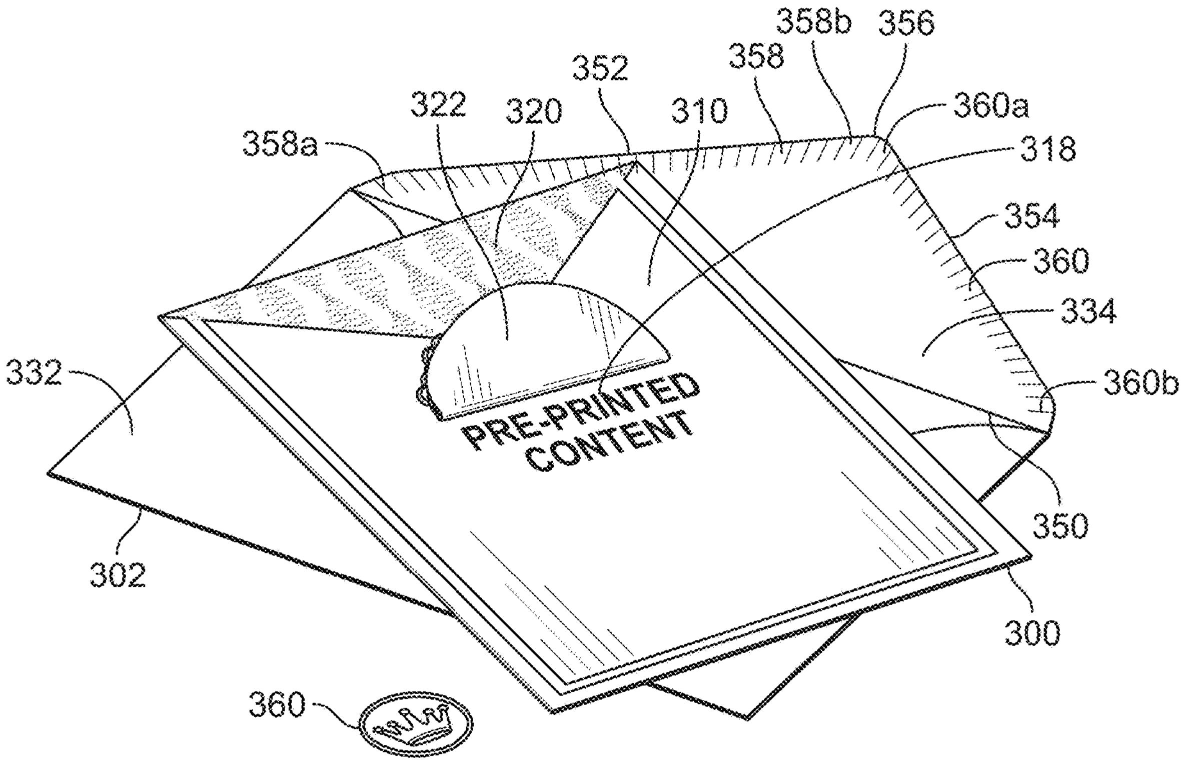
FIGS. 3A-3E depict an exemplary pre-decorated greeting card and corresponding envelope that may be customized by the system of FIG. 1, wherein the greeting card includes a front panel (FIG. 3A), left and right inside panels (FIG. 3B), and a back panel (FIG. 3C), and may be inserted into a corresponding envelope (FIGS. 3D and 3E)
Figure 3B:
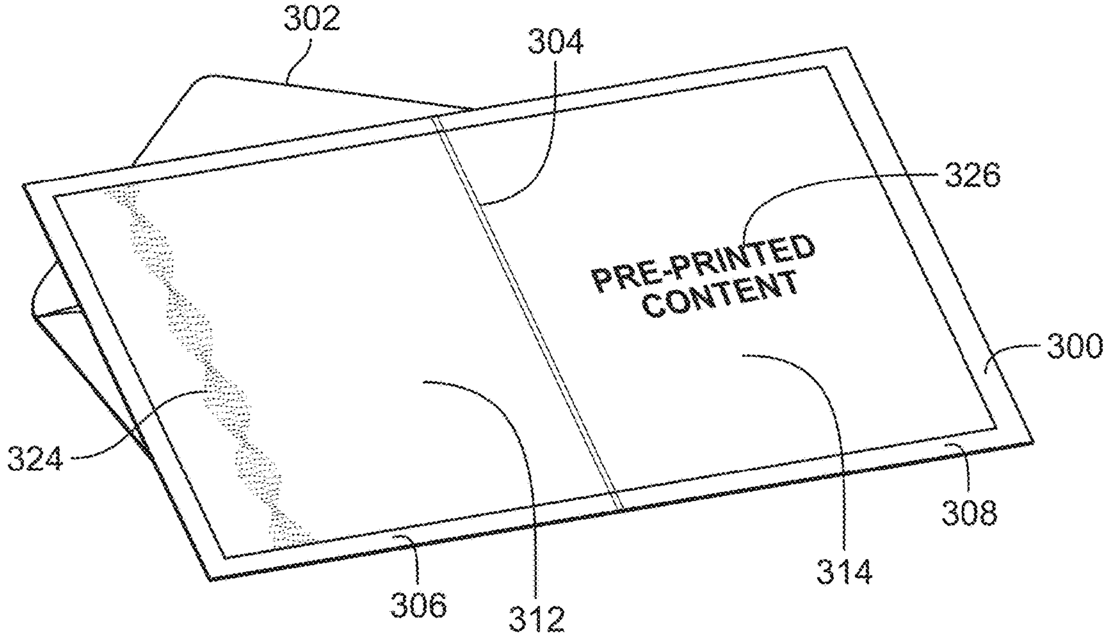

FIGS. 3A-3E depict an exemplary pre-decorated greeting card 300 and corresponding envelope 302 that may be customized in accordance with the present invention. Greeting card 300 is made of cardstock that has been folded along a fold line 304 to form a first card page 306 and a second card page 308, as shown in FIG. 3B. It should be understood that first card page 306 comprises the cover of the greeting card that can be opened relative to second card page 308. In this embodiment, greeting card 300 includes four panels, including a front panel 310, a left inside panel 312, a right inside panel 314, and a back panel 316.

Figure 3C:
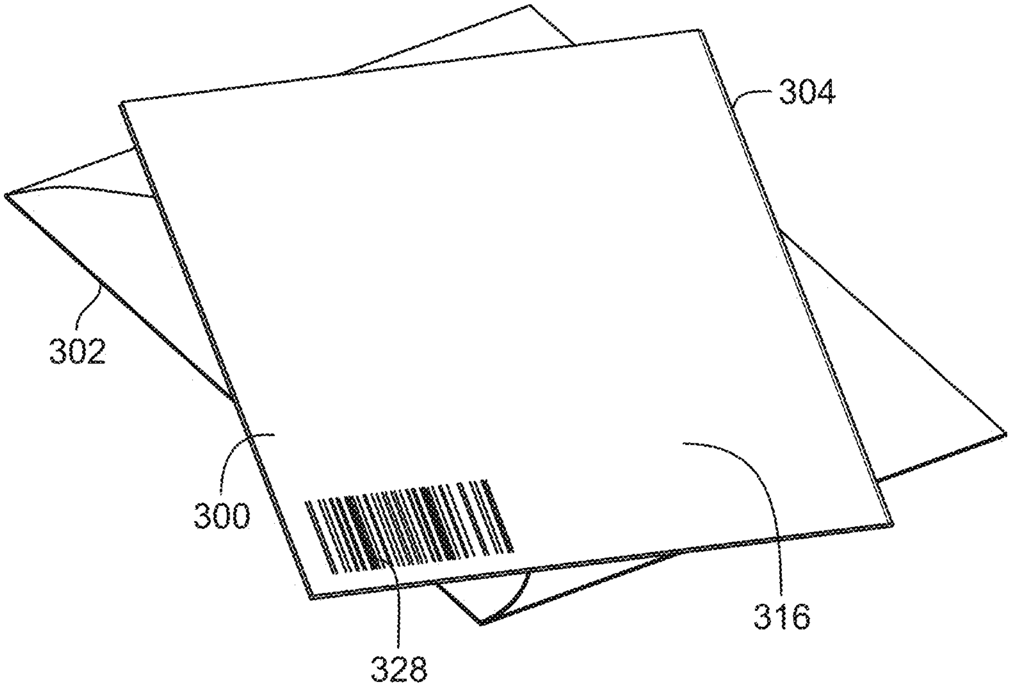

As shown in FIG. 3A, front panel 310 includes pre-printed text 318 (i.e., "Just in Queso You Didn't Know You're Amazing") positioned below pre-printed graphics 320, as well as a decorative feature 322 (i.e., a die-cut cardboard taco attachment with a glossy finish and foil accents) secured to front panel 310. As shown in FIG. 3B, left inside panel 312 includes pre-printed graphics 324, and right inside panel 314 includes pre-printed text 326 (i.e., "And You Deserve Everything Awesome Coming Your Way"). As shown in FIG. 3C, back panel 316 includes a one-dimensional barcode 328 that encodes different types of information, including the universal product code (UPC) of greeting card 300, the price of greeting card 300, and other card and envelope information. Back panel 316 may also include pre-printed text (not shown), such as the name of the company that manufactured the greeting card, their logo, and notice of copyright. It will be seen that automated greeting card conveyance system 120 is configured to print customized card content within a customization area on at least one of the card panels (referred to herein as the "customization panel" of the greeting card), such as right inside panel 314 of greeting card 300.

Figure 3D:
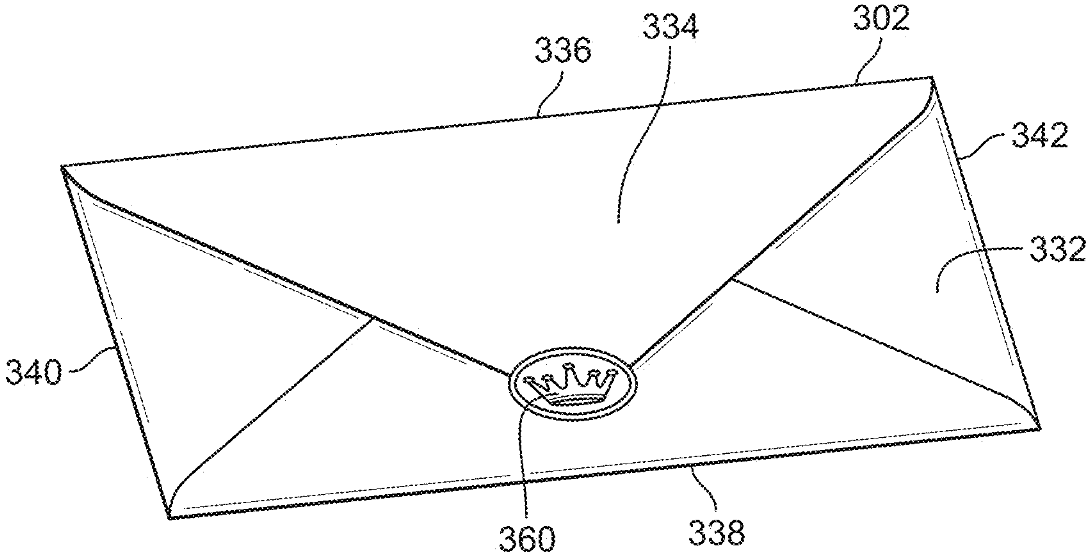
Figure 3E:
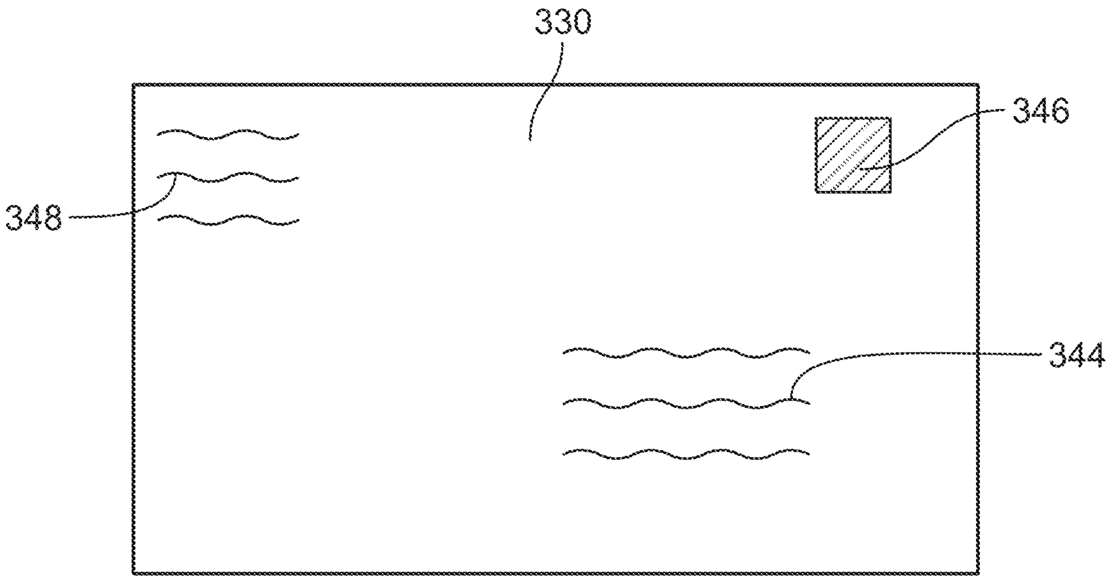

With reference to FIGS. 3D and 3E, envelope 302 includes a front face 330 and a back 332 with a pointed envelope flap 334. Front face 330 is defined by a top edge 336, a bottom edge 338, and two side edges 340 and 342. The dimensions of greeting card 300 are slightly less than those of envelope 302 to enable greeting card 300 to be inserted into envelope 302. It can be appreciated that the card recipient's address 344, postage 346, and optionally the card sender's return address 348 may be provided on front face 330. It will be seen that automated greeting card conveyance system 120 is configured to print customized envelope content on front face 330 of envelope 302 (referred to herein as the "customization panel" of the envelope).

As best shown in FIG. 3A, pointed envelope flap 334 is foldable relative to back 332 along a fold line 350. In this example, envelope flap 334 has a shape that is generally triangular and includes a first side 352, a second side 354, and a third side comprising fold line 350. It can be seen that first and second sides 352 and 354 intersect at the point 356 of envelope flap 334. A first adhesive strip 358 is positioned along first side 352 of envelope flap 334 and, similarly, a second adhesive strip 360 is positioned along second side 354 of envelope flap 334. Each of first and second adhesive strips 358 and 360 is made of a water-soluble adhesive material that may be moistened, and then envelope flap 334 is folded so that the moistened water-soluble adhesive material contacts the back 332 of envelope 302 to thereby secure envelope flap 334 in a closed position. Referring to FIG. 3D, a seal 360 may be placed on point 356 of envelope flap 334, as shown. Of course, other types of envelopes may also be used, including those with a straight flap, in accordance with the present invention.

It can be appreciated that pre-decorated greeting card 300 and its corresponding envelope 302 is just one example and that other pre-decorated greeting cards and corresponding envelopes may also be customized as described herein. For example, it should be understood that the set of dimensions (length, width, and depth) for one pre-decorated greeting card may be different than those for another pre-decorated greeting card, as well as the sets of dimensions (length, width, and depth) for each of the corresponding envelopes. Also, the pre-printed design elements and/or decorative features will vary between different pre-decorated greeting cards. In addition, some of the pre-decorated greeting cards may include a folded insert secured within the greeting card, wherein the folded insert is typically made of a lighter stock paper than the cardstock of the greeting card and includes a left insert sheet and a right insert sheet. Typically, the folded insert is glued or otherwise secured along the left edge of the left insert sheet. Advantageously, it will be seen that automated greeting card conveyance system 120 is able to print customized content on pre-decorated greeting cards and corresponding envelopes having different sizes and design formats in accordance with the present invention.

It should also be understood that the present invention is not limited to the customization of pre-printed greeting cards having the four panel folded configuration discussed above. For example, the pre-decorated greeting cards may comprise postcard-type greeting cards having two panels (i.e., a front panel and a back panel) or greeting cards with more than four panels. Of course, other configurations will be apparent to one skilled in the art.

In some embodiments, the customized card content to be printed on the pre-decorated greeting card is input or otherwise provided by a user. For example, a user may use a computing device (e.g., mobile phone, computing tablet, personal computer, or laptop computer) to interact with a greeting card ordering application that enables the user to select a pre-decorated greeting card from an inventory of pre-decorated greeting cards having different sizes and design formats and then input customized card content to be printed on the greeting card. In one embodiment, the customized card content comprises a personalized message input by the user, wherein the personalized message comprises text and optionally one or more text attributes. The text attributes may comprise, for example, the font type for the text (e.g., Times New Roman, etc.), the font style for the text (e.g., regular, italic, bold, etc.), the font size for the text (e.g., 10 point, 12 point, etc.), the font color for the text (e.g., black, red, etc.), and/or the alignment of the text (e.g., align left, center, align right, or justify). In another embodiment, the customized card content comprises a file (e.g., a PDF file or other suitable file type) uploaded by the user, wherein the file includes handwritten text or other customized card content. Of course, other types of customized card content may be provided by the user.

In some embodiments, the customized card content is generated by the system itself. For example, the system may generate a machine-readable code that provides a link to photographs or videos uploaded by a user to a remote server—i.e., the customized card content comprises the machine-readable code. A card recipient may then read the machine-readable code printed on the greeting card to view the photographs or videos. Of course, other types of customized card content may be generated by the system.

It can be appreciated that the customization area for placement of customized card content on the customization panel of the greeting card will vary between greeting cards. In some embodiments, the size and position of the customization area is determined by the system itself (e.g., a customization area having a fixed size and position on the right inside panel of the greeting card). If the greeting card includes pre-printed card content on the customization panel, the customization area for the customized card content will preferably not overlap the pre-printed card content. In some embodiments, the size and position of the customization area are configurable by a user. For example, the greeting card ordering application noted above may allow the user to configure the size and/or position of the customization area on the customization panel of the greeting card. If the greeting card includes pre-printed card content on the customization panel, the customization area for the customized card content may be selected to overlap or not overlap the pre-printed card content. In many cases, the user may select a customization area that is spaced above or below the pre-printed card content. However, if the user uploads a file that includes markings written by a child, the user may select a customization area that results in the markings overlapping the pre-printed card content so as to give the card a child-like appearance.

In some embodiments, the customized envelope content is input or otherwise provided by a user. For example, the greeting card ordering application noted above may enable the user to input customized envelope content to be printed on the envelope. In one embodiment, the customized envelope content comprises the name and address of the card recipient (and optionally the name and address of the card sender) to be printed on the envelope corresponding to the selected greeting card. Of course, other types of customized envelope content may be provided by the user.

In some embodiments, the customized envelope content is generated by the system itself. For example, the system may generate postage indicia to be printed on the envelope—i.e., the customized envelope content comprises the postage indicia. In one embodiment, the postage indicia comprises a unique postage code assigned to the order and/or a unique postage code that is selected from a list of unique postage codes available for use by system 100 (in embodiments where a digital postage stamp is applied to the envelope, as described below). Of course, other types of customized envelope content may be generated by the system.

It can be appreciated that the customization area for placement of customized envelope content on the customization panel of the envelope will vary between envelopes. Typically, the size and position of the customization area is determined by the system itself based on the dimensions of the envelope corresponding to the selected greeting card.

Referring back to FIG. 1, server system 110 also stores card print files 114 and envelope print files 116 associated with the orders stored in order database 112. In some embodiments, the card print file for each order is generated based on a template for the ordered greeting card and the customized card content and, similarly, the envelope print file for each order is generated based on a template for the envelope and the customized envelope content. In some embodiments, the card and envelope print files may also be configured to print a machine-readable validation mark on each of the greeting cards and envelopes, such as a barcode that encodes the order identifier. Alternatively, server system 110 may store separate print files for the machine-readable validation marks. It will be seen that, in some embodiments, the machine-readable validation marks are used to confirm that each greeting card and corresponding envelope are appropriately paired together before the greeting card is inserted into the envelope. In this embodiment and as noted above, the file names of the card and envelope print files are stored as data elements in order database 112 so that the print files can be associated with the appropriate order.

One skilled in the art will understand that server system 110 may comprise any number and combination of web servers, application servers, database servers, file servers, and other servers known in the art, which may be co-located in the same geographic location or located in different geographic locations with appropriate connections to the other servers via communications network 130.

Figure 2:
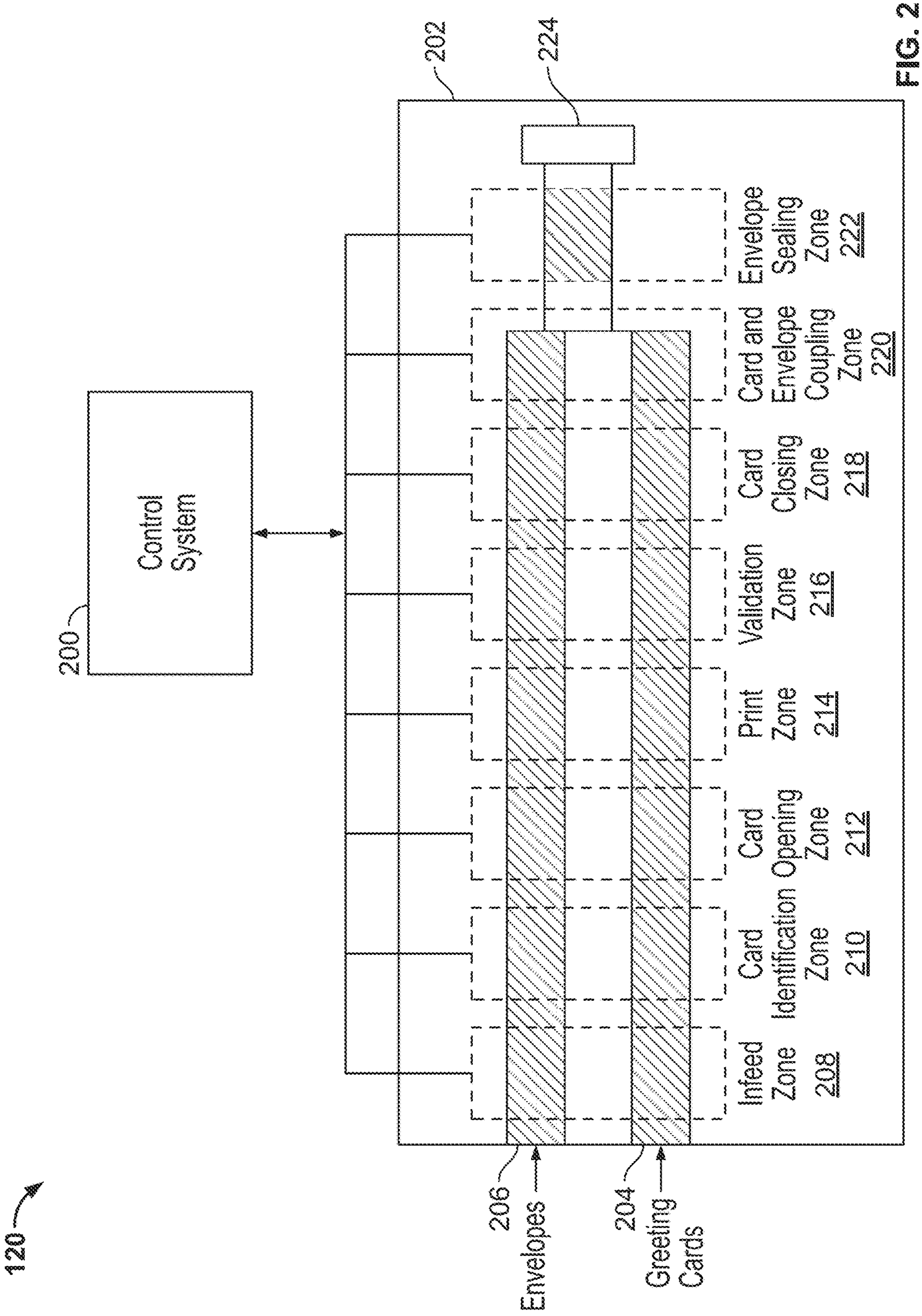
FIG. 2 depicts a block diagram of an exemplary automated greeting card conveyance system that may be used in the system of FIG. 1.

Referring still to FIG. 1, automated greeting card conveyance system 120 is configured to print customized content on a plurality of pre-decorated greeting cards and their corresponding envelopes, couple greeting cards and envelopes of varying sizes, and seal envelopes having a pointed envelope flap. As shown in FIG. 2, automated greeting card conveyance system 120 generally includes a control system 200 configured to control the operation of a conveyor system 202. In this embodiment, conveyor system 202 includes a first conveyor line 204 for transporting a series of pre-decorated greeting cards along a first conveyance path (referred to herein as the "card line") and a second conveyor line 206 for transporting a series of envelopes corresponding to the greeting cards along a second conveyance path (referred to herein as the "envelope line"). The various components of card line 204 and envelope line 206 are located in different zones, such as an infeed zone 208, a card identification zone 210, a card opening zone 212, a print zone 214, a validation zone 216, a card closing zone 218, a card and envelope coupling zone 220, and an envelope sealing zone 222. Exemplary embodiments of automated greeting card conveyance system 120 will be described in greater detail below in connection with FIGS. 4-38.

It should be understood that the conveyor system of other embodiments may not include all of the zones shown in FIG. 2. For example, in some embodiments, each of the pre-decorated greeting cards may comprise a folded greeting card that is loaded on the conveyor system in an unfolded state such that the system does not require card opening zone 212. Also, in some embodiments, the system is configured to process postcard-type greeting cards such that card opening zone 212 and card closing zone 212 are not required. In addition, in some embodiments, the system does not require validation processes such that validation zone 210 is not required. Of course, other variations will be apparent to one skilled in the art.

Referring back to FIG. 1, communications network 130 may comprise any network or combination of networks capable of facilitating the exchange of data between automated greeting card conveyance system 120 and server system 110. In some embodiments, network 130 enables communication in accordance with one or more cellular standards, such as the Long-Term Evolution (LTE) standard, the Universal Mobile Telecommunications System (UMTS) standard, and the like. In other embodiments, network 130 enables communication in accordance with the IEEE 802.3 protocol (e.g., Ethernet) and/or the IEEE 802.11 protocol (e.g., Wi-Fi). Of course, other types of networks may also be used within the scope of the present invention.

Exemplary Embodiments of Automated Greeting Card Conveyance System

Various exemplary embodiments of automated greeting card conveyance system 120 will now be described in connection with FIGS. 4-38. It should be understood that the description of control system 200 and conveyor system 202 (including the various components located in infeed zone 208, card identification zone 210, card opening zone 212, print zone 214, validation zone 216, card closing zone 218, card and envelope coupling zone 220, and envelope sealing zone 222) is not intended to be limiting, and that other embodiments may be implemented within the scope of the present invention.

Infeed Zone

With reference to FIG. 2, conveyor system 202 includes various components located within infeed zone 208 that enable pre-decorated greeting cards to be loaded on card line 204 and their corresponding envelopes to be loaded on envelope line 206.

In general, card line 204 includes a first infeed conveyor configured to transport a series of pre-decorated greeting cards along a first conveyance path, and envelope line 206 includes a second infeed conveyor configured to transport a series of envelopes along a second conveyance path. The infeed conveyors are preferably arranged in a generally parallel arrangement in close proximity to each other so that a human operator, who has retrieved the greeting card/envelope pairs associated with a plurality of orders, can manually place each individual greeting card and each individual envelope on their respective infeed conveyors. Advantageously, the greeting card/envelope pairs can be loaded in any order, which simplifies the loading process. Once each greeting card and its corresponding envelope are loaded on their respective infeed conveyors, the process is entirely automated without the need for human intervention (unless there is an error condition, as described below). Of course, the loading step may also be automated within the scope of the present invention.

Figure 4:
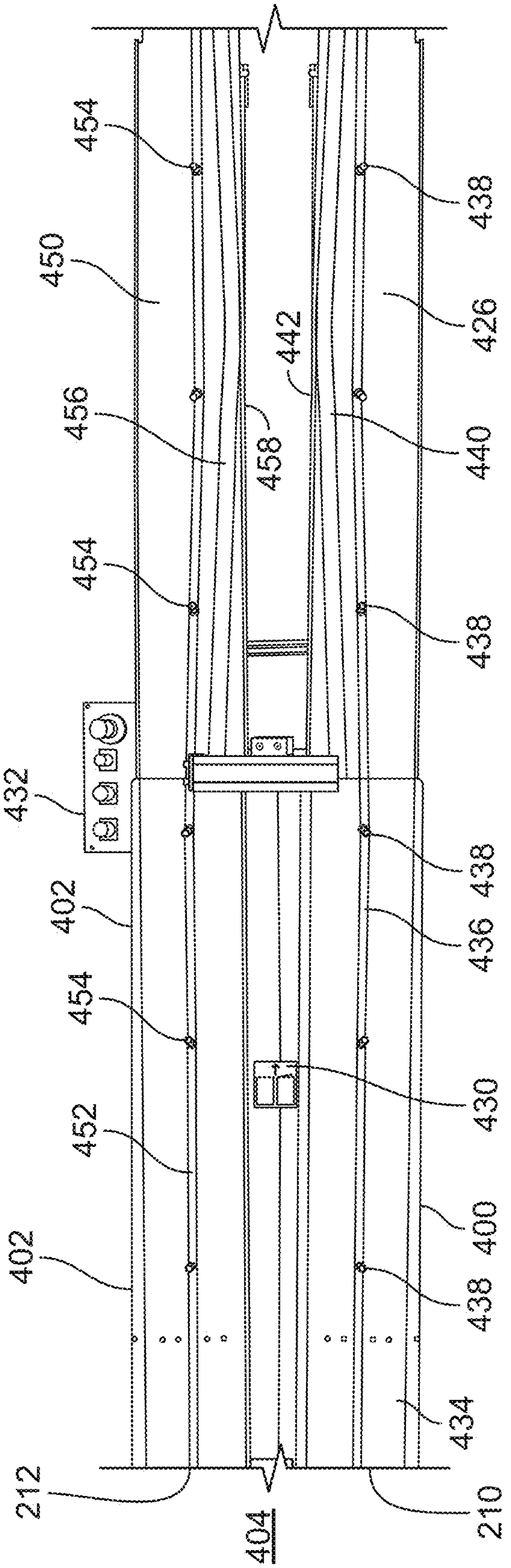
FIG. 4 depicts a top view of the card and envelope lines within an exemplary infeed zone of the conveyor system of FIG. 2.
Figure 5:
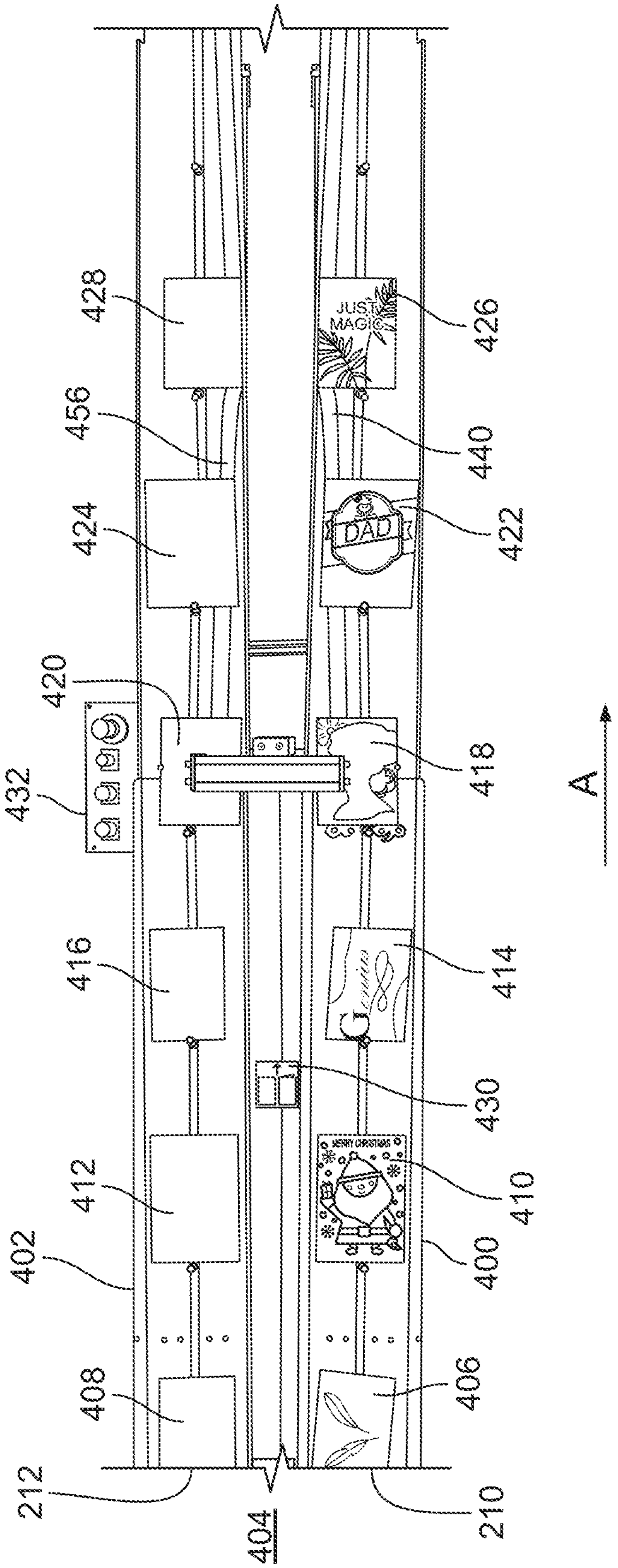
FIG. 5 depicts a top view of the card and envelope lines of FIG. 4 with greeting cards transported on the card line and envelopes transported on the envelope line.

FIGS. 4 and 5 depict one exemplary embodiment of the various components located within infeed zone 208 of conveyor system 202. FIG. 4 shows infeed zone 208 in an inoperative state, and FIG. 5 shows infeed zone 208 in an operative state with greeting cards transported on card line 204 and envelopes transported on envelope line 206. In general, card line 204 includes an infeed conveyor 400 configured to transport a series of pre-decorated greeting cards along a first conveyance path, and envelope line 206 includes an infeed conveyor 402 configured to transport a series of envelopes along a second conveyance path. In this embodiment, infeed conveyors 400 and 402 are driven by a single motor so as to operate as a single conveyor system. Of course, in other embodiments, separate motors may be used.

In this embodiment, a human operator obtains the greeting card/envelope pairs for a plurality of orders and, from a load area 404, manually places each individual greeting card on infeed conveyor 400 and each individual envelope on infeed conveyor 402. Each greeting card is placed on infeed conveyor 400 with its front panel facing upward and its spine positioned on the left, and each envelope is placed on infeed conveyor 402 with its front facing upward and its top edge positioned on the right (as viewed from the loading position). For example, FIG. 5 shows an arrangement of six greeting card/envelope pairs that have been loaded onto infeed conveyors 400 and 402—i.e., greeting card 406 and its envelope 408, greeting card 410 and its envelope 412, greeting card 414 and its envelope 416, greeting card 418 and its envelope 420, greeting card 422 and its envelope 424, and greeting card 426 and its envelope 428. A visual diagram 430 may be provided to aid the operator in placing the greeting cards and envelopes in their correct orientation on infeed conveyors 400 and 402. Preferably, infeed conveyors 400 and 402 are driven at a speed that provides sufficient time for the operator to load the greeting card/envelope pairs. A control panel 432 is also provided to control the operation of conveyors 400 and 402.

As best shown in FIG. 4, infeed conveyor 400 includes a conveyor frame 434 (which is not moveable) that supports a moveable conveyor belt 436. Conveyor belt 436 has a plurality of conveyor pegs 438 extending upwardly therefrom that move along with the belt. Conveyor pegs 438 are spaced apart so that each peg is positioned to push one of the greeting cards forward on conveyor frame 434 in the direction of arrow "A," as shown in FIG. 5. A high friction strip 440 affixed to conveyor frame 434 tapers inward toward an alignment rail 442 and functions to guide each greeting card toward alignment rail 442 as the greeting card is transported along its conveyance path. Conveyor pegs 438 also taper inwardly toward alignment rail 442 to facilitate movement of each greeting card toward alignment rail 442.

Figure 7:
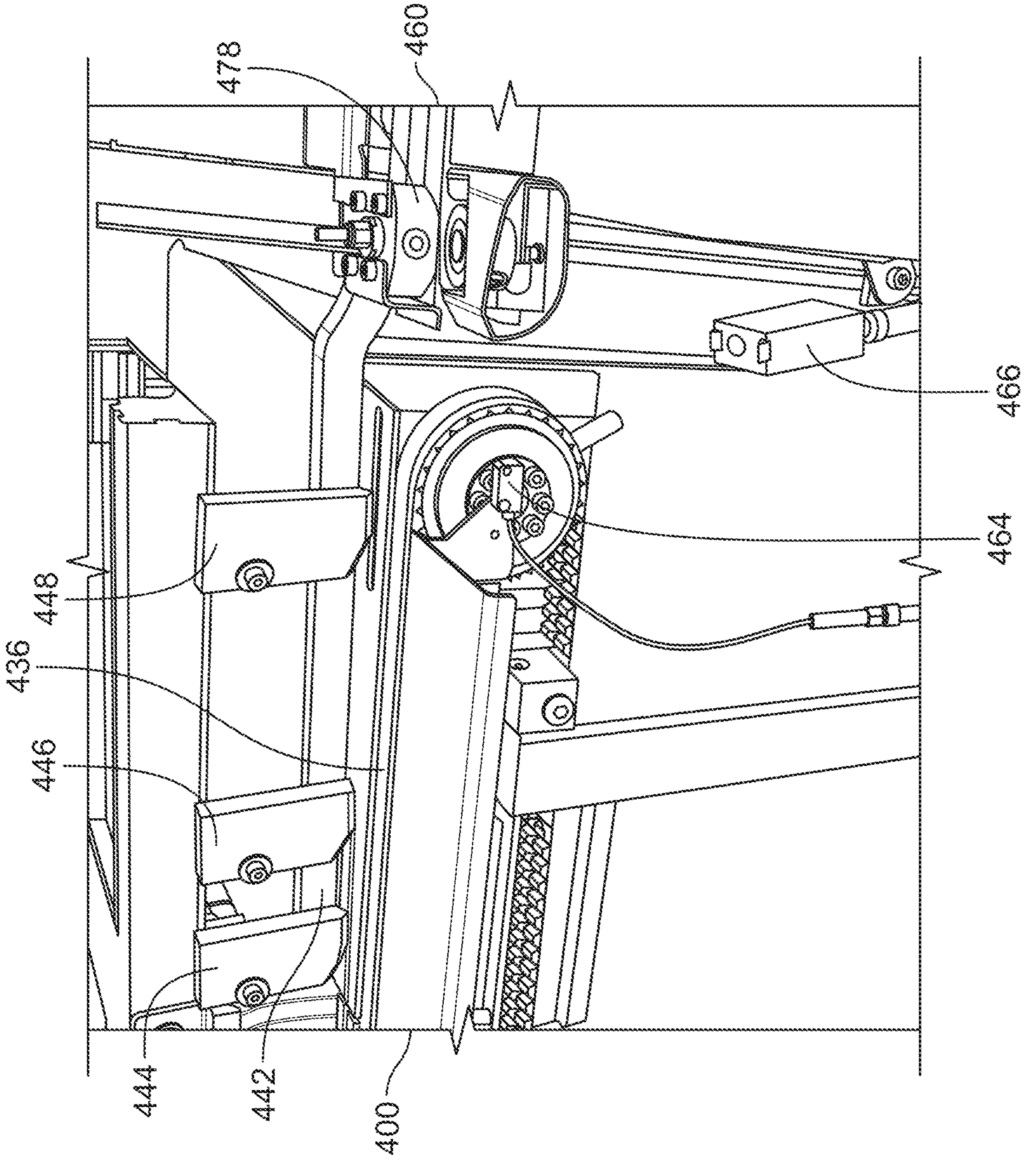

As best shown in FIG. 7, at the end of infeed conveyor 400, pivoting blocks 444, 446 and 448 are positioned to force each greeting card against angled idler rollers positioned underneath the blocks. These angled idler rollers are configured to drive the spine of each greeting card against alignment rail 442 to side register the card. Thus, it can be seen that the spine of each greeting card abuts against alignment rail 442 when it exits infeed zone 208.

Similarly, as best shown in FIG. 4, infeed conveyor 402 includes a conveyor frame 450 (which is not moveable) that supports a moveable conveyor belt 452. Conveyor belt 452 has a plurality of conveyor pegs 454 extending upwardly therefrom that move along with the belt. Conveyor pegs 454 are spaced apart so that each peg is positioned to push one of the envelopes forward on conveyor frame 450 in the direction of arrow "A," as shown in FIG. 5. A high friction strip 456 affixed to conveyor frame 450 tapers inward toward an alignment rail 458 and functions to guide each envelope toward alignment rail 458 as the envelope is transported along its conveyance path. Conveyor pegs 454 also taper inward toward alignment rail 458 to facilitate movement of each envelope toward alignment rail 458.

Figure 10:
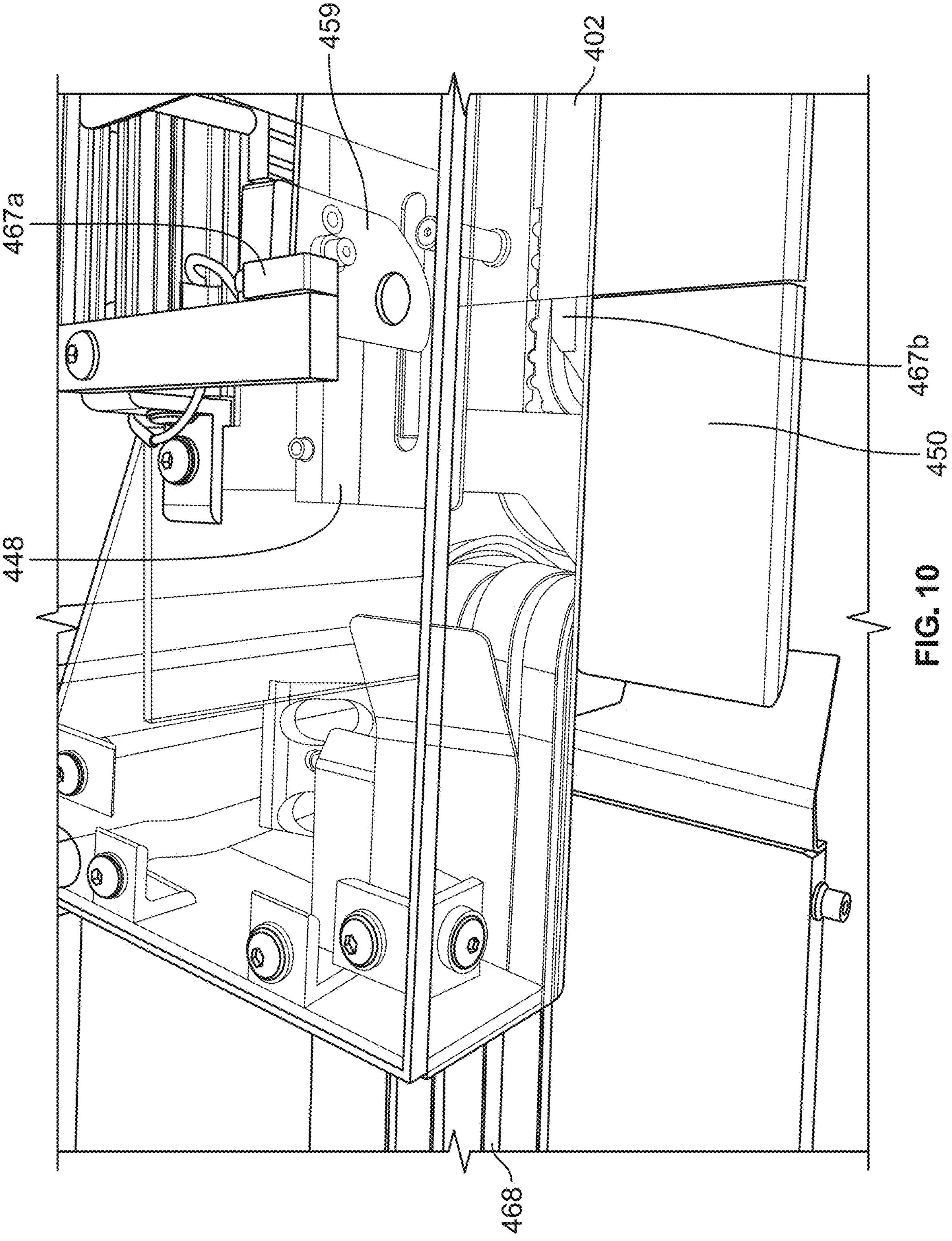
FIG. 10 depicts a top-front perspective view of the envelope line within an exemplary identification zone of the conveyor system of FIG. 2.

As best shown in FIG. 10, at the end of infeed conveyor 402, a pivoting block 459 is positioned to force each envelope against an angled idler roller positioned underneath the block. This angled idler roller is configured to drive the top edge of each envelope against alignment rail 448 to top register the envelope. Thus, it can be seen that the top edge of each envelope abuts against alignment rail 458 when it exits infeed zone 208.

By aligning the spines of the greeting cards against alignment rail 442 and aligning the top edges of the envelopes against alignment rail 452, the system can track each greeting card and envelope based on the locations of the spines and top edges and, thus, can process greeting card/envelope pairs having variable sizes. Also, because the greeting cards and envelopes are aligned automatically as they travel along their respective conveyance paths, the operator does not have to ensure proper alignment of the cards and envelopes at the time of loading, which further simplifies the loading process.

Card Identification Zone

With reference to FIG. 2, conveyor system 202 includes various components located within card identification zone 210 that enable each pre-decorated greeting card and corresponding envelope to be identified and assigned an appropriate order record (i.e., print job) during transport along their respective conveyance paths. In addition, each greeting card and corresponding envelope are detected as they pass through card identification zone 210 to enable each greeting card/envelope pair to be tracked along their respective conveyance paths. Thus, it can be appreciated that the components within card identification zone 210 provide identification and tracking information that is not known when the greeting cards and envelopes are initially loaded on card line 204 and envelope line 206, respectively, within infeed zone 208.

In general, card line 204 includes a photo sensor configured to detect the presence of each pre-decorated greeting card as it passes the photo sensor. Upon detection of a greeting card, the photo sensor transmits a signal to control system 200, which activates a reading device mounted proximate the path of card travel. In this embodiment, the reading device is configured to read a machine-readable identification mark provided on one of the panels of the greeting card to enable identification of the card. The machine-readable identification mark may comprise any type of card identification feature, such as a one-dimensional or two-dimensional barcode that encodes a card identifier, or any other marking capable of identifying a greeting card. In one exemplary embodiment described below, each machine-readable identification mark comprises a one-dimensional barcode that encodes the UPC of the greeting card (e.g., barcode 328 shown in FIG. 3C). Thus, the card identifier is the UPC in this embodiment. Of course, it should be understood that other identification methods known in the art may also be used (e.g., radio frequency identification (RFID) tags, etc.). Also, the reading device may be configured to scan a portion of the greeting card (e.g., the cover or one of the inside panels of the greeting card) and use image recognition to enable identification of the card.

The reading device transmits the card identifier (or information from which the card identifier may be derived) to control system 200. Control system 200 then identifies an order record for a pre-decorated greeting card associated with the card identifier. In one embodiment, control system 200 communicates with server system 110 via communications network 130 to retrieve an appropriate order record from order database 112. In another embodiment, copies of all or a portion of the order records from order database 112 have been downloaded from server system 110 and stored in a memory of control system 200 (or another local storage device), in which case control system 200 retrieves the appropriate order record or a portion of the data elements in the order record from local memory.

Next, control system 200 retrieves the card and envelope print files that are associated with the identified order record. In one embodiment, control system identifies the file names contained in the order record, and communicates with server system 110 via communications network 130 to retrieve the card and envelope print files having the identified file names. In another embodiment, copies of all or a portion of the print files have been downloaded from server system 110 and stored in a memory of control system 200 (or another local storage device), in which case control system 200 retrieves the print files from local memory.

It should further be noted that the photo sensor described above also transmits a signal to control system 200 that is used to define the position of the greeting card on card line 204 as it passes the photo sensor. A similar photo sensor is also used to define the position of the envelope on envelope line 206 as it passes the photo sensor.

Figure 6:
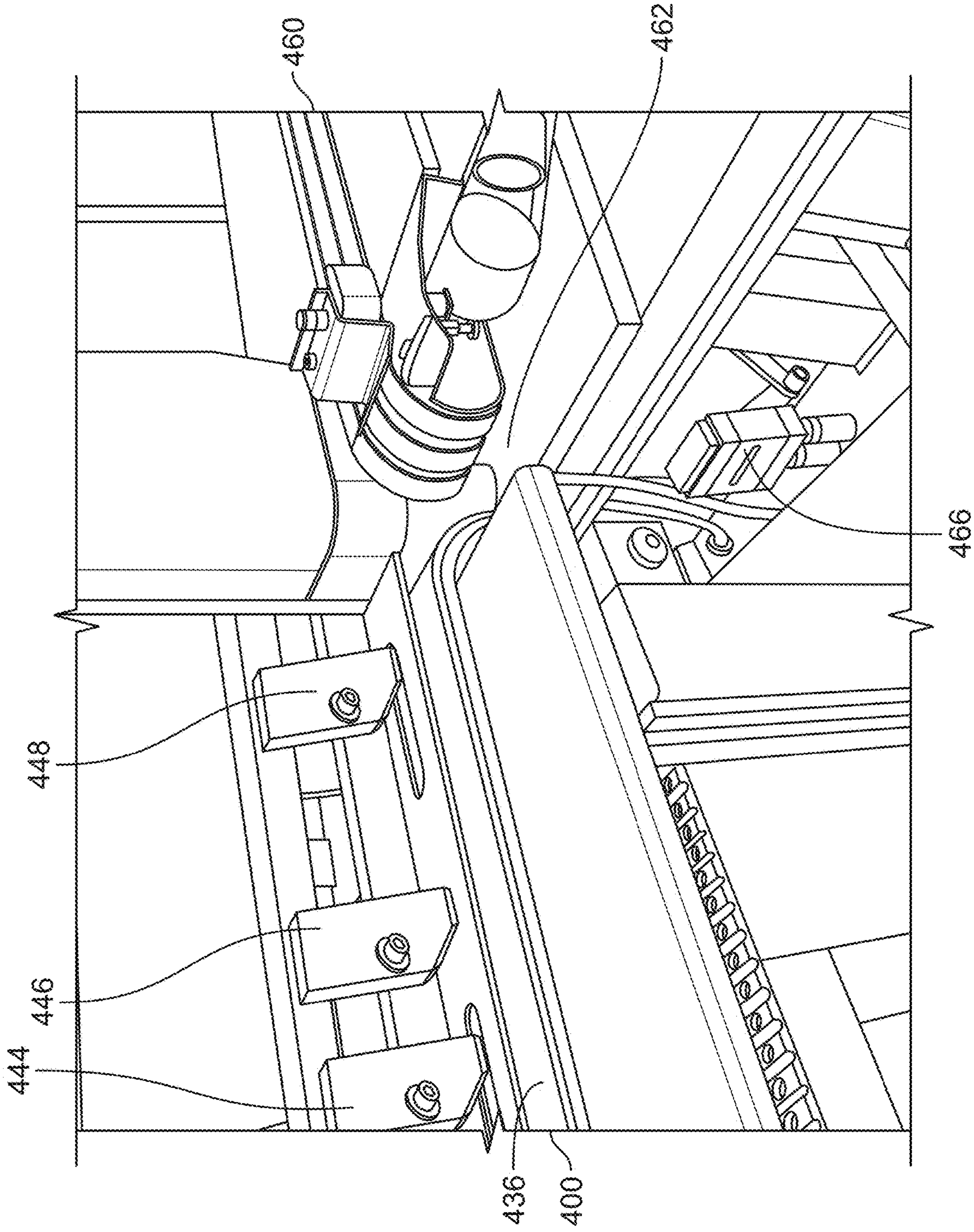
FIGS. 6-7 depict various views of the card line within an exemplary card identification zone of the conveyor system of FIG. 2, including an input-to-exit perspective view of the card line (FIG. 6) and an exit-to-input perspective view of the card line (FIG. 7)
Figure 8:
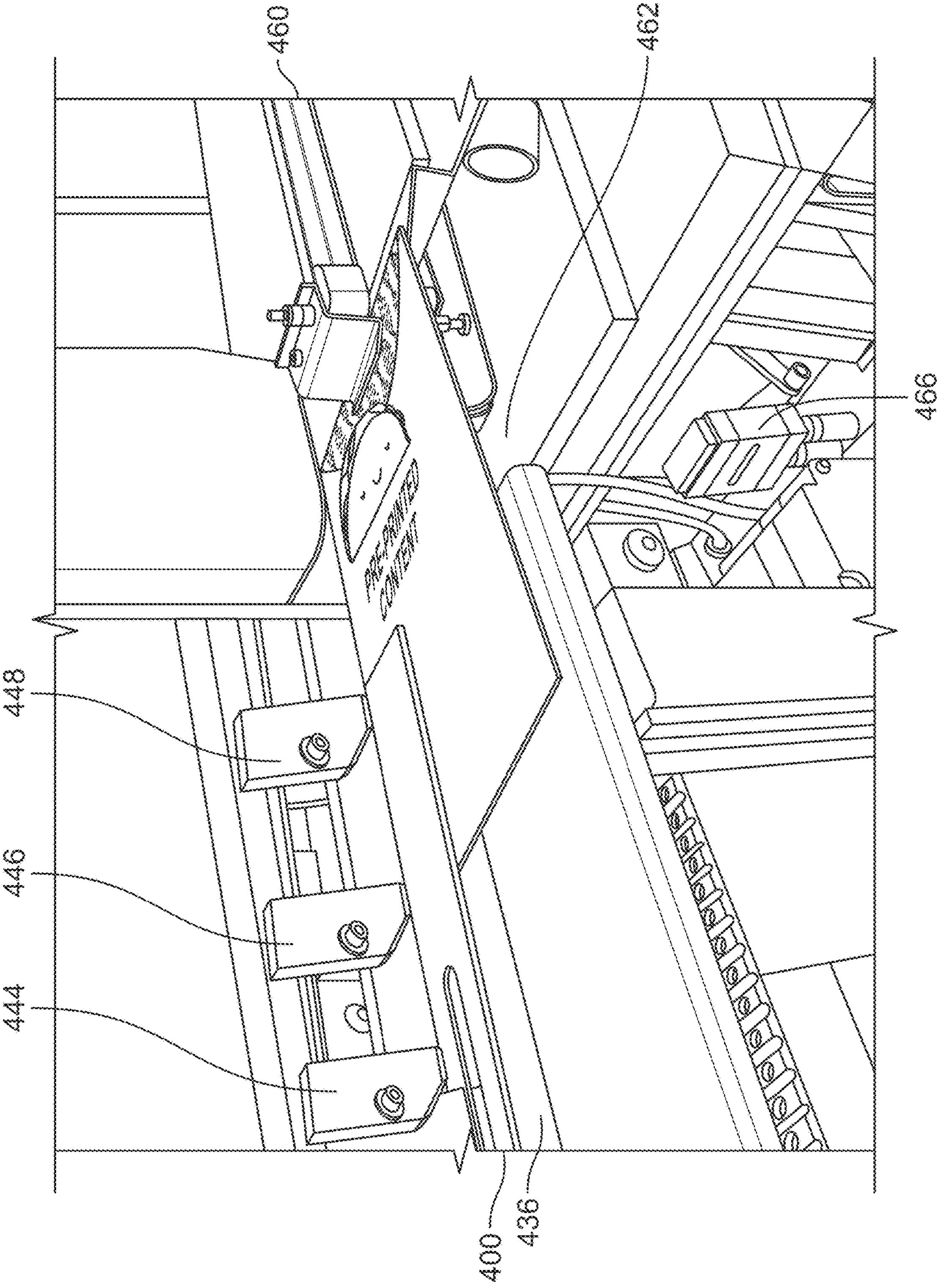
FIGS. 8-9 depict various views of the card line of FIGS. 6-7 with a greeting card being scanned while transported along the card line, including an input-to-exit perspective view of the card line (FIG. 8) and an exit-to-input perspective view of the card line (FIG. 9)
Figure 9:
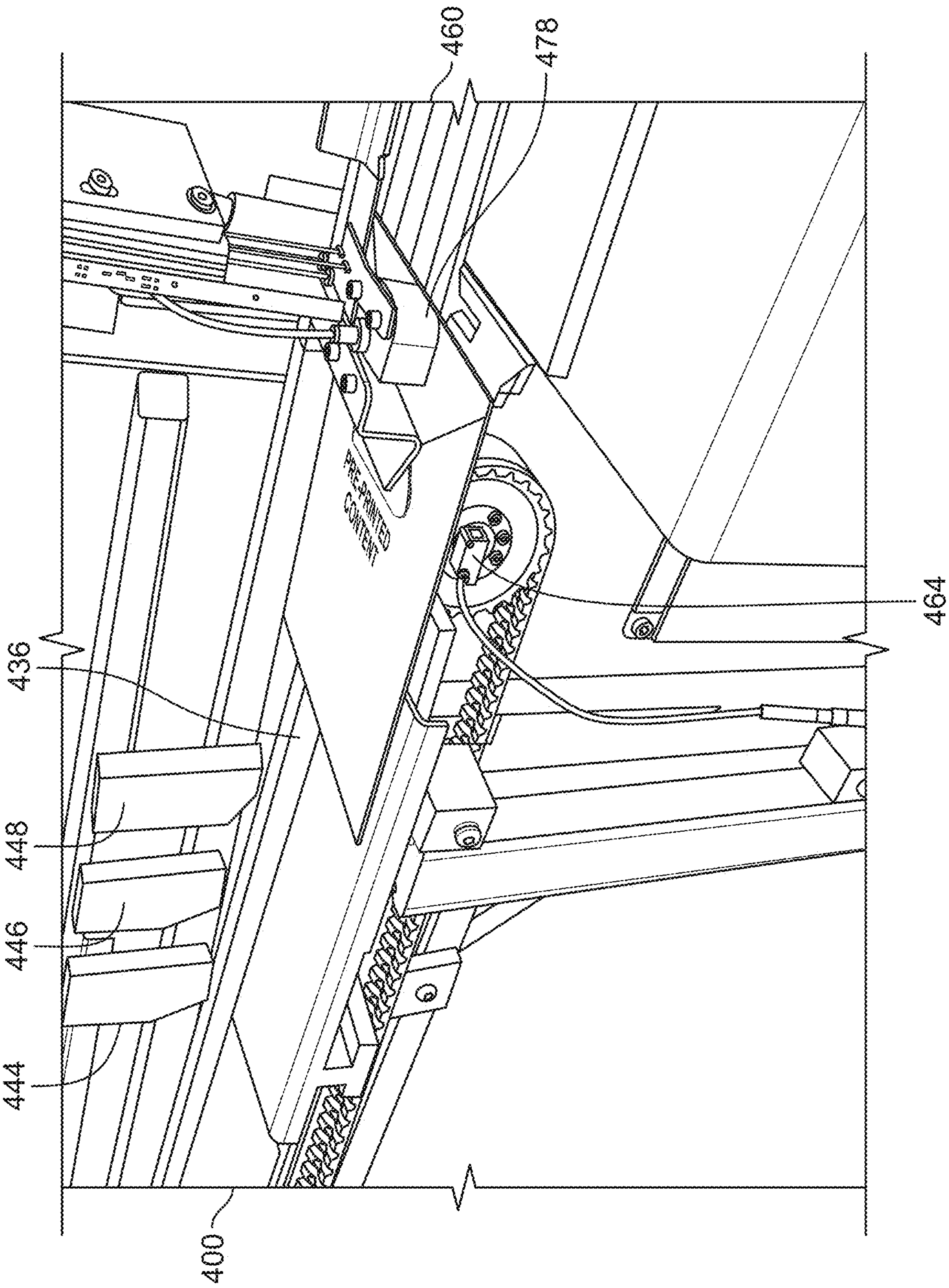

FIGS. 6-10 depict one exemplary embodiment of the various components located within card identification zone 210 of conveyor system 202. FIGS. 6, 7 and 10 show card identification zone 210 in an inoperative state, and FIGS. 8 and 9 show card identification zone 210 in an operative state with a greeting card being scanned while transported along card line 204.

In general, card identification zone 210 is located on card line 204 at a transition between infeed conveyor 400 and a print conveyor 460 and on envelope line 206 at a transition between infeed conveyor 402 and a print conveyor 468. Print conveyors 460 and 468 will be described in greater detail below in connection with card opening zone 212 and print zone 214.

As best shown in FIGS. 6 and 8, there is a gap 462 on card line 204 that is located generally between infeed conveyor 400 and print conveyor 460. This gap exposes the back panel of each greeting card during transfer between the conveyors. As best shown in FIGS. 7 and 9, a photo sensor 464 mounted below the conveyors is configured to detect the leading edge and the trailing edge of each greeting card as it passes over gap 462. This mounting configuration is preferred so as to detect the relatively undecorated back panel of each greeting card. It should be understood that any foil or other decorative features secured to the front panel of the greeting card could cause an undesired reflection if photo sensor 464 were mounted above the conveyors. Of course, in other embodiments, photo sensor 464 could be mounted above the conveyors if the greeting cards being processed do not include any decorative features on their front panels that could cause an undesired reflection. In the exemplary embodiment, the photo sensor comprises one of the WorldBeam Q12 series of miniature self-contained sensors available from Banner Engineering Corp. of Minneapolis, Minnesota (and this same photo sensor is used for each of the additional photo sensors described below). Of course, other photo sensors may be used within the scope of the present invention.

Upon detection of the leading edge of each greeting card, photo sensor 464 transmits a signal to control system 200. Control system 200 receives the signal and transmits an activation signal to a reading device 466 mounted proximate the path of card travel. In this embodiment, as best shown in FIG. 6, reading device 466 is mounted below the conveyors and is configured to read a machine-readable identification mark provided on the back panel of each greeting card as it passes over gap 462.

In this embodiment, the machine-readable identification mark comprises a one-dimensional barcode that encodes the UPC of the greeting card (e.g., barcode 328 shown in FIG. 3C). Thus, the card identifier of the greeting card is the UPC in this embodiment. Reading device 466 may comprise any barcode reader that is capable of reading the barcode to determine the UPC, as known in the art. In this embodiment, reading device 466 is configured to capture up to three images of the back panel of each greeting card, i.e., the barcode reader successively images the lower portion, middle portion, and upper portion of the back panel until it locates the barcode to enable identification of the UPC encoded therein.

Upon determination of the card identifier of the greeting card, reading device 466 transmits the card identifier (e.g., the UPC) to control system 200. Control system 200 then identifies an order record for a pre-decorated greeting card that is associated with the card identifier. In this embodiment, control system 200 communicates with server system 110 via communications network 130 to retrieve an order record from order database 112. The retrieved order record contains a UPC that matches the UPC decoded from the barcode on the back panel of the greeting card. It can be appreciated that there could be two or more order records containing the same UPC (i.e., multiple orders for the same pre-decorated greeting card). In this case, control system 200 could retrieve the oldest order record (i.e., the orders are fulfilled using a first-in-first-out methodology). Alternatively, control system 200 could retrieve an order record associated with a request for expedited fulfillment. Control system 200 then identifies the file names contained in the retrieved order record, and communicates with server system 110 via communications network 130 to retrieve the card and envelope print files having the identified file names. The processing of these card and envelope print files will be described in greater detail below.

As noted above, photo sensor 464 detects the trailing edge of each greeting card as it passes over gap 462. Upon detection of the trailing edge of each greeting card, photo sensor 464 transmits a signal to control system 200. Control system 200 uses this signal to define the card position as it transfers onto print conveyor 460. It should be noted that the trailing edge of each greeting card is used to define the card position because the top edge of some greeting cards may have an irregular shape that is difficult to accurately track. Of course, in other embodiments, the leading edge of each greeting card may be used to define the card position if the greeting cards being processed do not have top edges with irregular shapes. It can be appreciated that photo sensor 464 may also detect if a greeting card jams during the transfer process. If an error occurs, conveyor system 202 may be stopped and/or control system 200 may transmit an error indicator to server system 110 so that the status of the order may be updated in order database 112.

As shown in FIG. 10, envelope line 206 has a similar configuration to card line 204 within card identification zone 210, i.e., infeed conveyor 402 transitions to a separate print conveyor 368 with a gap located between the conveyors. A photo sensor 467*a* mounted above infeed conveyor 402 is aligned with a reflective backer 467*b* placed on conveyor frame 450. Photo sensor 467*a* is configured to emit a beam of light toward reflective backer 467*b*, which reflects the light back to photo sensor 467*a*. Photo sensor 467*a* transmits a signal to control system 200 indicating whether the reflected light was detected. If photo sensor 467*a* does not detect the reflected light, which will be the case if the envelope breaks the beam of light emitted by photo sensor 467*a* toward reflective backer 467*b*, then control system 200 determines that the envelope is present. However, if photo sensor 467*a* detects the reflected light, then control system 200 determines that the envelope is not present. Control system 200 uses this information to detect the trailing edge of each envelope as it passes over the gap, which is used to define the envelope position as it transfers onto print conveyor 368 (although the leading edge of each envelope could also be used to define the envelope position in other embodiments). It can be appreciated that photo sensor 467*a* may also detect if an envelope jams during the transfer process. If an error occurs, conveyor system 202 may be stopped and/or control system 200 may transmit an error indicator to server system 110 so that the status of the order may be updated in order database 112.

Thus, it can be appreciated that control system 200 has assigned an order record (i.e., print job) to each greeting card/envelope pair and has also defined the positions of the greeting card and envelope upon transfer to their respective print conveyors. It will be seen that control system 200 continues to track the positions of the greeting card and envelope until the card is inserted into the envelope, as described below.

Card Opening Zone

With reference to FIG. 2, conveyor system 202 includes various components located within card opening zone 212 that enable each of the pre-decorated greeting cards to be automatically opened during transport along its conveyance path to thereby expose the customization panel for printing in print zone 214, as described below. It should be understood that the card opening mechanism may include a variety of different components, such as a Bernoulli cup, an air jet system, a physical slide guide, a mechanical arm, a moveable sled, and other types of mechanical, magnetic, suction, or blowing components known in the art.

Figure 11:
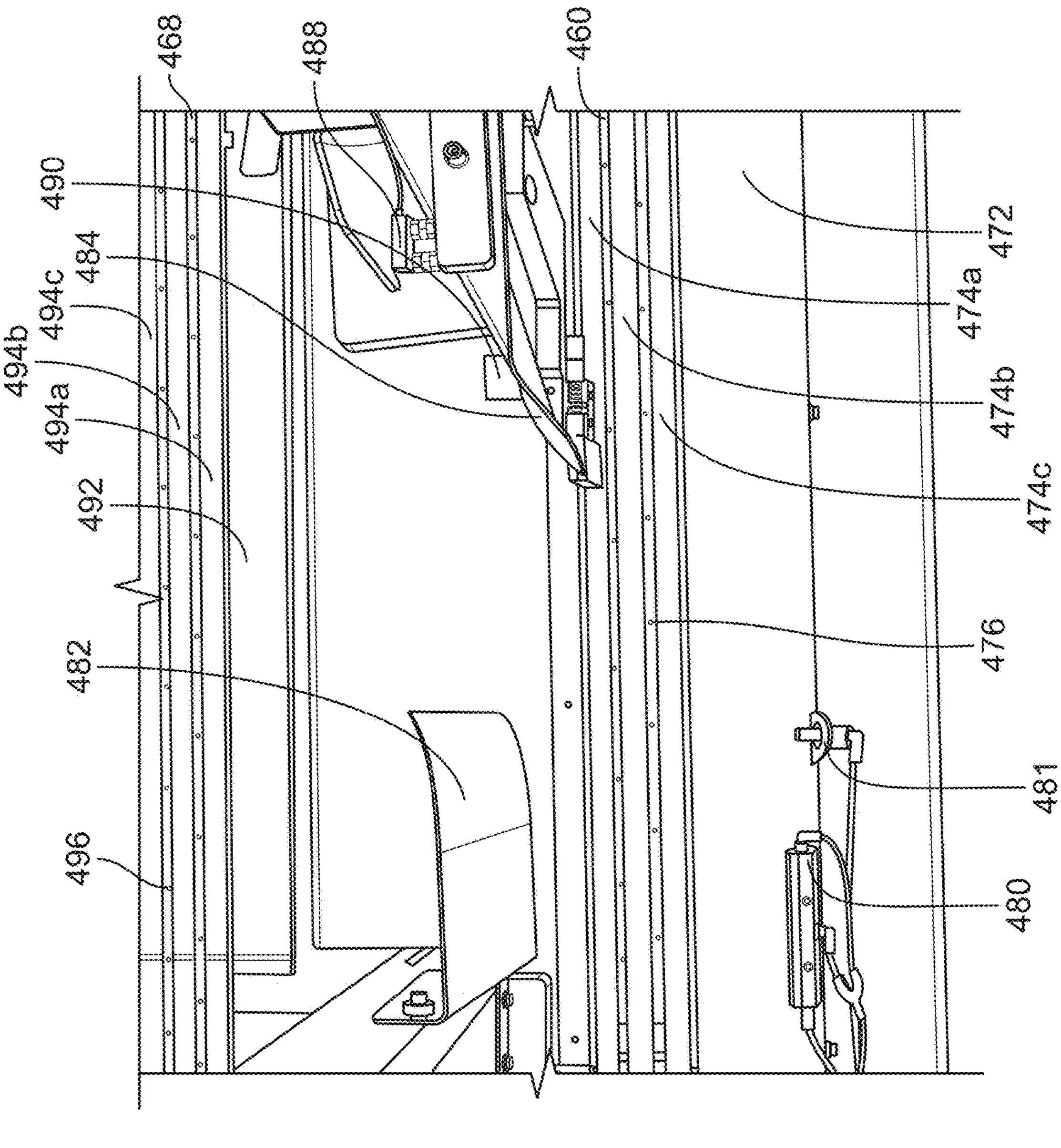
FIGS. 11-13 depict various views of the card line within an exemplary card opening zone of the conveyor system of FIG. 2, including a top view of the card line (FIG. 11), an input-to-exit perspective view of the card line (FIG. 12), and an exit-to-input perspective view of the card line (FIG. 13)
Figure 12:
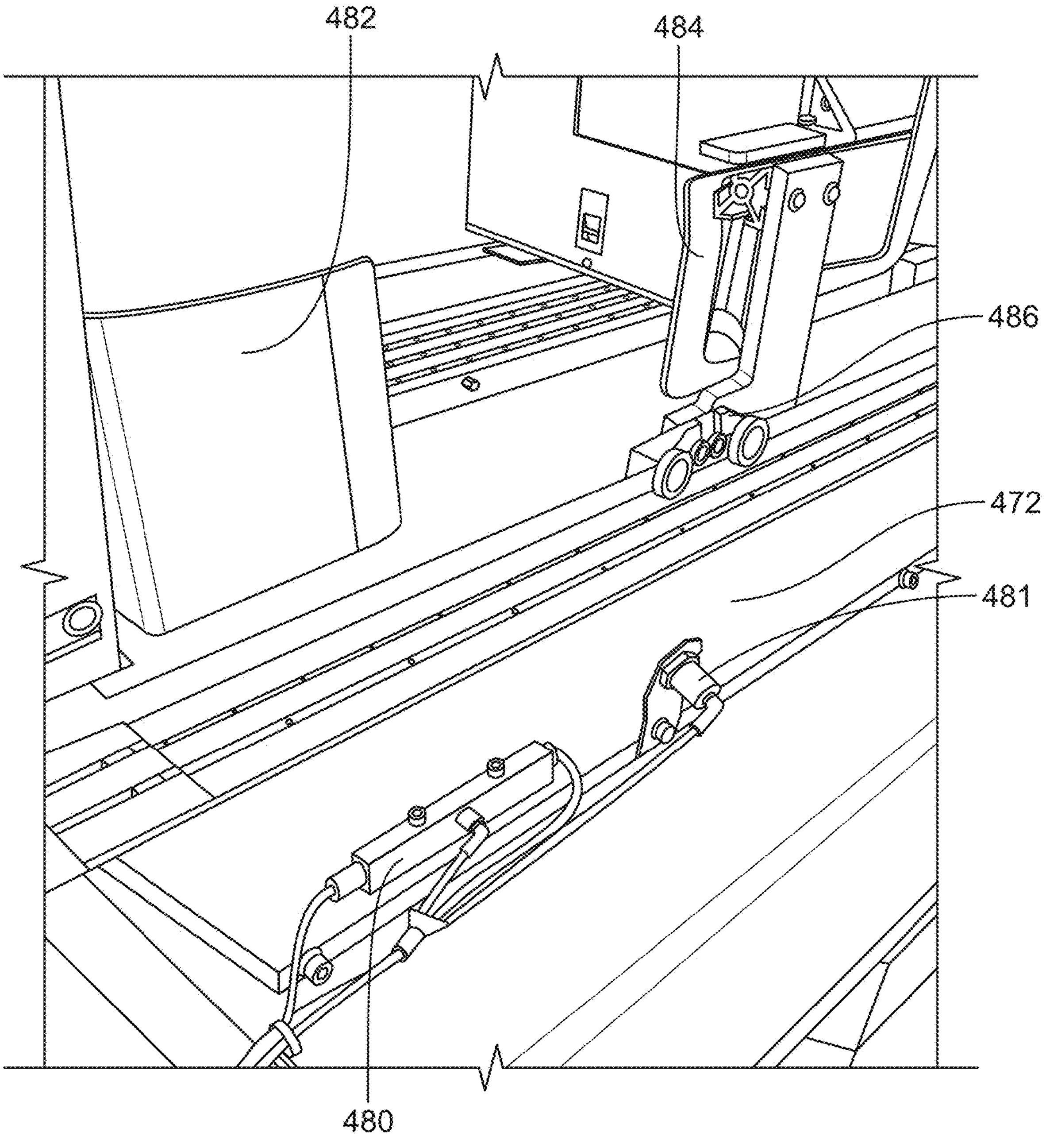
Figure 13:
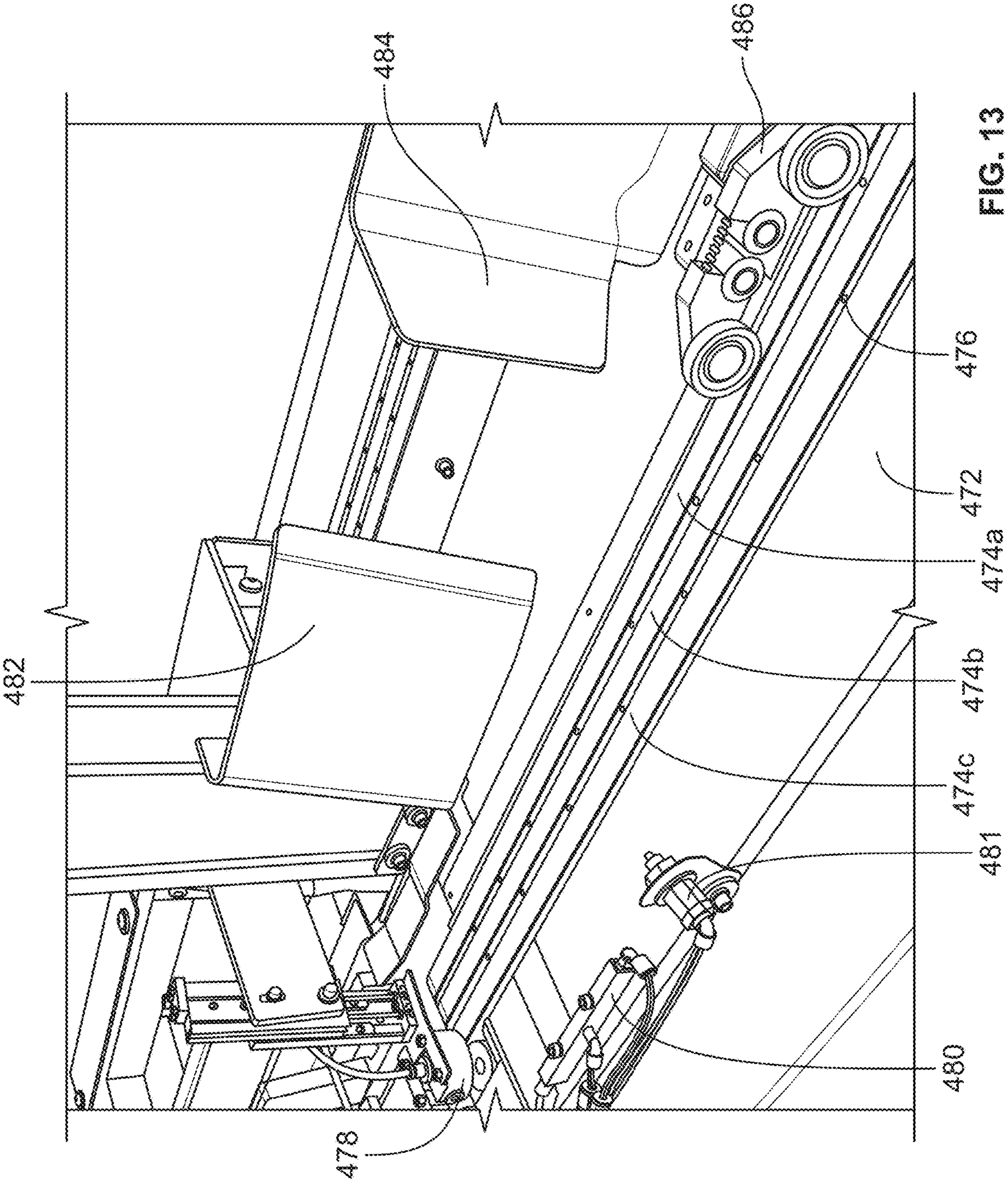
Figure 14:
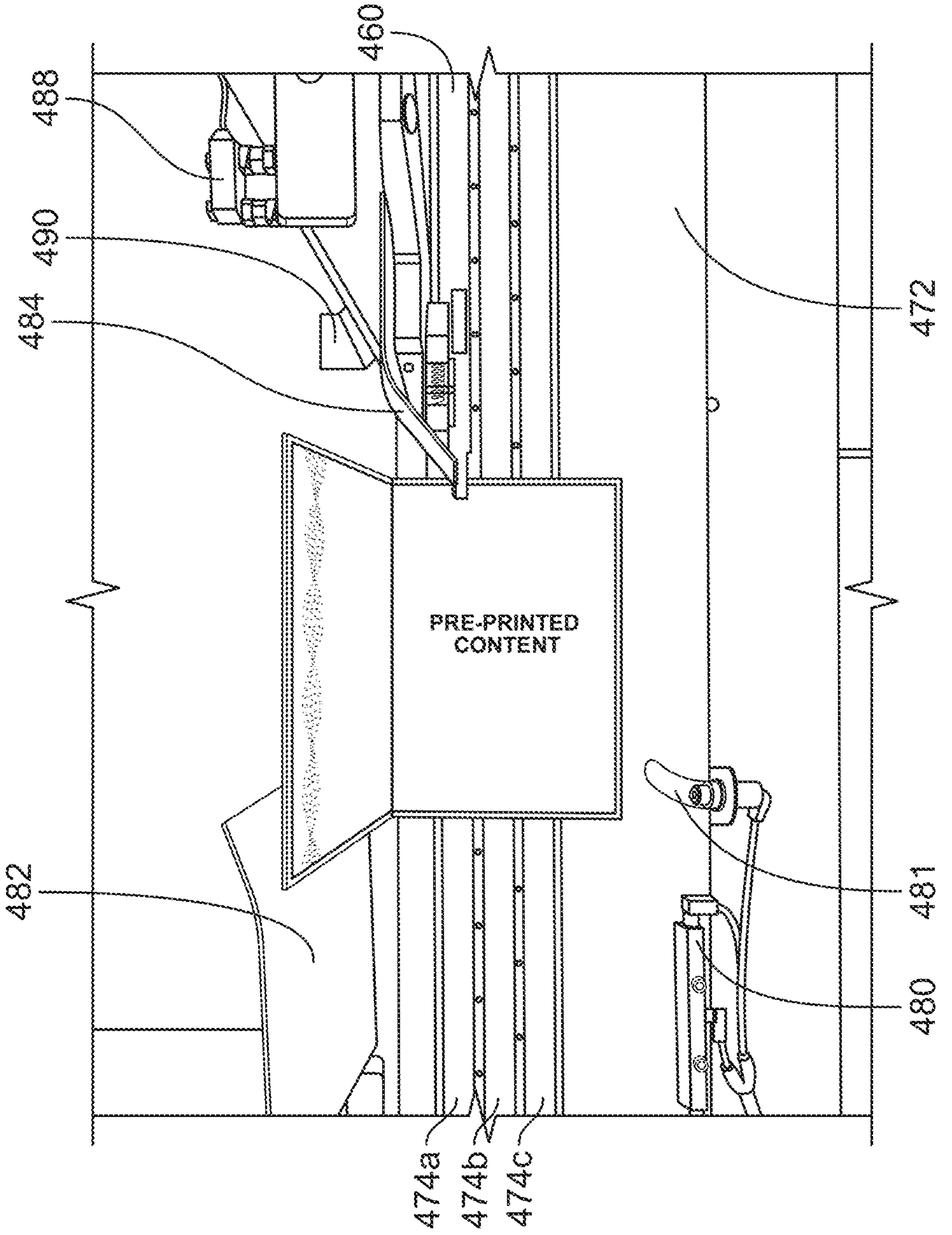
FIGS. 14-16 depict various views of the card line of FIGS. 11-13 with a greeting card being opened while transported along the card line, including a top view of the card line (FIG. 14), an input-to-exit perspective view of the card line (FIG. 15), and an input-to-exit perspective view of the back side of the card line (FIG. 16)
Figure 15:
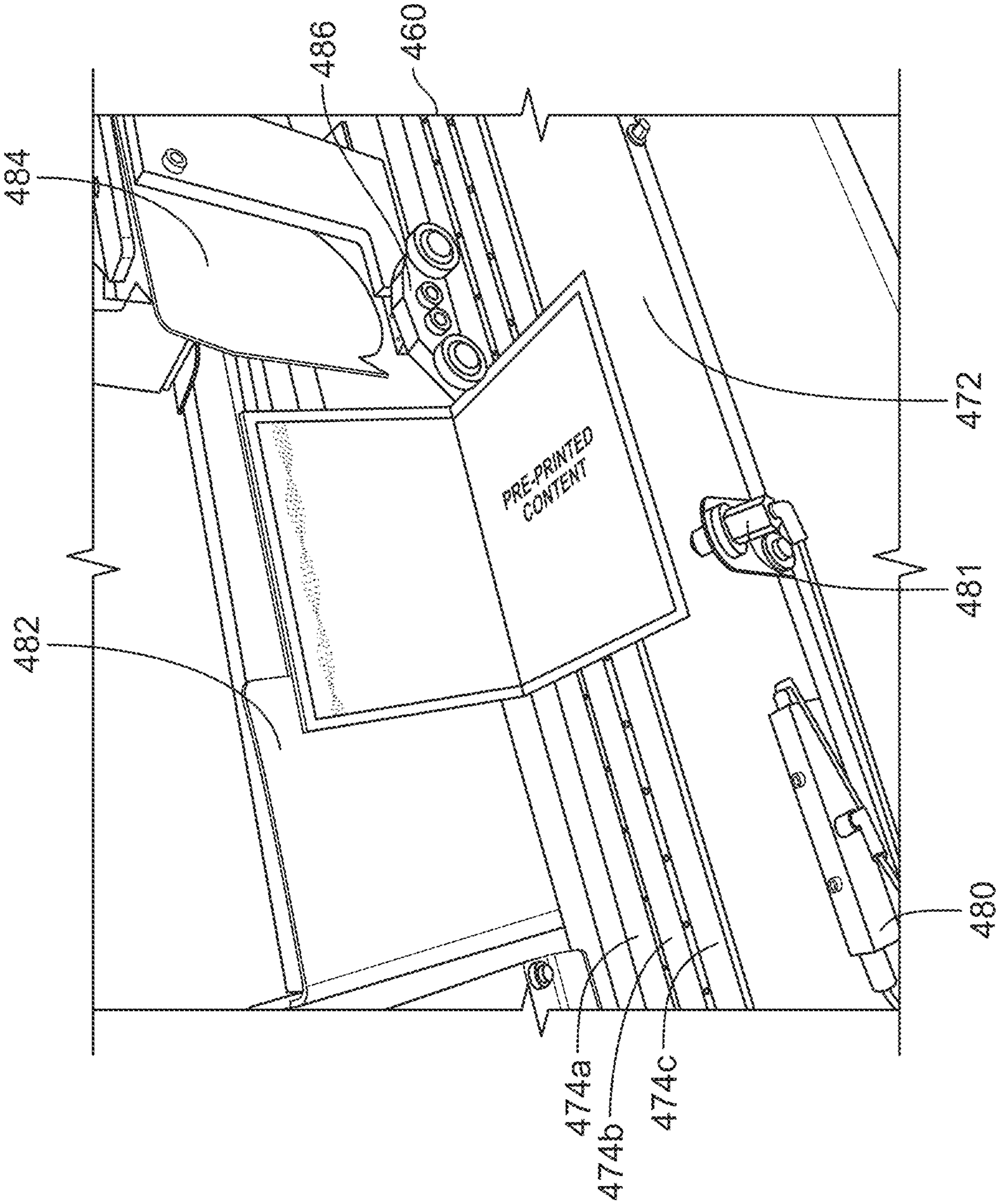
Figure 16:
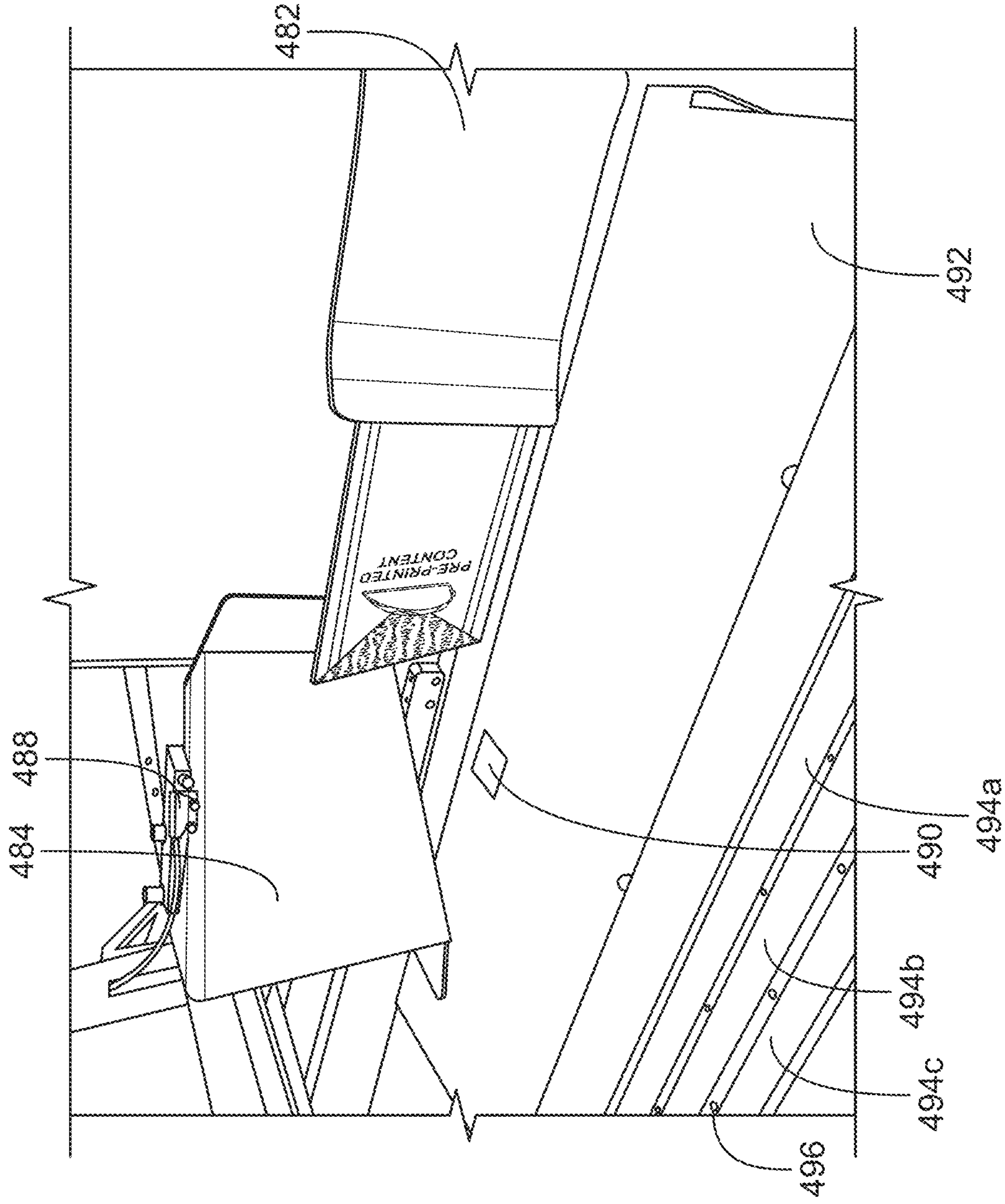

FIGS. 11-16 depict one exemplary embodiment of the various components located within card opening zone 212 of conveyor system 202. FIGS. 11-13 show card opening zone 212 in an inoperative state, and FIGS. 14-16 show card opening zone 212 in an operative state with a greeting card being opened while transported along card line 204.

As best shown in FIGS. 11 and 14, print conveyor 460 of card line 204 includes a conveyor frame 472 (which is not moveable) that supports three moveable conveyor belts 474*a*, 474*b* and 474*c*. The speed of print conveyor 460 is faster than the speed of infeed conveyor 400 so that print conveyor 460 is able to pull each greeting card off of infeed conveyor 400.

A suction system provides air suction through air holes 476 positioned between conveyor belts 474*a* and 474*b* and between conveyor belts 474*b* and 474*c* so as to pull each greeting card downward onto print conveyor 460. In this embodiment, the suction system is powered with two different vacuum pumps—a first vacuum pump connected to the air holes located at the transition points (i.e., the entry area where each greeting card is opened and the exit area where the printing occurs) and a second vacuum pump connected to the air holes located between the transition points. The suction force is higher at the transition points, which may be achieved through the use of fewer and larger air holes connected to the first vacuum pump (not shown in the drawings).

Conveyor system 202 includes various components for automatically opening each greeting card, i.e., moving the first card page (i.e., the card cover) away from the second card page, so that the right inside panel (which is the customization panel in this embodiment) is provided in a flat, printable position on conveyor belts 474*a*-474*c*.

First, as best shown in FIGS. 7 and 13, a Bernoulli cup 478 positioned above print conveyor 460 uses moving air to lower the pressure over the top of the greeting card, which causes the higher pressure under the card to begin pushing open the card cover. Next, as best shown in FIGS. 14 and 15, an air jet system 480 with a nozzle 481 positioned slightly above the surface of conveyor belts 474*a*-474*c* emits a burst of air at a force sufficient to open the card cover, while not completely blowing the card off conveyor belts 474*a*-474*c*. Control system 200 is configured to activate and deactivate air jet system 480 based on the position of the greeting card as it transfers onto print conveyor 460, the length of the card, and the speed of print conveyor 460. In this embodiment, air jet system 480 remains activated for a period of time that is sufficient to keep the card open and prevent the card cover from bouncing back and re-closing. As best shown in FIGS. 14 and 15, a physical barrier 482 provides a surface to catch the card cover as it is blown open with the air jets. In addition, as best shown in FIGS. 15 and 16, the inside surface of the card cover (i.e., the left inside panel) engages a physical slide guide 484 that is configured to manipulate the card cover to a fully open position as the greeting card moves along print conveyor 460. As best shown in FIGS. 13 and 15, pressure rollers 486 are positioned to contact the right inside panel of the greeting card so as to force the second card page onto conveyor belts 474*a*-474*c* and prevent the card from twisting or shifting during the card opening process.

As best shown in FIGS. 14 and 16, conveyor system 202 also includes a photo sensor 488 mounted above print conveyor 460 that is aligned with a reflective backer 490 placed on conveyor frame 472. Photo sensor 488 is configured to emit a beam of light toward reflective backer 490, which reflects the light back to photo sensor 488. Photo sensor 488 transmits a signal to control system 200 indicating whether the reflected light was detected. If photo sensor 488 does not detect the reflected light, which will be the case if the card cover breaks the beam of light emitted by photo sensor 488 toward reflective backer 490, then control system 200 determines that the card has been successfully opened. It can be appreciated that photo sensor 488 may also detect if a greeting card jams during the card opening process. If an error occurs, conveyor system 202 may be stopped and/or control system 200 may transmit an error indicator to server system 110 so that the status of the order may be updated in order database 112.

As shown in FIG. 11, envelope line 206 has a similar configuration to card line 204 without the card opening components, i.e., print conveyor 468 includes a conveyor frame 492 (which is not moveable) that supports three moveable conveyor belts 494*a*-494*c*. The speed of print conveyor 468 is faster than the speed of infeed conveyor 402 so that print conveyor 468 is able to pull each envelope off of infeed conveyor 402.

In this embodiment, card print conveyor 460 and envelope print conveyor 468 are driven by separate motors so that the conveyor speeds can be independently controlled. It will be seen that control system 200 can adjust the speed of one or both of these conveyors to ensure that each greeting card and corresponding envelope are aligned at the time that the greeting card is inserted into the envelope, as described below.

A suction system provides air suction through air holes 496 positioned between conveyor belts 494*a* and 494*b* and between conveyor belts 494*b* and 494*c* so as to pull each envelope downward onto print conveyor 468. The suction system is powered with two different vacuum pumps—a first vacuum pump connected to the air holes located at the transition points and a second vacuum pump connected to the air holes located between the transition points. The suction force is higher at the transition points, which is achieved through the use of fewer and larger air holes connected to the first vacuum pump (not shown in the drawings).

Figure 17:
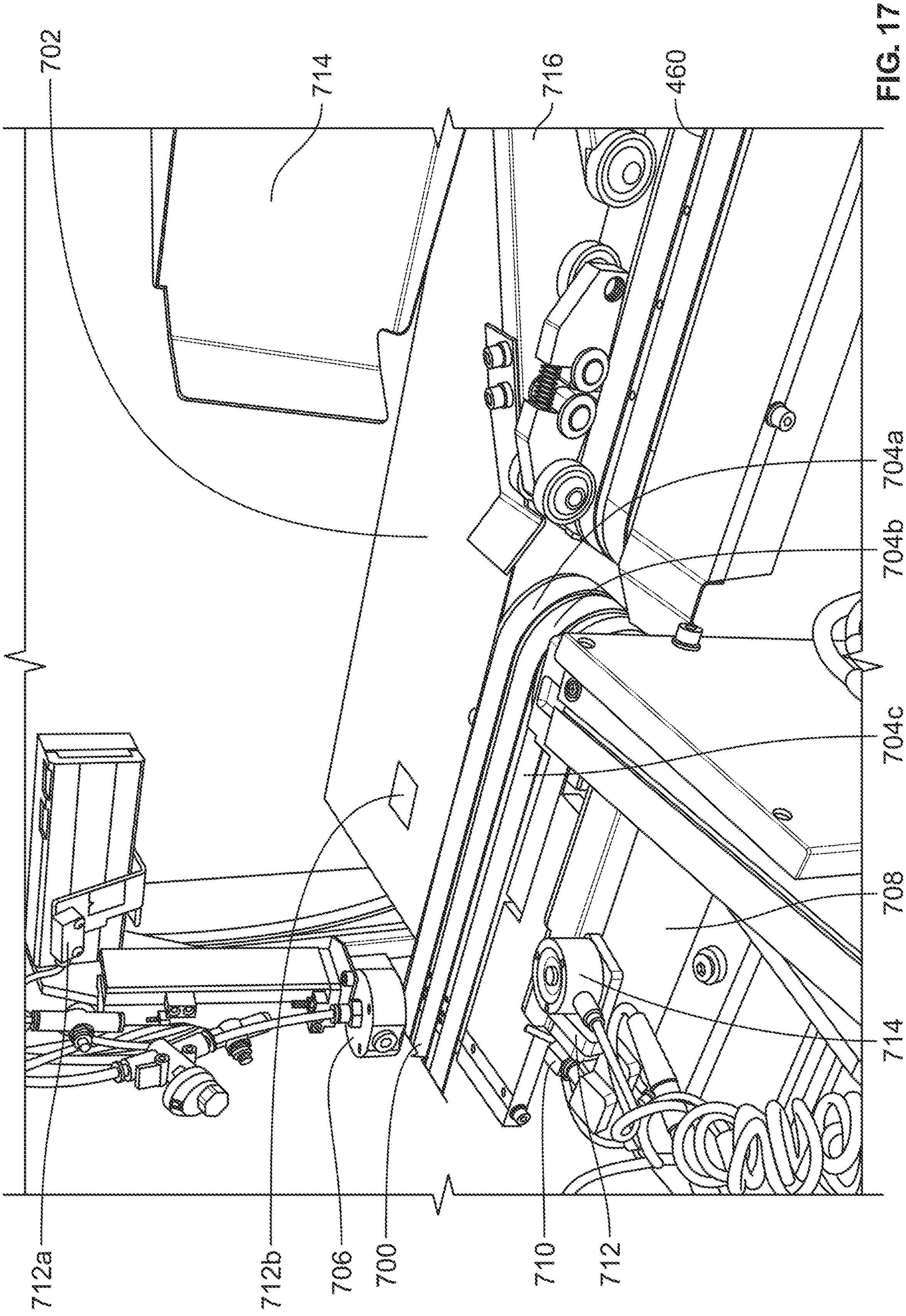
FIG. 17 depicts an exit-to-input perspective view of the card line within an alternative card opening zone of the conveyor system of FIG. 2.

FIGS. 17-21 depict an alternative embodiment of the various components located within card opening zone 212 of conveyor system 202. FIG. 17 shows card opening zone 212 in an inoperative state, and FIGS. 18-21 show card opening zone 212 in an operative state with a greeting card being opened while transported along card line 204. The main difference between this embodiment and the embodiment shown in FIGS. 11-16 described above is that this embodiment uses different card opening components and a separate card opening conveyor, as described below.

As shown in FIG. 17, card opening conveyor 700 of card line 204 includes a conveyor frame 702 (which is not moveable) that supports three moveable conveyor belts 704*a*, 704*b* and 704*c*. The speed of card opening conveyor 700 is faster than the speed of infeed conveyor 400 so that card opening conveyor 700 is able to pull each greeting card off of infeed conveyor 400.

Figure 18:
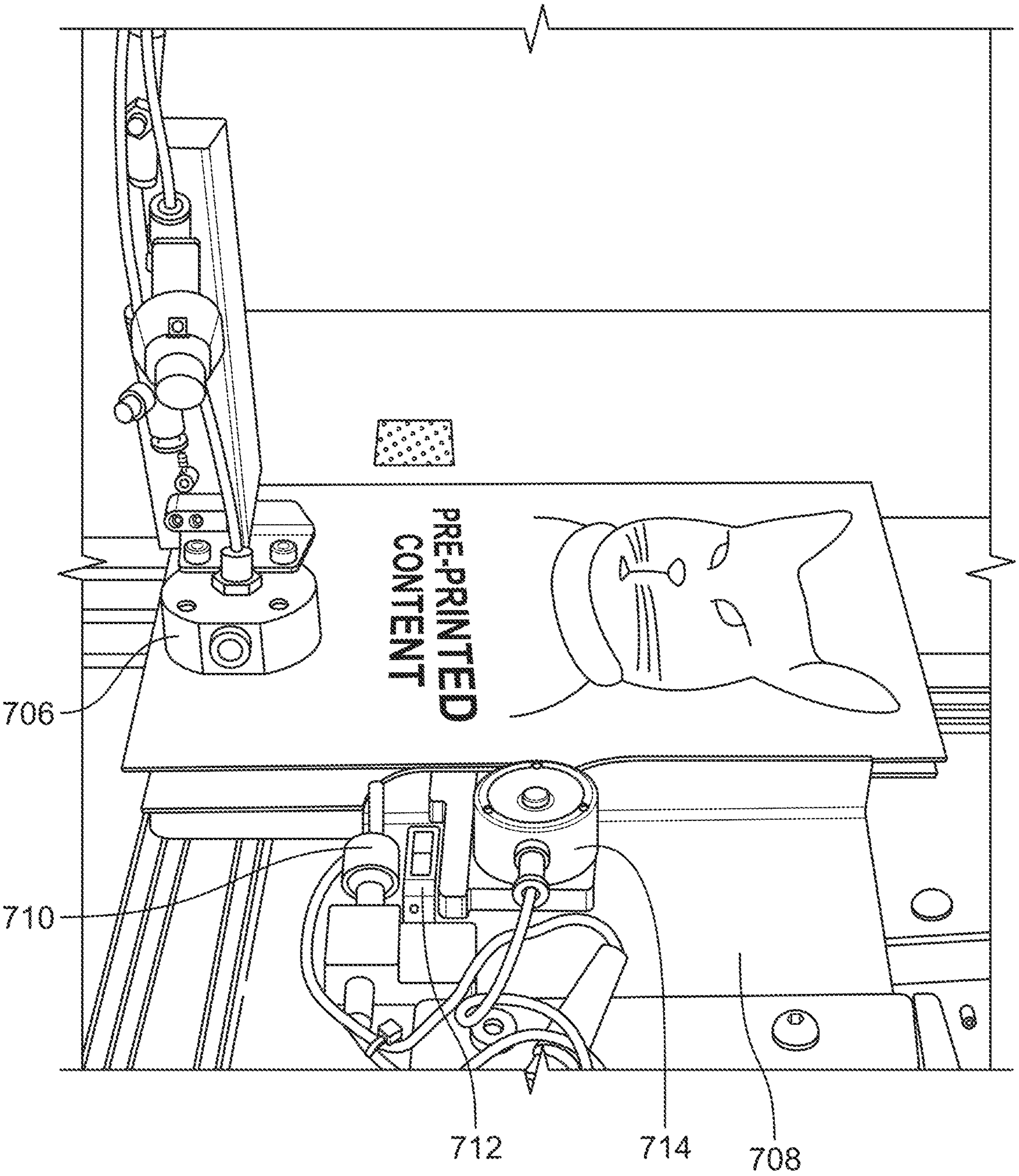
FIGS. 18-21 depict various views of the card line of FIG. 17 with a greeting card being opened while transported along the card line, including a top-front perspective view of the card line during the first stage of the opening process (FIG. 18), a top-front perspective view of the card line during a second stage of the opening process (FIG. 19), a top-front perspective view of the card line during the third stage of the opening process (FIG. 20), and a top-front perspective view of the card line during the fourth stage of the opening process (FIG. 21)
Figure 19:
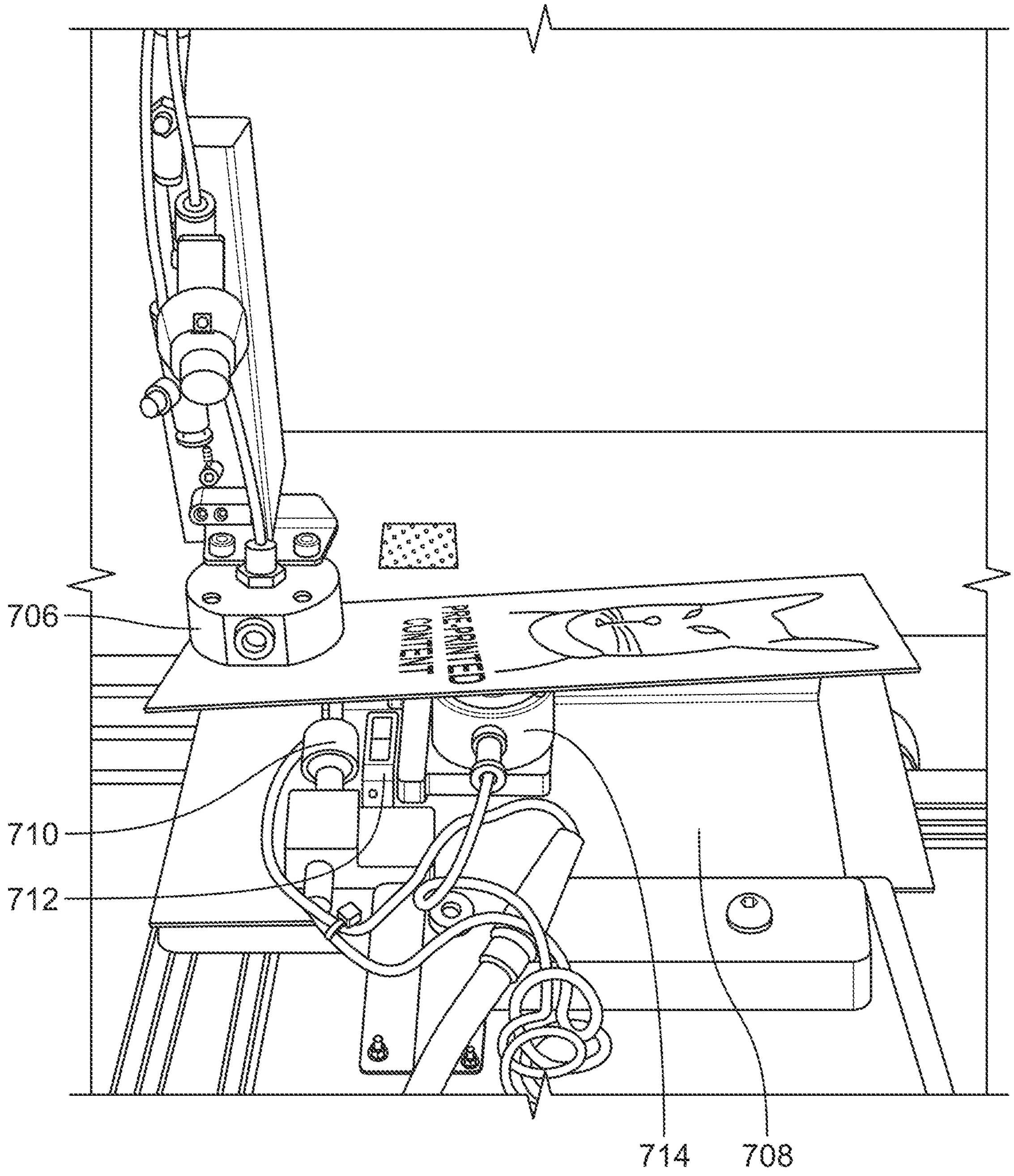
Figure 20:
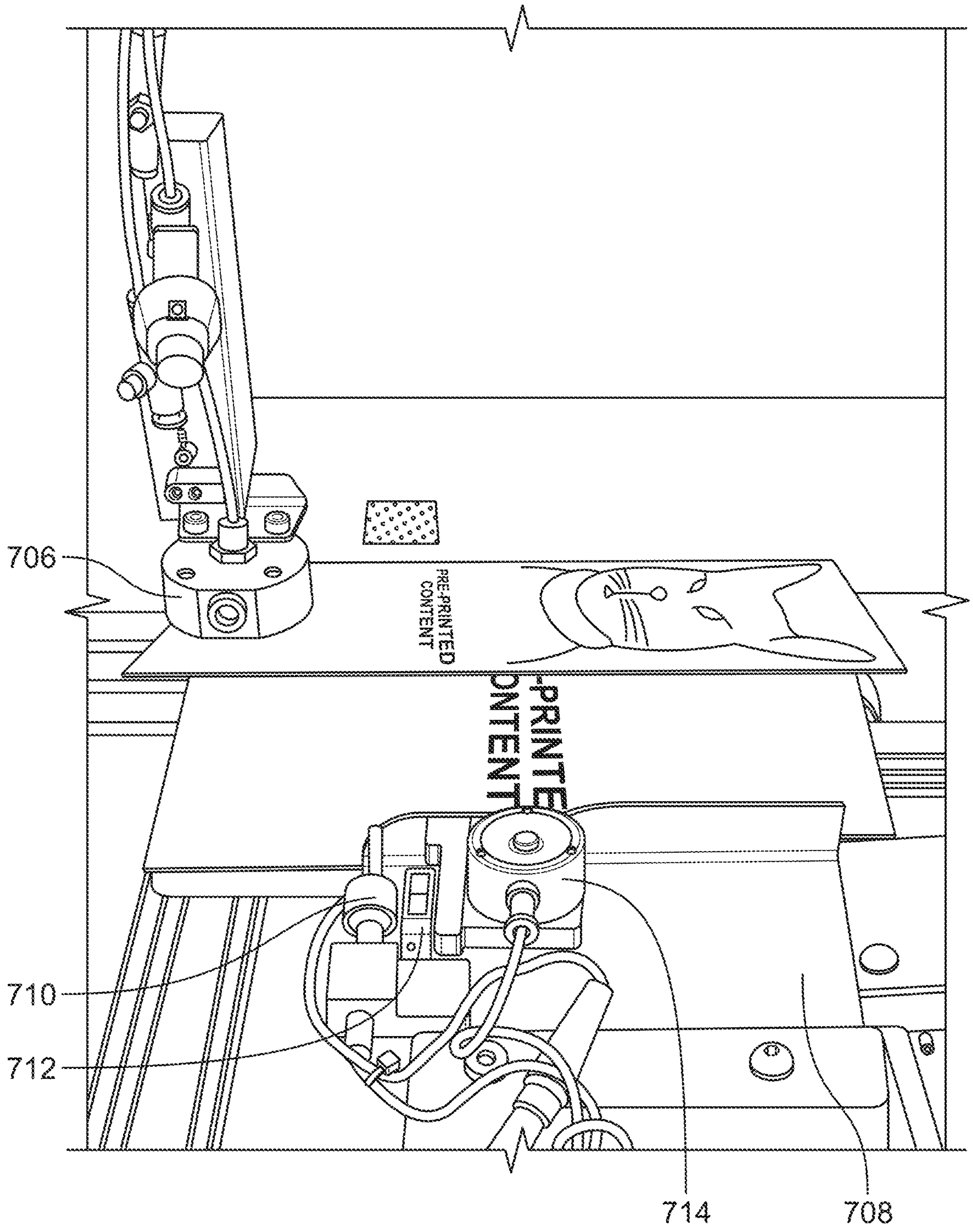

Conveyor system 202 includes various components for automatically opening each greeting card. First, as shown in FIGS. 17 and 18, a Bernoulli cup 706 positioned above card opening conveyor 700 uses moving air to lower the pressure over the top of the greeting card, which causes the higher pressure under the card to begin pushing open the card cover. In this embodiment, Bernoulli cup 706 is mounted on a moveable bracket that allows it to move in the direction of card opening conveyor 700 while opening the card, and then moves back to its initial position in order to provide clearance for further opening of the card.

Figure 21:
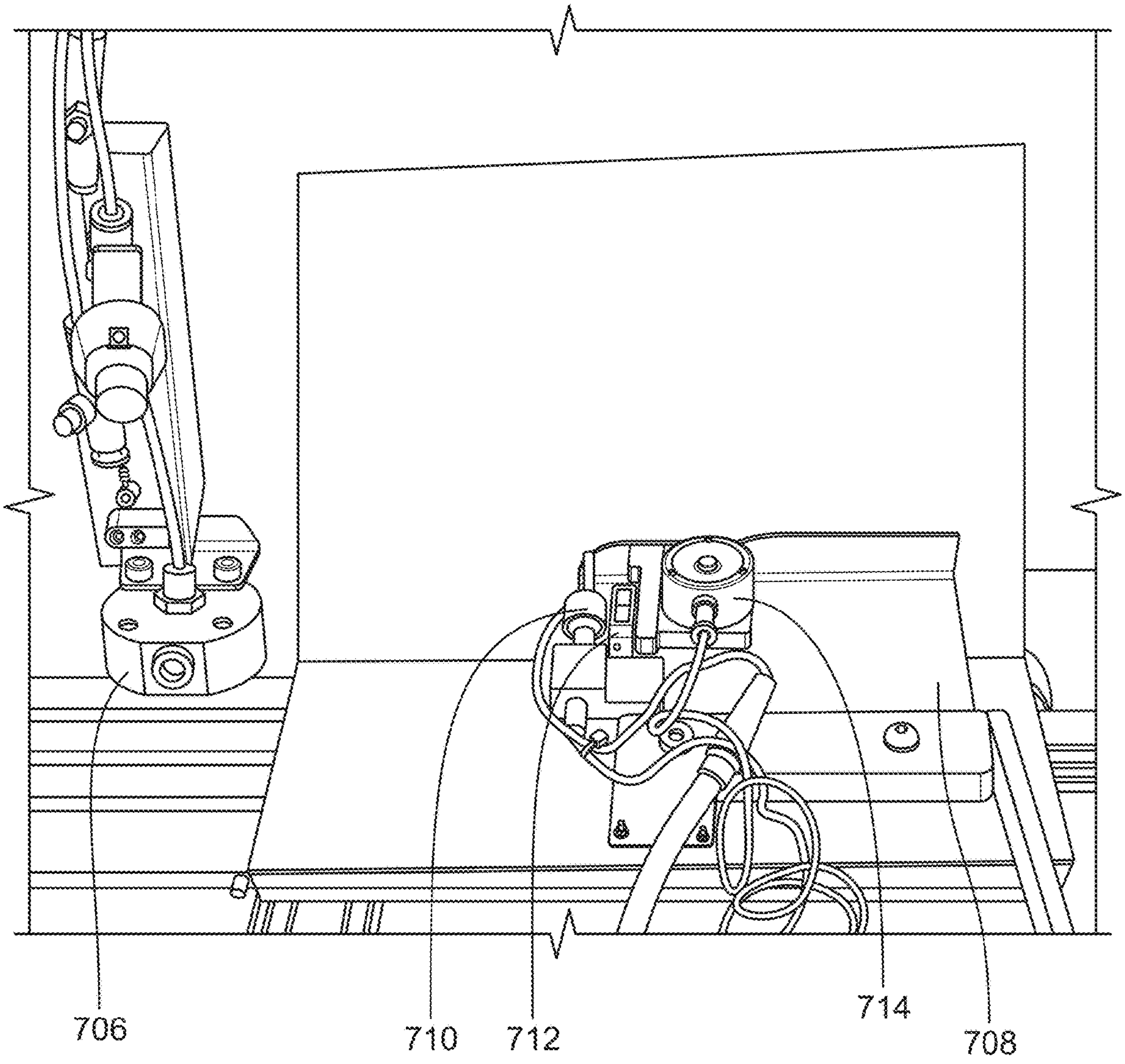

As shown in FIGS. 17 and 21, a mechanical sled 708 is provided that moves toward the greeting card in a direction perpendicular to the direction of card opening conveyor 700 in order to physically push the card open from the inside. As best shown in FIG. 17, mechanical sled 708 mounts a nozzle 710 of an air jet system, a sensor 712, and a Bernoulli cup 714 that enable the opening of greeting cards having an insert secured within the card (e.g., a folded insert having a left insert sheet and a right insert sheet). Thus, the system is able to process both standard folded greeting cards without an insert and those with an insert secured within the card.

For greeting cards with an insert, it is possible that the right insert sheet is pulled up by Bernoulli cup 706 and is starting to fall when mechanical sled 708 moves toward the card (wherein contact with mechanical sled 708 could damage the right insert page). To address this issue, nozzle 710 is activated to emit a burst of air at a force sufficient to blow the right insert sheet upward. Mechanical sled 708 then moves toward the card to the position shown in FIG. 19 in order to partially open the card. Bernoulli cup 714 is then activated to pull the right insert sheet downward onto Bernoulli cup 714. Sensor 712 is then activated to determine whether a right insert sheet is positioned above mechanical sled 708. If a right insert sheet is detected by sensor 712, then mechanical sled 708 retracts to the position shown in FIG. 20 to provide clearance for the right insert sheet to lie down flat on the right inside panel of the greeting card. Mechanical sled 708 then moves toward the card between the left and right insert sheets to the position shown in FIG. 21 in order to fully open the card. If the right insert sheet is not detected by sensor 712 (which would be the case if mechanical sled 702 is already positioned between the left and right insert sheets or the card does not include an insert at all), then mechanical sled 702 does not retract and instead extends further to the position shown in FIG. 21 in order to fully open the card.

As best shown in FIG. 17, conveyor system 202 also includes a photo sensor 712*a* mounted above card opening conveyor 700 that is aligned with a reflective backer 712*b* placed on conveyor frame 702. Photo sensor 712*a* is configured to emit a beam of light toward reflective backer 712*b*, which reflects the light back to photo sensor 712*a*. Photo sensor 712*a* transmits a signal to control system 200 indicating whether the reflected light was detected. If photo sensor 712*a* does not detect the reflected light, which will be the case if the card cover breaks the beam of light emitted by photo sensor 712*a* toward reflective backer 712*b*, then control system 200 determines that the card has been successfully opened. It can be appreciated that photo sensor 712*a* may also detect if a greeting card jams during the card opening process. If an error occurs, card opening conveyor 700 may be stopped and/or control system 200 may transmit an error indicator to server system 110 so that the status of the order may be updated in order database 112.

If the greeting card successfully opened, the card will move from card opening conveyor 700 to print conveyor 460. At this point, the inside surface of the card cover (or the inside surface of the left insert sheet for cards with an insert) engages a physical slide guide 714 that is configured to manipulate the card to a fully open position as the card moves along print conveyor 460. Pressure rollers 716 are positioned to contact the right inside panel of the greeting card (or the right insert sheet for cards with an insert) so as to force the card onto the conveyor belts of print conveyor 460. In this embodiment, card opening conveyor 700 is separated from print conveyor 460 to ensure that the greeting card and envelope arrive to the print location at the same time despite any timing differences in opening the card.

Of course, it should be understood that other type of components may be used to automatically open each pre-decorated greeting card within the scope of the present invention.

Print Zone

With reference to FIG. 2, conveyor system 202 includes various components located within print zone 214 that enable the automated printing of customized content and optionally machine-readable validation marks on the pre-decorated greeting cards and their corresponding envelopes, as well as the application of postage indicia to the envelopes. In addition, each greeting card and corresponding envelope are detected as they pass through print zone 214 to enable each greeting card/envelope pair to be tracked along their respective conveyance paths. It should be understood that any suitable printing system and/or postage applicator may be used within the scope of the present invention.

In one aspect, one or more printers located within print zone 214 are used to print customized content on each of the pre-decorated greeting cards and their corresponding envelopes during transport along their respective conveyance paths. As described above, upon the assignment of an order record (i.e., print job) to each greeting card/envelope pair, control system 200 communicates with server system 110 via communications network 130 to retrieve the card and envelope print files associated with the order record. Control system 200 uses Raster Image Processor (RIP) software to translate each of the card and envelope print files into their color layers for transmission to the one or more printers. It can be appreciated that the card print file is configured to drive the printing of customized card content (e.g., a personalized message) on the customization panel of the pre-decorated greeting card and, similarly, the envelope print file is configured to drive the printing of customized envelope content (e.g., the name and address of the card recipient and optionally the name and address of the card sender) on the customization panel of the envelope corresponding to the pre-decorated greeting card.

In some embodiments, a single printer positioned above both the print conveyor on card line 204 and the print conveyor on envelope line 206 is used to print the customized card content and the customized envelope content on the greeting cards and envelopes, respectively. In this case, the relative speeds of the print conveyors are controlled or adjusted prior to the printing process so that each greeting card and corresponding envelope reach the printer at substantially the same time. In other embodiments, a first printer positioned above the print conveyor on card line 204 is used to print the customized card content on the greeting cards and a second printer positioned above the print conveyor on envelope line 206 is used to print the customized envelope content on the envelopes. In this case, the relative speeds of the print conveyors may be controlled or adjusted prior to or after the printing process—provided each greeting card and corresponding envelope are aligned at the time that the greeting card is inserted into the envelope, as described below.

In some embodiments, printers located within print zone 214 (which may be the same as the printers used to print the customized card content and customized envelope content on the greeting cards and envelopes, respectively) are used to print a machine-readable validation mark on each of the pre-decorated greeting cards and envelopes during transport along their respective conveyance paths. Each machine-readable validation mark may comprise any type of marking that can be used to confirm the pairing between each greeting card and its corresponding envelope, and may be printed in a visible or invisible ink. In one exemplary embodiment, a one-dimensional or two-dimensional barcode (e.g., a Quick Response (QR) code) that encodes the order identifier contained in the order record is printed on the greeting card and envelope of each greeting card/envelope pair. It will be seen that the machine-readable validation marks printed on each greeting card/envelope pair are scanned by imaging devices located within validation zone 216 to confirm the validity of the pairing before the greeting card is inserted into the envelope.

In some embodiments, the card print file includes both the customized card content and the machine-readable validation mark for the greeting card and the envelope print file includes both the customized envelope content and the machine-readable validation mark for the envelope. In other embodiments, there are separate card print files for the customized card content and the machine-readable validation mark for the greeting card and/or separate envelope print files for the customized envelope content and the machine-readable validation mark for the envelope. In either case, control system 200 communicates with server system 100 via communications network 130 to retrieve the card and envelope print files associated with the order record, as described above.

In some embodiments, a postage applicator located within print zone 214 is used to apply a postage indicia to each envelope during transport along its conveyance path. It can be appreciated that envelopes of different sizes require different amounts of postage. In one embodiment, the postage applicator receives information on the required postage from control system 200, which has downloaded the information from server system 110 via communications network 130—i.e., the order record assigned to each greeting card/envelope pair contains postage information. The required postage may be applied by the postage applicator, or, any envelopes requiring additional postage may be diverted to a separate mail bin or other storage container at the end of the conveyor. In another embodiment, the postage indicia applied to each envelope may also be used to track the order through the mail.

In some embodiments, the postage indicia applied to each envelope comprises a traditional adhesive postage stamp with a value recognized by the postal service. In this case, the postage applicator comprises a stamp applicator with a hopper containing a roll of postage stamps, which is positioned adjacent the print conveyor on envelope line 206 and is operative to apply one or more stamps to each envelope during transport along its conveyance path. It should be understood that the order cannot be tracked in these embodiments.

In other embodiments, the postage indicia applied to each envelope comprises a digital postage stamp—either a prepaid digital postage stamp or a non-activated digital postage stamp—with a unique postage code that can be used for tracking purposes. The unique postage code serves as a tracking number and may be provided to the individual who placed the order to enable tracking the order through the mail.

In one embodiment, the digital postage stamp is provided in the form of an adhesive stamp. In this case, the postage applicator comprises a stamp applicator with a hopper containing a roll of digital postage stamps, which is positioned adjacent the print conveyor on envelope line 206 and is operative to apply a digital postage stamp to each envelope during transport along its conveyance path. A scanning device positioned downstream of the stamp applicator is used to scan the digital postage stamp applied to each envelope and determine the unique postage code. The scanning device then transmits the unique postage code to control system 200, which transmits the unique postage code to server system 110 via communications network 130 so that the unique postage code can be added to the appropriate order record in order database 112. If the digital postage stamp is a non-activated digital postage stamp, the unique postage code may also be used to pay/activate the digital postage stamp, which can be done when the unique postage code is added to the order record, upon fulfillment of the order, or in response to other triggering events.

In another embodiment, the digital postage stamp is printed on each envelope during transport along its conveyance path—i.e., the postage applicator comprises a printer that stores a plurality of unique postage codes. A scanning device positioned downstream of the printer is used to scan the digital postage stamp printed on each envelope to determine the unique postage code. The scanning device then transmits the unique postage code to control system 200, which transmits the unique postage code to server system 110 via communications network 130 so that the unique postage code can be added to the appropriate order record in order database 112. If the digital postage stamp is a non-activated digital postage stamp, the unique postage code may also be used to pay/activate the digital postage stamp, which can be done when the unique postage code is added to the order record, upon fulfillment of the order, or in response to other triggering events.

In another embodiment, the digital postage stamps are pre-processed so that the unique postage code of a digital postage stamp is contained in each order record stored in order database 112 prior to the printing process (e.g., the unique postage code may be added to each order record when the order is originally placed). In this case, the envelope print file for each envelope includes an image of the prepaid digital postage stamp. Preferably, the envelope print file also includes the customized envelope content (described above) and optionally the machine-readable validation mark so that control system 200 only has to retrieve a single envelope print file from server system 110. Thus, the envelope print file is configured to drive the printing of both the customized envelope content and the postage indicia on the customization panel of the envelope, and optionally the machine-readable validation mark. If the digital postage stamp is a non-activated digital postage stamp, the unique postage code may be used to pay/activate the digital postage stamp, which can be done upon assignment of the order record to a greeting card/envelope pair (as described above), upon fulfillment of the order, or in response to other triggering events.

In some embodiments, one or more ultraviolet (UV) units located within print zone 214 are used to dry, cure, and/or finish the ink applied by the printer(s) to the greeting cards and corresponding envelopes during transport along their respective conveyance paths. Of course, it should be understood that the ink may be dried in any manner known to those skilled in the art, including those that use UV, air or heat to dry the ink.

Figure 22:
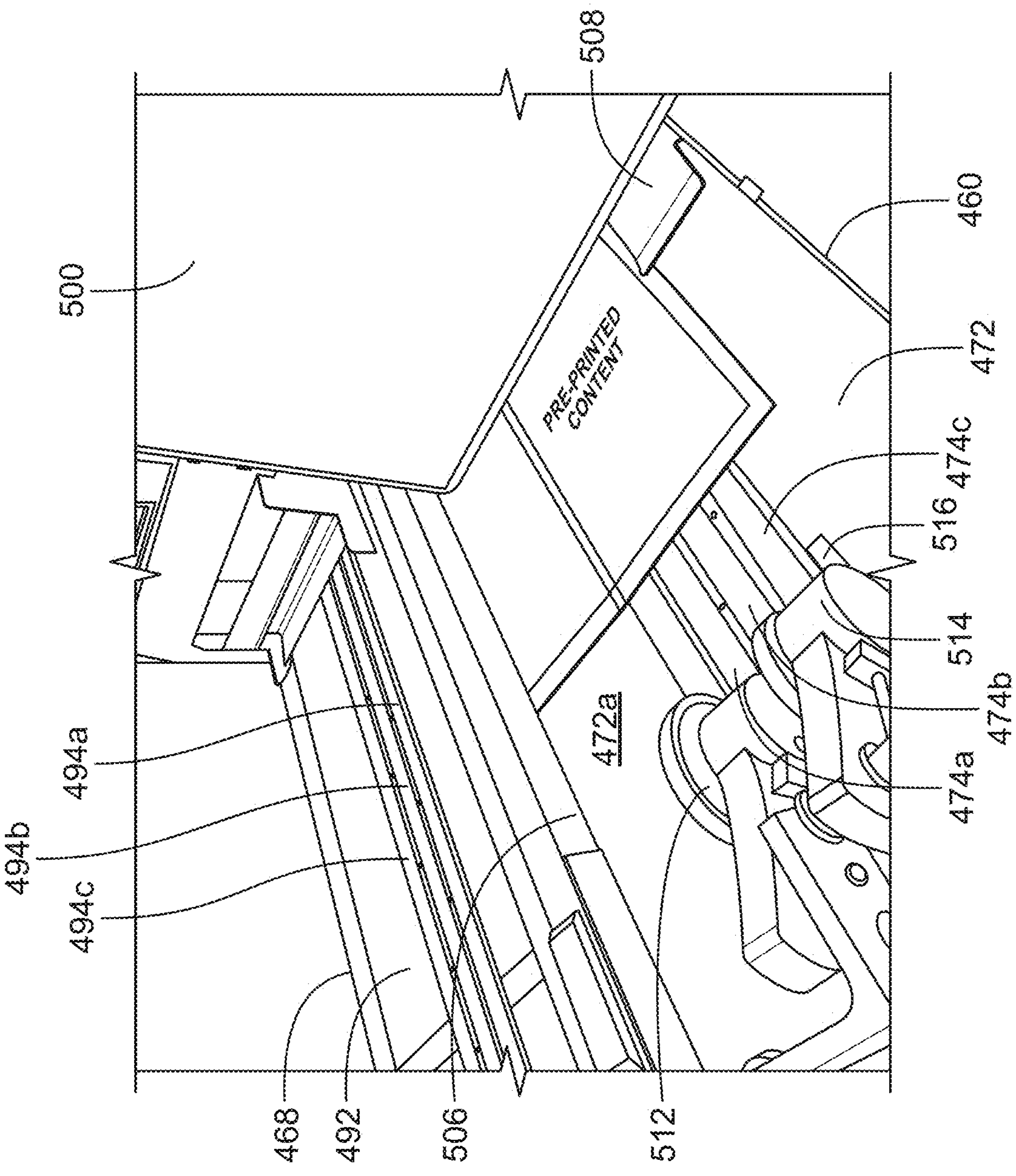
FIGS. 22-24 depict various views of a greeting card passing under a printer along the card line within an exemplary print zone of the conveyor system of FIG. 2, including an input-to-exit perspective view of the card line (FIG. 22), a left-end perspective view of the card line (FIG. 23), and a left-end sectional view of the card line showing the front panel of the greeting card decoupled from the conveyor (FIG. 24)
Figure 23:
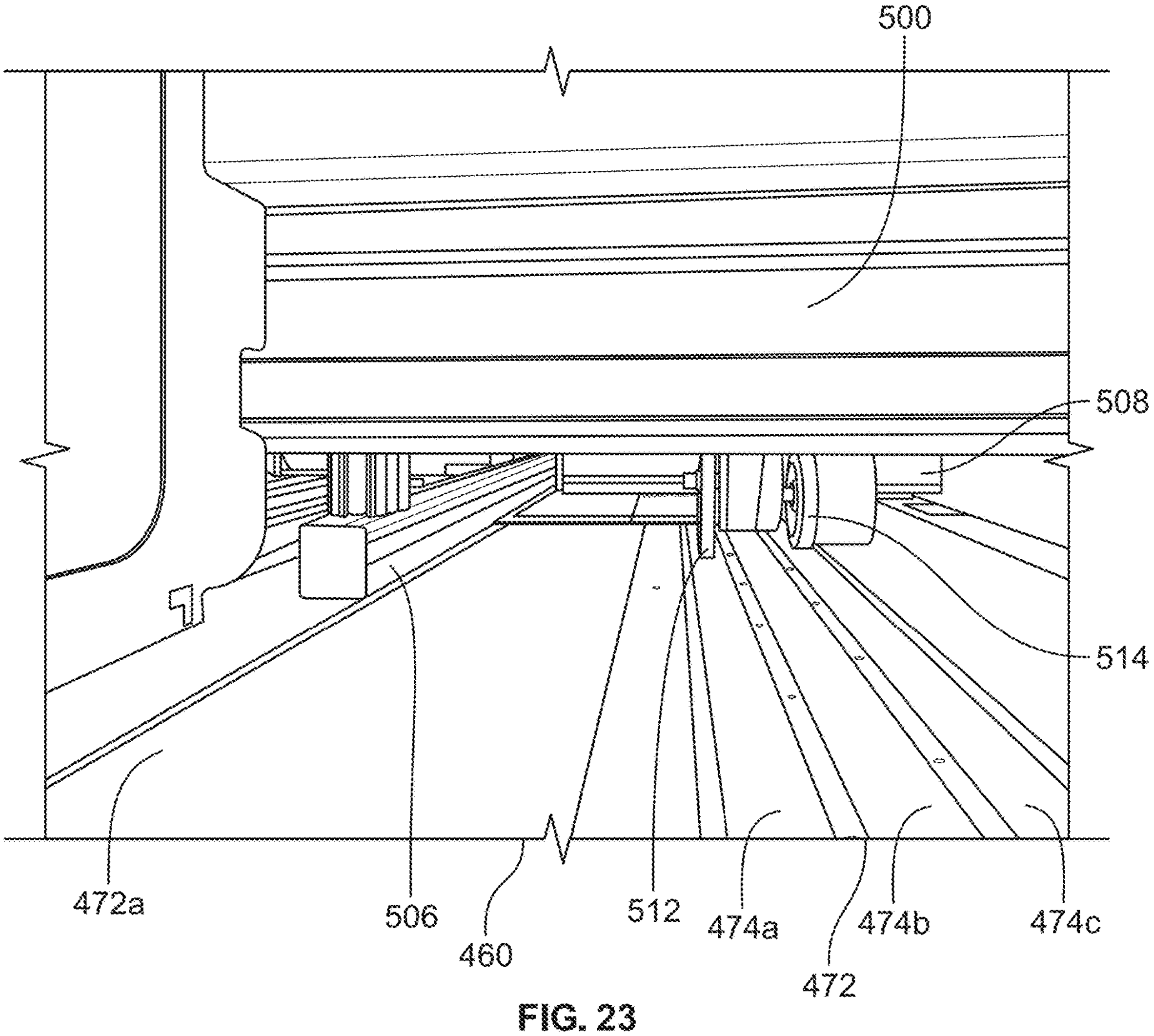
Figure 24:
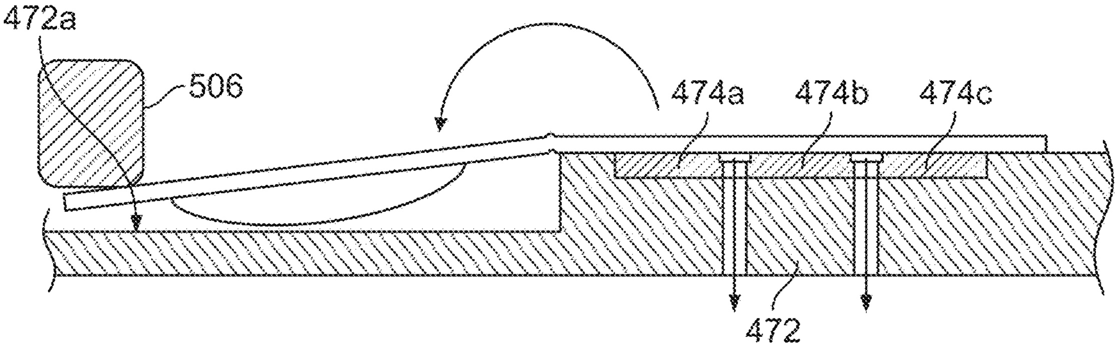

FIGS. 22-24 depict one exemplary embodiment of the various components located within print zone 214 of conveyor system 202. In general, card line 204 includes a printer 500 with a print head positioned above print conveyor 460 for printing customized card content and a machine-readable validation mark on each pre-decorated greeting card during transport along its conveyance path (based on the print information received from control system 200 for each greeting card). Also, envelope line 204 includes a separate printer (not shown) with a print head positioned above print conveyor 468 for printing customized envelope content and a machine-readable validation mark on each envelope during transport along its conveyance path (based on the print information received from control system 200 for each envelope). Envelope line 204 also includes a stamp applicator (not shown) positioned above print conveyor 468 for applying a traditional adhesive postage stamp to each envelope during transport along its conveyance path.

As described above and shown in FIGS. 22-23, print conveyor 460 of card line 204 includes a conveyor frame 472 that supports three moveable conveyor belts 474*a*-474*c*. After the greeting card has been fully opened, the left inside panel of the greeting card passes underneath a physical guide rail 506 that extends along the left side of conveyor frame 472. Guide rail 506 is positioned to retain the greeting card in a slightly over-opened state to ensure that the right inside panel (which is the card's customization panel in this embodiment) is the highest surface for print registration. In addition, a lead-in guide 508 positioned on the right side of conveyor frame 472 is configured to hold down the right inside panel against print conveyor 460 as the greeting card passes underneath printer 500 so as to provide sufficient clearance between the right inside panel and the print head of printer 500. This arrangement ensures that the only portion of the greeting card proximate the print head of printer 500 is the right inside panel, which is provided in a secure position for stabilized printing.

As best shown in FIG. 24, conveyor frame 472 includes a recessed section 472*a* with an elevation that is lower than that of conveyor belts 474*a*, 474*b* and 474*c*. Recessed section 472*a* is positioned below the bottom surface of physical guide rail 506 so as to provide a clearance space 510 therebetween. Because the left inside surface of the greeting card rides along the bottom surface of physical guide rail 506, the front panel of the greeting card is decoupled from print conveyor 472 during transport through print zone 214. As such, any non-planar decorative feature secured to the front panel of the greeting card (e.g., the die-cut cardboard taco attachment shown in FIG. 3A) is positioned within clearance space 510 during transport through print zone 214. Thus, the print head of printer 500 is able to engage the right inside panel of the greeting card without interruption from any decorative feature secured to the front panel of the greeting card.

As shown in FIG. 22, print conveyor 468 of envelope line 206 includes a conveyor frame 492 that supports three moveable conveyor belts 494*a*-494*c*. Similar to lead-in guide 508, envelope line 206 includes two lead-in guides (not shown) positioned on the left and right sides of conveyor frame 492 that are configured to hold down the edges of each envelope against print conveyor 468 as the envelope passes underneath printer (not shown) so as to provide sufficient clearance between the envelope and the print head of the printer.

Referring again to FIGS. 22 and 23, card line 204 also includes an encoder 512 with a wheel riding on conveyor belt 474*a*. Encoder 512 measures the travel speed of the greeting card and transmits the card travel speed to control system 200 to enable a determination of the rate at which printer 500 needs to apply ink. Card line 204 also includes an encoder 514 with a wheel riding on conveyor belt 474*c*. Encoder 514 also measures the travel speed of the greeting card and transmits the card travel speed to a validation module within control system 200 to enable a determination of the rate at which the greeting card needs to be scanned within validation zone 216, as described below.

Although not shown in the drawings, envelope line 206 also includes two encoders that are similar to encoders 512 and 514—i.e., a first encoder with a wheel riding on conveyor belt 494*a* and a second encoder with a wheel riding on conveyor belt 494*c*. The first encoder measures the travel speed of the envelope and transmits the envelope travel speed to control system 200 to enable a determination of the rate at which the envelope printer needs to apply ink. The second encoder also measures the travel speed of the envelope and transmits the envelope travel speed to a validation module within control system 200 to enable a determination of the rate at which the envelope needs to be scanned within validation zone 216, as described below.

As best shown in FIG. 22, card line 204 also includes a photo sensor 516 mounted below print conveyor 460 upstream of printer 500 that is configured to detect the leading edge and the trailing edge of each greeting card as it passes over photo sensor 516. This mounting configuration is preferred so as to detect the relatively undecorated back panel of each greeting care—e.g., in case there is any foil or other decorative features secured to the front panel of the greeting card. Of course, in other embodiments, photo sensor 516 could be mounted above the conveyors if the greeting cards being processed do not include any decorative features on their front panels that could cause an undesired reflection.

Photo sensor 516 transmits a signal to control system 200 upon detection of each of the leading and trailing edges of each greeting card. Upon receipt of the trailing edge signal, control system 200 transmits an activation signal to printer 500 in order to trigger the printing process. The activation signal may include certain printing instructions, such as the rate at which printer 500 needs to apply ink. Control system 200 also uses this signal to define the card position as it passes under printer 500. It should be noted that the trailing edge of each greeting card is used to define the card position because the top edge of some greeting cards may have an irregular shape that is difficult to accurately track (although the leading edge of each greeting card may be used to define the card position if the greeting cards being processed do not have top edges with irregular shapes). Control system 200 also uses the leading and trailing edge signals along with the card travel speed to measure the length of each envelope and compare it to the card length defined in the order record. It can be appreciated that photo sensor 516 may also detect if a greeting card jams during the printing process, if a greeting card is missing during the printing process, or if an unexpected item passes by photo sensor 516. If an error occurs, conveyor system 202 may be stopped and/or control system 200 may transmit an error indicator to server system 110 so that the status of the order may be updated in order database 112.

It should be understood that envelope line 206 also include a photo sensor (not shown) mounted below print conveyor 468 upstream of the envelope printer that is configured to detect the leading edge and the trailing edge of each envelope as it passes over the photo sensor. The photo sensor transmits a signal to control system 200 upon detection of each of the leading and trailing edges of each greeting card. Upon receipt of the leading edge signal, control system 200 transmits an activation signal to the envelope printer in order to trigger the printing process (although the trailing edge signal may be used to trigger the printing process in other embodiments). The activation signal may include certain printing instructions, such as the rate at which the printer needs to apply ink. Control system 200 also uses the leading edge signal to define the envelope position as it passes under the printer (although the trailing edge signal may be used to define the envelope position in other embodiments). Control system 200 also uses the leading and trailing edge signals along with the envelope travel speed to measure the length of each envelope and compare it to the envelope length defined in the order record. It can be appreciated that the photo sensor may also detect if an envelope jams during the printing process, if an envelope is missing during the printing process, or if an unexpected item passes by the photo sensor. If an error occurs, conveyor system 202 may be stopped and/or control system 200 may transmit an error indicator to server system 110 so that the status of the order may be updated in order database 112.

Further, envelope line 206 include a photo sensor (not shown) mounted below print conveyor 468 upstream of the stamp applicator that is configured to detect the leading edge and the trailing edge of each envelope as it passes over the photo sensor. The photo sensor transmits a signal to control system 200 upon detection of each of the leading and trailing edges of each greeting card. Upon receipt of the trailing edge signal, control system 200 transmits an activation signal to the stamp applicator in order to trigger the application of the stamp to the top right corner of the envelope (although the leading edge signal may be used to trigger the stamp application process in other embodiments).

Card line 204 further includes a UV unit positioned above print conveyor 460 downstream of printer 500 that is configured to dry, cure, and/or finish the ink applied to each greeting card in order to prevent smearing. Control system 200 activates and deactivates the UV unit based on the position of each greeting card on print conveyor 460 and the length of the card. Similarly, envelope line 206 includes a UV unit positioned above print conveyor 468 downstream of the envelope printer that is configured to dry, cure, and/or finish the ink applied to each envelope in order to prevent smearing. Control system 200 activates and deactivates the UV unit based on the position of each envelope on print conveyor 468 and the length of the envelope.

Finally, control system 200 adjusts the relative speeds of print conveyors 460 and 468 before or after the printing process so that each greeting card and corresponding envelope are aligned at the time that the greeting card and envelope enter card closing zone 218, as described below.

Figure 25:
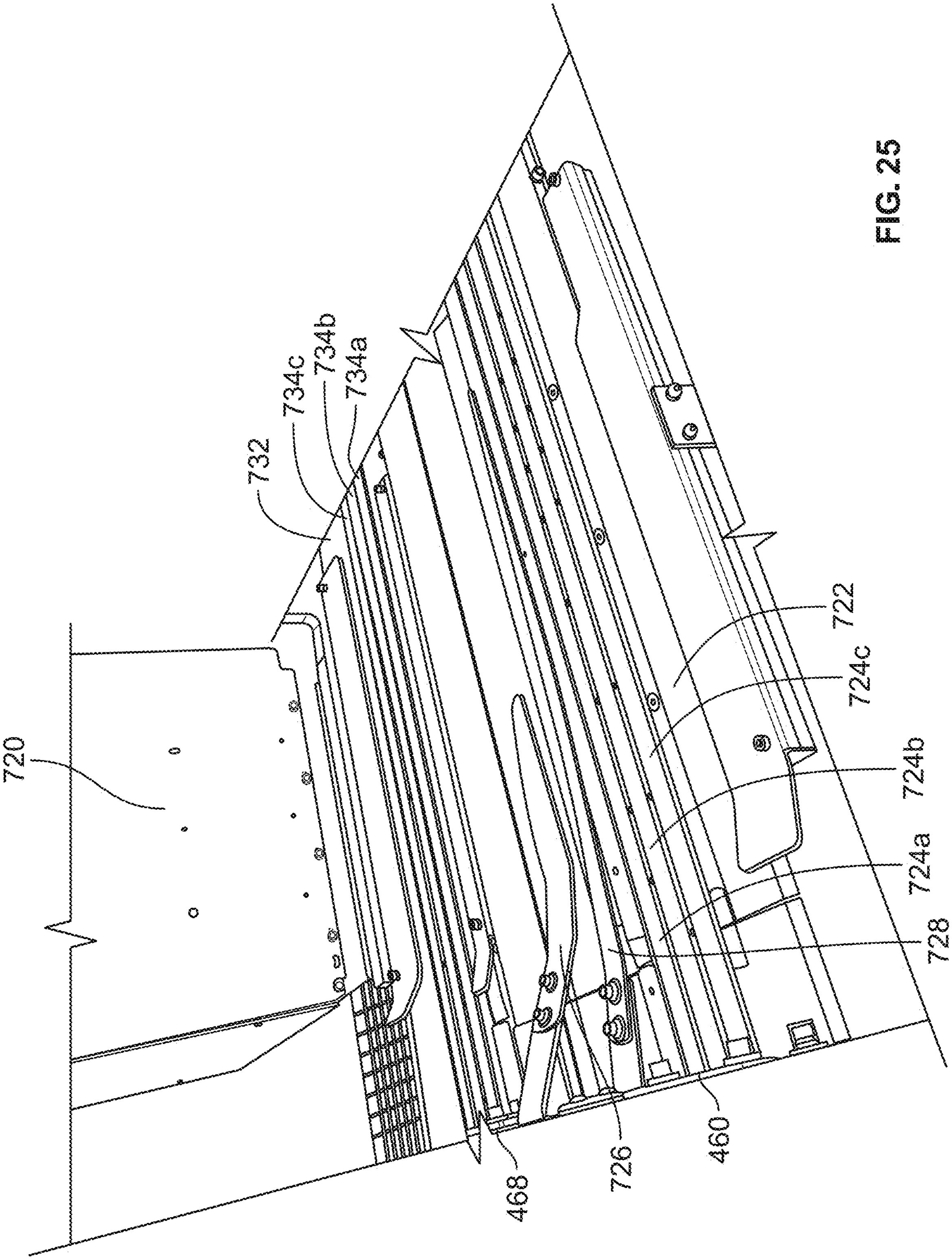
FIG. 25 depicts an input-to-exit perspective view of the card and envelope lines within an alternative print zone of the conveyor system of FIG. 2.

FIG. 25 depicts an alternative embodiment of the various components located within print zone 214 of conveyor system 202. The main difference between this embodiment and the embodiment shown in FIGS. 22-24 described above is that this embodiment uses a single moveable printer 720 to print customized content on the pre-decorated greeting cards and corresponding envelopes. It should be understood that a stamp applicator and/or UV units may also be included within print zone 214 as described above.

In this embodiment, as shown in FIG. 25, print conveyor 460 of card line 204 includes a conveyor frame 722 that supports three moveable conveyor belts 724*a*-724*c* for transporting each pre-decorate greeting card to a printing area. A guide 726 is positioned to retain the greeting card cover in the open position so that the print head of printer 720 can pass over the card cover during the printing process. For greeting cards with an insert, a metal tension strip 728 is provided to hold down the left insert sheet, and an air jet (not shown) is activated to ensure that the right insert sheet lies flat while the greeting card moves below a printing guard. It can also be seen that print conveyor 468 of envelope line 206 includes a conveyor frame 732 that supports three moveable conveyor belts 734*a*-734*c* for transporting each envelope to a printing area.

In this embodiment, a single moveable printer 720 is used to print customized content on the greeting cards and corresponding envelopes (wherein each card and corresponding envelope are held in a stationary position during the printing process). First, printer 720 moves above print conveyor 468 of envelope line 206 so that the print head is positioned to print the customized envelope content on the envelope (based on the print information received from control system 200 for each envelope). Printer 720 then moves above print conveyor 460 of card line 204 so that the print head is positioned to print the customized card content on the pre-decorated greeting card (based on the print information received from control system 200 for each greeting card). Thus, the customized content is printed on the envelope and greeting card in a single pass. Additional passes (one-directional or two-directional) may also be used to print additional customized content as required.

It should be understood that other type of components may be used to automatically print customized content and optionally machine-readable validation marks on the pre-decorated greeting cards and their corresponding envelopes, as well as apply postage indicia to the envelopes, within the scope of the present invention. In addition, other post-printing processes may be implemented within print zone 214, such as the application of glitter, foil, digital embellishments, physical design elements or other decorative features to one or more panels of the greeting card, the application of heat-raised inks to one or more panels of the greeting card using virko or thermal printing, die cutting one or more panels of the greeting card, and other greeting card processes known to those skilled in the art.

Validation Zone

With reference to FIG. 2, conveyor system 202 includes various components located within validation zone 216 that enable the customized greeting cards and envelopes to be inspected "on the fly" during transport along their respective conveyance paths. In one exemplary embodiment, one imaging device is used to capture an image of each customized greeting card and another imaging device is used to capture an image of each customized envelope. The imaging devices are controlled by a validation module within control system 200, which uses the card travel speed and the envelope travel speed received from the encoders located within print zone 214 to determine the rate at which the greeting card and envelope need to be scanned. The imaging devices then transmit the images to the validation module within control system 200, which analyzes the images to validate certain features of the customized greeting cards and envelopes.

In some embodiments, the validation module within control system 200 validates that each greeting card has been correctly paired with its corresponding envelope. In the exemplary embodiment, the pairing is validated by decoding the order identifiers from the machine-readable validation marks (e.g., QR codes) printed on the greeting card and envelope of each greeting card/envelope pair. If the order identifier of the greeting card matches the order identifier of the envelope, then the pairing is validated. It can be appreciated that this validation step may not be required if a single printer is used to print the customized content on both the pre-decorated greeting card and envelope because the risk that the greeting card is not paired with its envelope is low in this embodiment.

In some embodiments, the validation module within control system 200 also validates that the correct customized content has been printed on each greeting card/envelope pair. In the exemplary embodiment, one or both of the machine-readable validation marks (e.g., QR codes) printed on the greeting card and envelope are decoded to determine the order identifier. If the decoded order identifier matches the order identifier contained in the order record assigned to the greeting card/envelope pair (which determines the card and envelope print files used during the printing process), then the printed customized content is validated.

In some embodiments, the validation module within control system 200 may also validate that the postage indicia has been correctly applied to each customized envelope, and further checks the print quality of the customized card and envelope content printed on each greeting card and envelope, respectively. Of course, other features may also be validated within the scope of the present invention.

In the exemplary embodiment, the validation module within control system 200 stores the images of the customized greeting cards and envelopes, as well as validation information relating to the validation processes described above. Control system 200 also provides the validation information to server system 110 for storage in order database 112 along with the other order data.

Card Closing Zone

With reference to FIG. 2, conveyor system 202 includes various components located within card closing zone 218 that enable each of the pre-decorated greeting cards to be automatically closed during transport along its conveyance path. It should be understood that the card closing mechanism may include a variety of different components, such as an air jet system, a physical slide guide, a mechanical arm, and other types of mechanical, magnetic, suction, or blowing components known in the art. In addition, each greeting card is detected as it passes through card closing zone 218 to enable each greeting card to be tracked along its conveyance paths.

Figure 26:
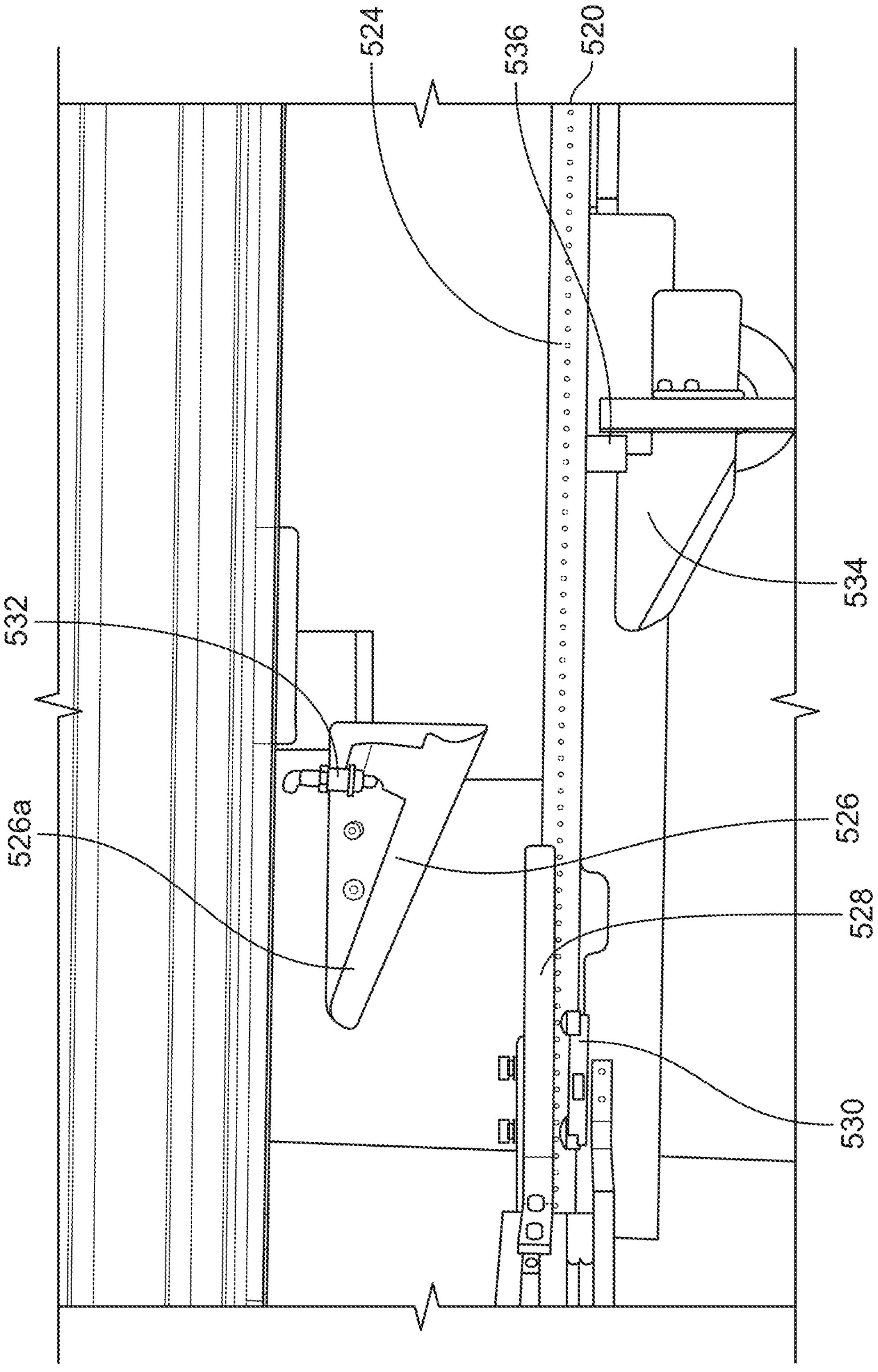
FIGS. 26-27 depict various views of the card line within an exemplary card closing zone of the conveyor system of FIG. 2, including a top view of the card line (FIG. 26) and an exit-to-input perspective view of the card line (FIG. 27)
Figure 27:
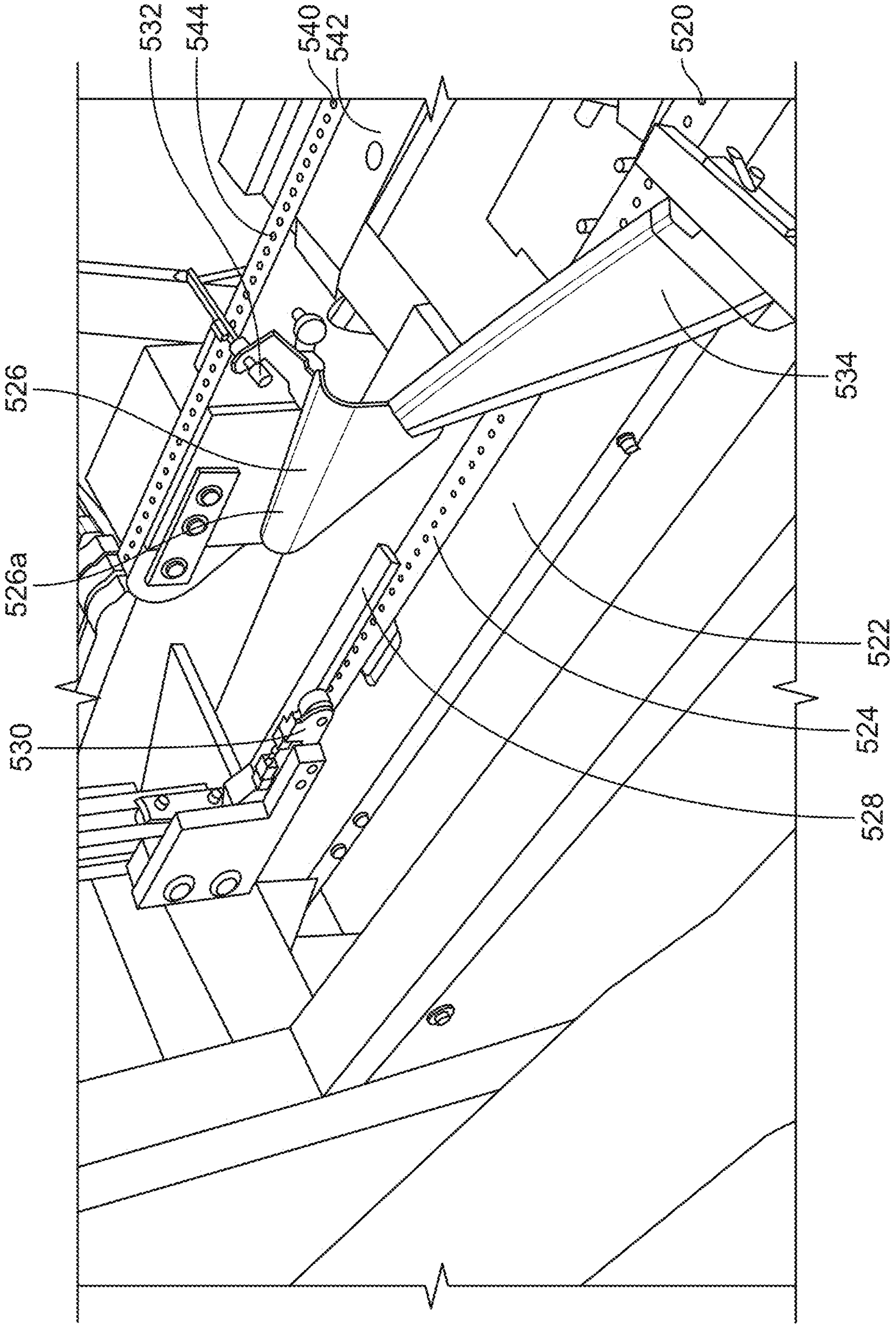

FIGS. 26-31 depict one exemplary embodiment of the various components located within card closing zone 218 of conveyor system 202. FIGS. 26 and 27 show card closing zone 218 in an inoperative state, and FIGS. 28-31 show card closing zone 218 in an operative state with a greeting card being closed while transported along card line 204.

As best shown in FIGS. 26 and 27, card line 204 includes an indexing conveyor 520 comprised of a conveyor frame 522 (which is not moveable) that supports a single moveable conveyor belt 524. A suction system provides air suction through air holes in conveyor belt 524 so as to pull each greeting card downward onto indexing conveyor 520. In this embodiment, the suction system is powered with a vacuum pump connected to the air holes. The suction force is higher along indexing conveyor 520 compared to that of print conveyor 460, which may be achieved through the use of fewer air holes connected to the vacuum pump (not shown in the drawings).

Conveyor system 202 includes various components for automatically closing each greeting card, i.e., moving the first card page (i.e., the card cover) toward the second card page, so that the card may be inserted into its corresponding envelope, as described below.

Figure 28:
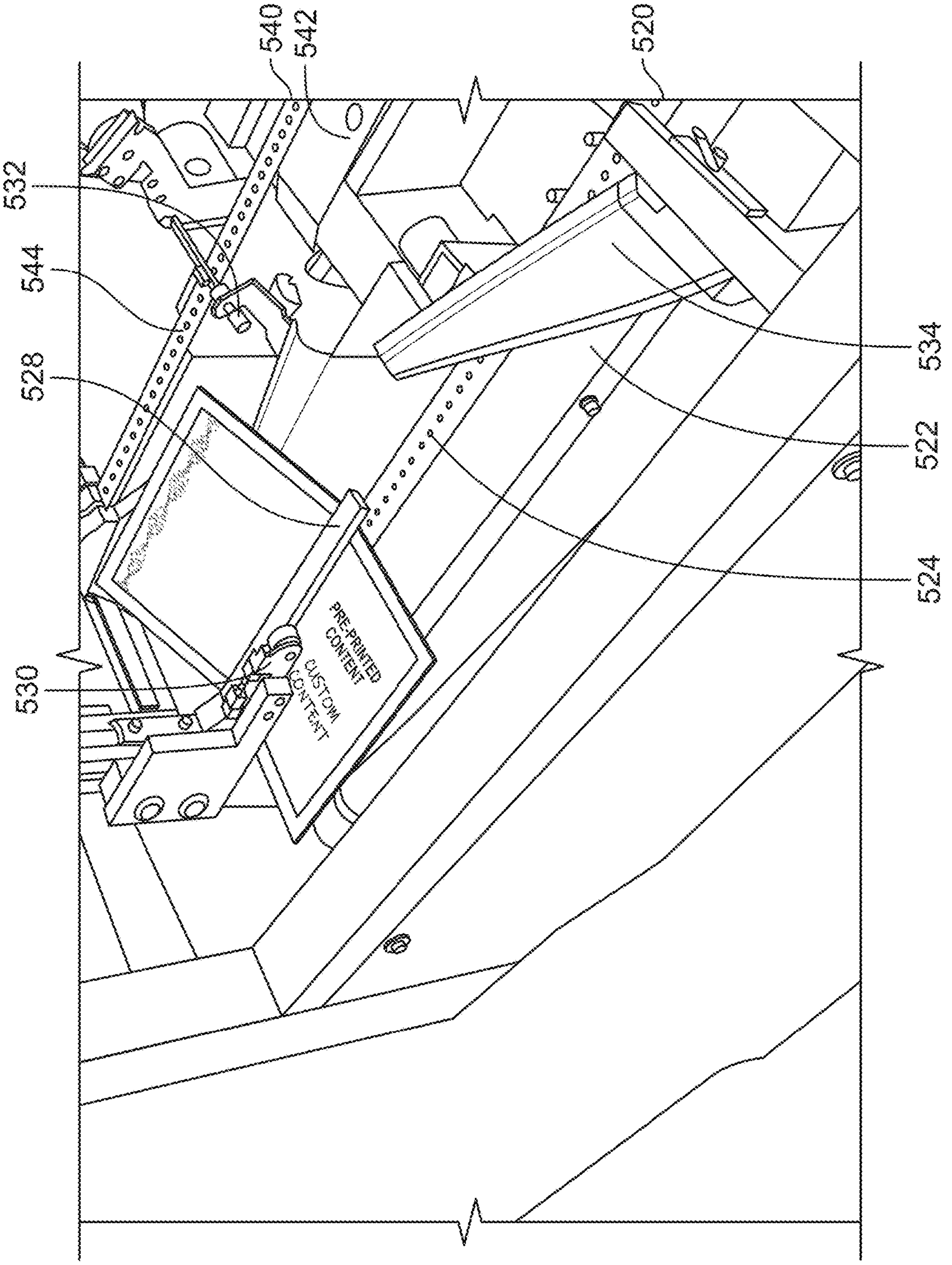
FIGS. 28-31 depict various views of the card line of FIGS. 26-27 with a greeting card being closed while transported along the card line, including an exit-to-input perspective view of the card line during the first stage of the closing process (FIG. 28), a top view of the card line during a second stage of the closing process (FIG. 29), an exit-to-input perspective view of the card line during the third stage of the closing process (FIG. 30), and an input-to-exit perspective view of the card line during the fourth stage of the closing process (FIG. 31)

First, as shown in FIGS. 26-28, the opened card cover engages a physical slide guide 526 with a front section **526*a* positioned below the lowest potential point of the opened card cover so that slide guide 526 raises the card cover as the greeting card moves along indexing conveyor 520. As best shown in FIG. 28, a guide bar 528 extends along the left edge of the right inside panel of the greeting card to prevent the card from lifting off of conveyor belt 524 as the card cover is raised by slide guide 526. In addition, pressure rollers 530 are positioned to contact the right inside panel of the greeting card so as to force the second card page onto conveyor belt 524** and prevent the card from twisting or shifting during the card closing process.

Figure 29:
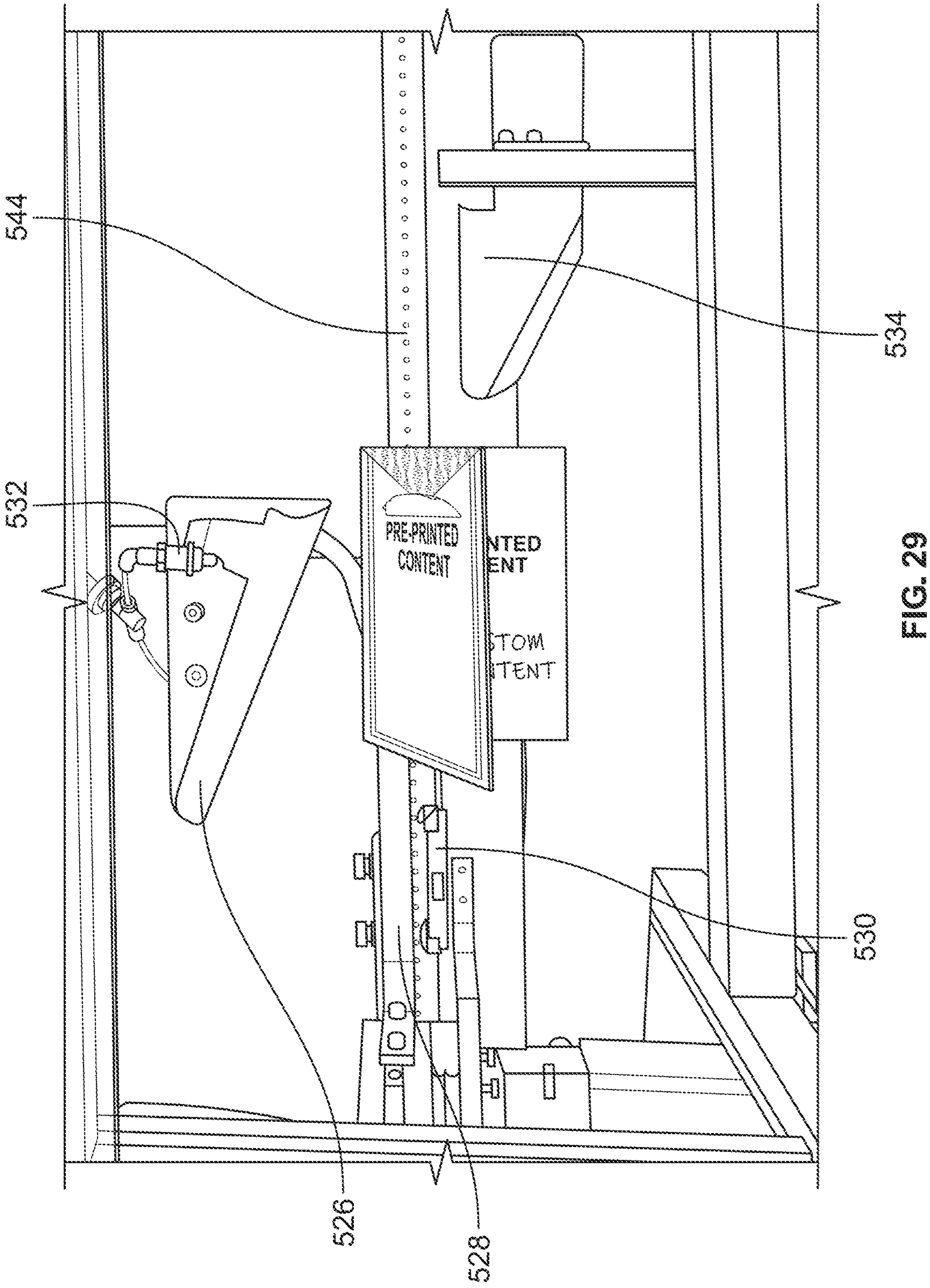
Figure 30:
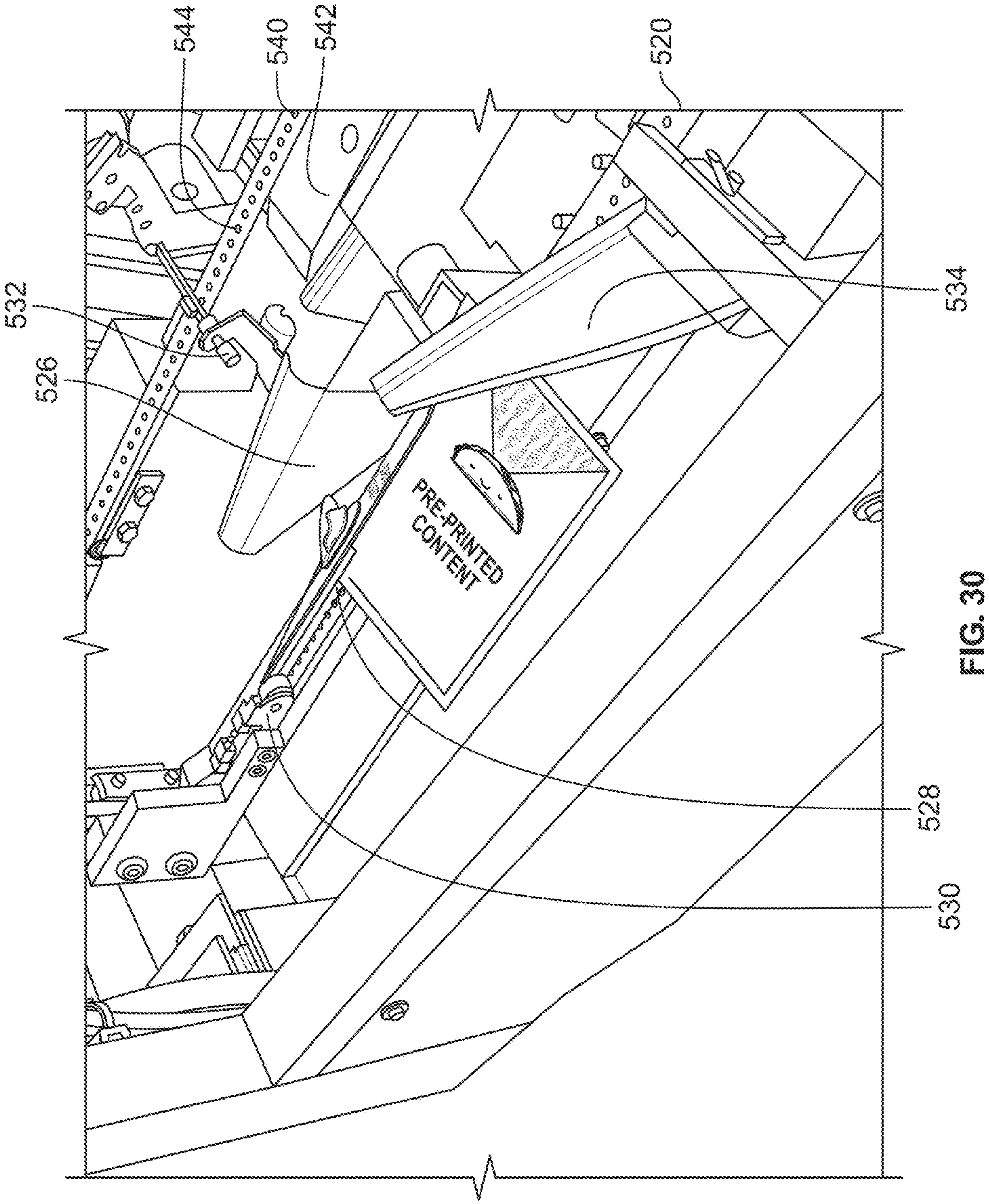
Figure 31:
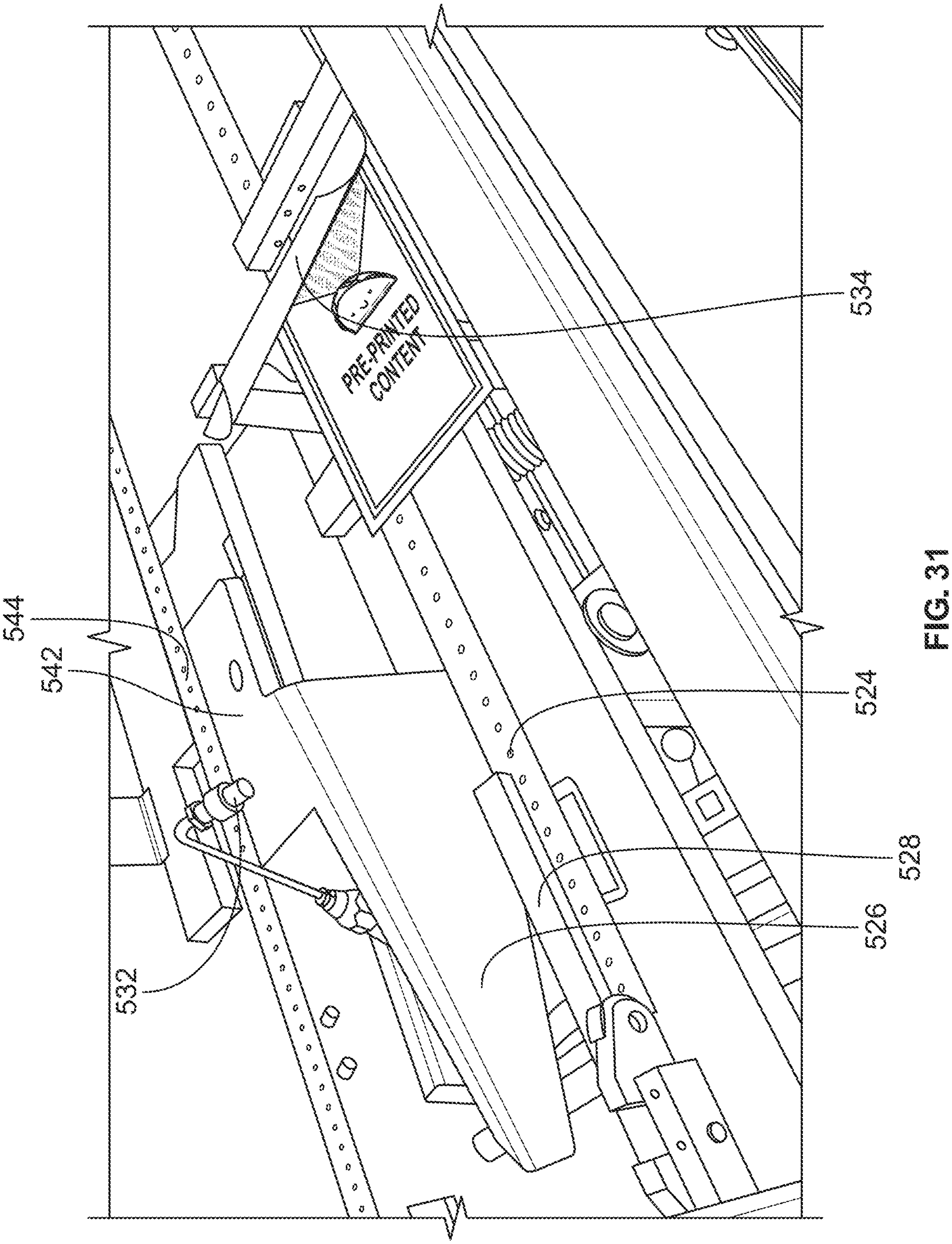

Next, as shown in FIGS. 26-27 and 29, an air jet system with a nozzle 532 positioned above the surface of conveyor belt 524 emits a burst of air at a force sufficient to close the card cover, while not completely blowing the card off conveyor belt 524. Control system 200 is configured to activate and deactivate the air jet system based on the location of the greeting card, the length of the card, and the conveyor speed. In addition, as best shown in FIGS. 30-31, the greeting card engages a physical slide guide 534 that is configured to manipulate the card cover to a fully closed position as the greeting card moves along indexing conveyor 520.

As best shown in FIG. 26, card line 204 also includes a photo sensor 536 mounted below indexing conveyor 520 that is configured to detect the leading edge and the trailing edge of each greeting card as it passes over photo sensor 536. This mounting configuration is preferred so as to detect the relatively undecorated back panel of each greeting card—e.g., in case there is any foil or other decorative features secured to the front panel of the greeting card. Of course, in other embodiments, photo sensor 536 could be mounted above the conveyors if the greeting cards being processed do not include any decorative features on their front panels that could cause an undesired reflection.

Photo sensor 536 transmits a signal to control system 200 upon detection of each of the leading and trailing edges of each greeting card. Control system 200 uses the trailing edge signal to define the card position on indexing conveyor 520 and aid in final registration of the card position prior to insertion of the greeting card into the envelope, as described below (although the leading edge signal may be used to define the card position in other embodiments). It can be appreciated that the photo sensor 536 may also detect if a greeting card jams prior to the insertion process or if a greeting card is missing prior to the insertion process. If an error occurs, conveyor system 202 may be stopped and/or control system 200 may transmit an error indicator to server system 110 so that the status of the order may be updated in order database 112.

Of course, it should be understood that other types of components may be used to automatically close each customized greeting card within the scope of the present invention.

Card and Envelope Coupling Zone

With reference to FIG. 2, conveyor system 202 includes various components located within card and envelope coupling zone 220 that enable each greeting card to be automatically inserted into its corresponding envelope during transport along their respective conveyance paths. In some embodiments, card and envelope coupling zone 220 is located on envelope line 206 at a position that is generally adjacent card closing zone 218 on card line 204. This enables the envelope to be manipulated to a position that is ready for greeting card insertion while the card is being closed. In other embodiments, card and envelope coupling zone 220 is located downstream of card closing zone 218 such that the greeting card is closed prior to manipulation of the envelope to a position that is ready for greeting card insertion. Preferably, the components located within card and envelope coupling zone 220 enable the coupling of greeting cards/envelope pairs of varying sizes.

Figure 32:
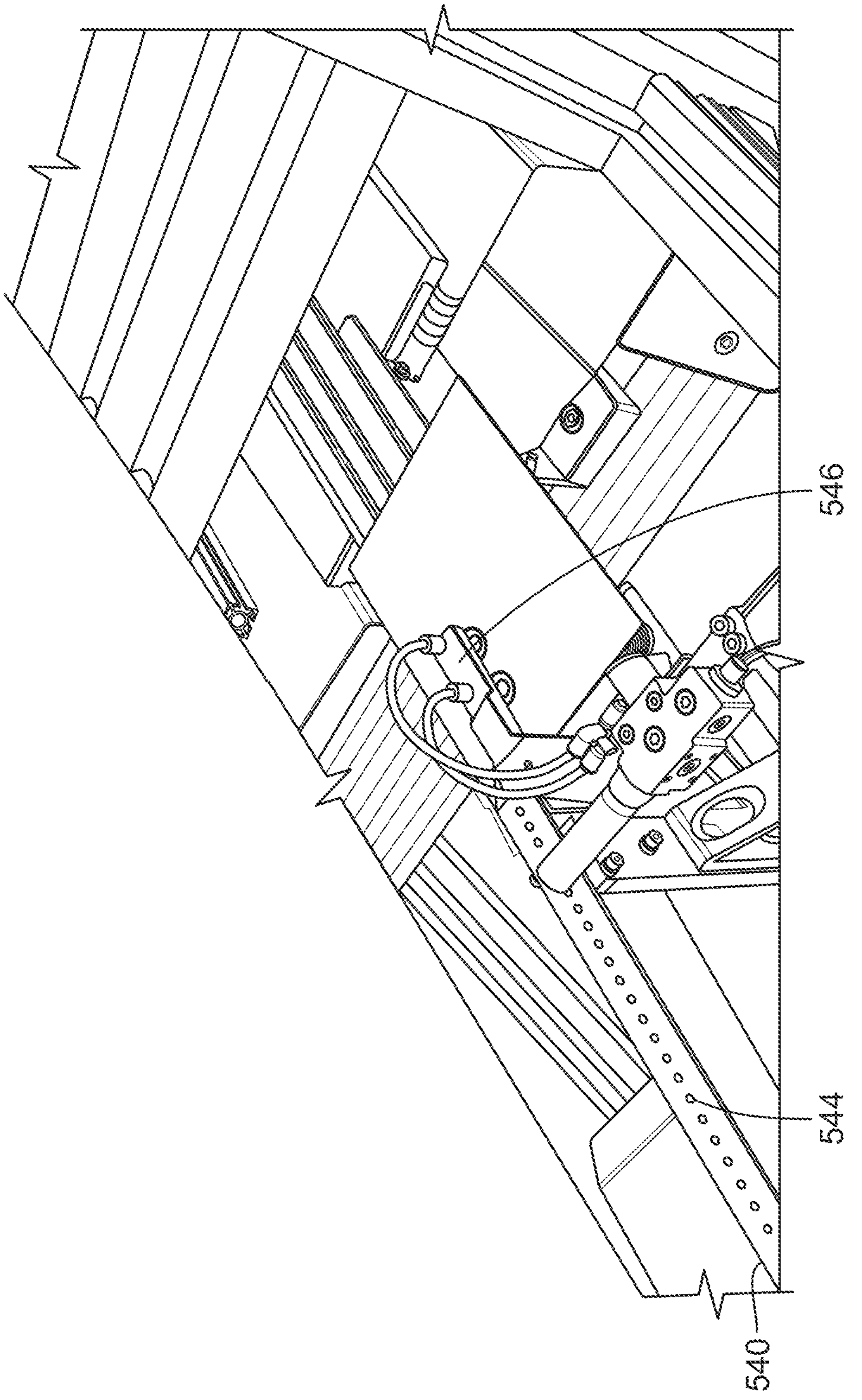
FIGS. 32-36 depict various views of the envelope line within an exemplary card and envelope coupling zone of the conveyor system of FIG. 2, including an exit-to-input perspective view of the envelope line during the first stage of the coupling process (FIG. 32), a top view of the envelope line during the second stage of the coupling process (FIG. 33), an input-to-exit perspective view of the envelope line during the third stage of the coupling process (FIG. 34), and a front view of the envelope line during the third stage of the coupling process (FIG. 35), and a top view of an exemplary envelope insertion guide used during the fourth and fifth stages of the coupling process (FIG. 36)
Figure 33:
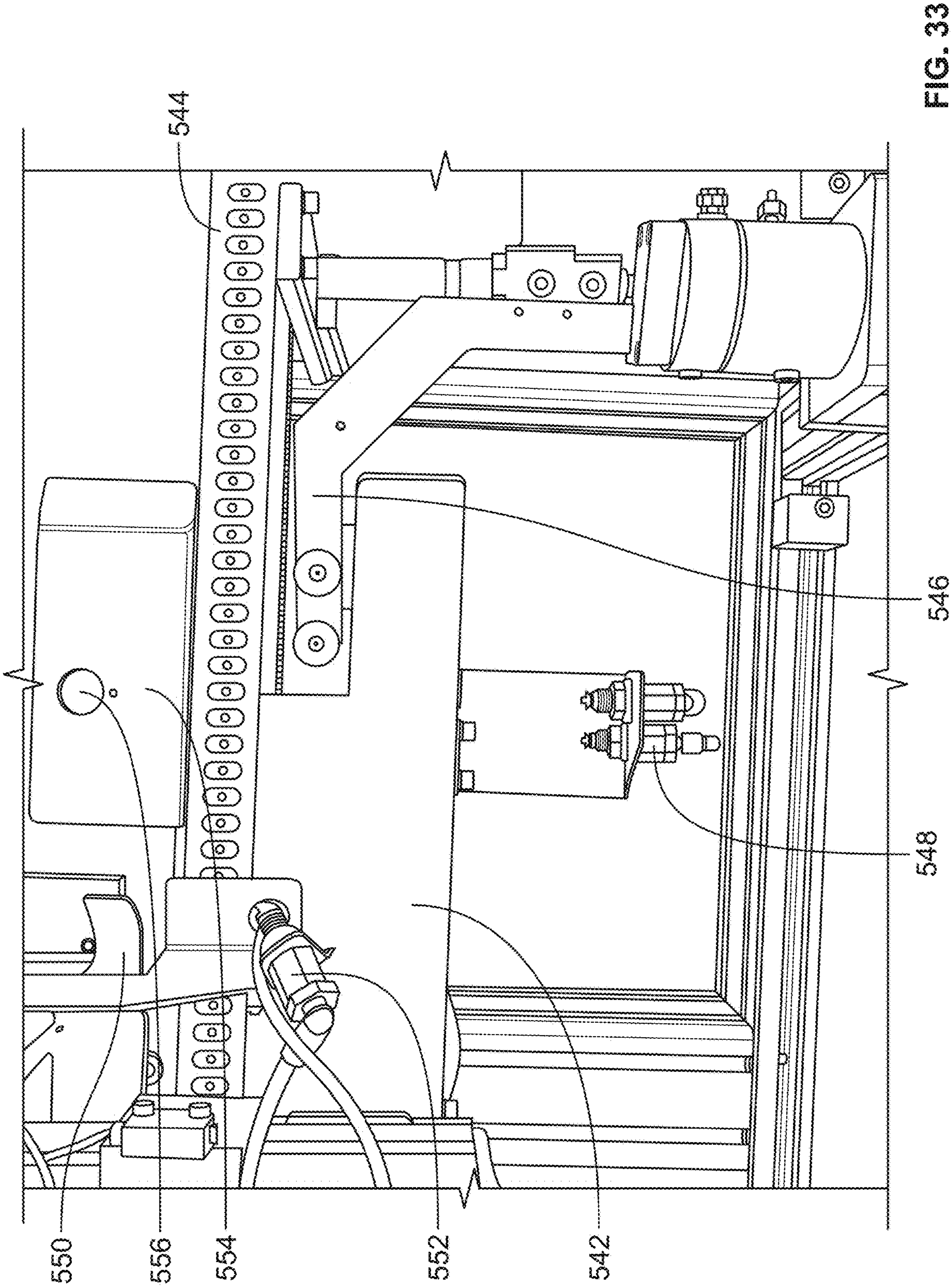
Figure 34:
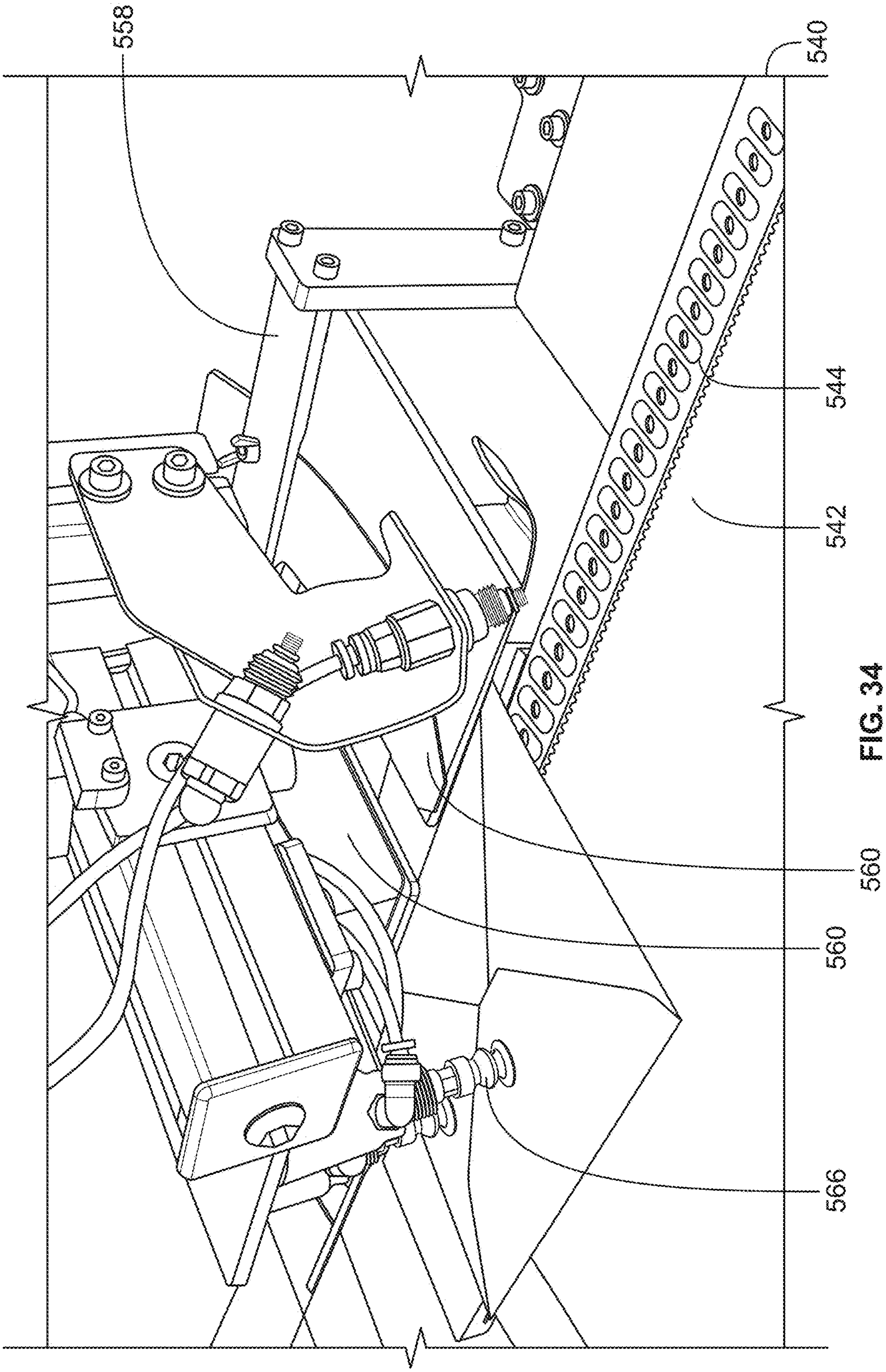
Figure 35:
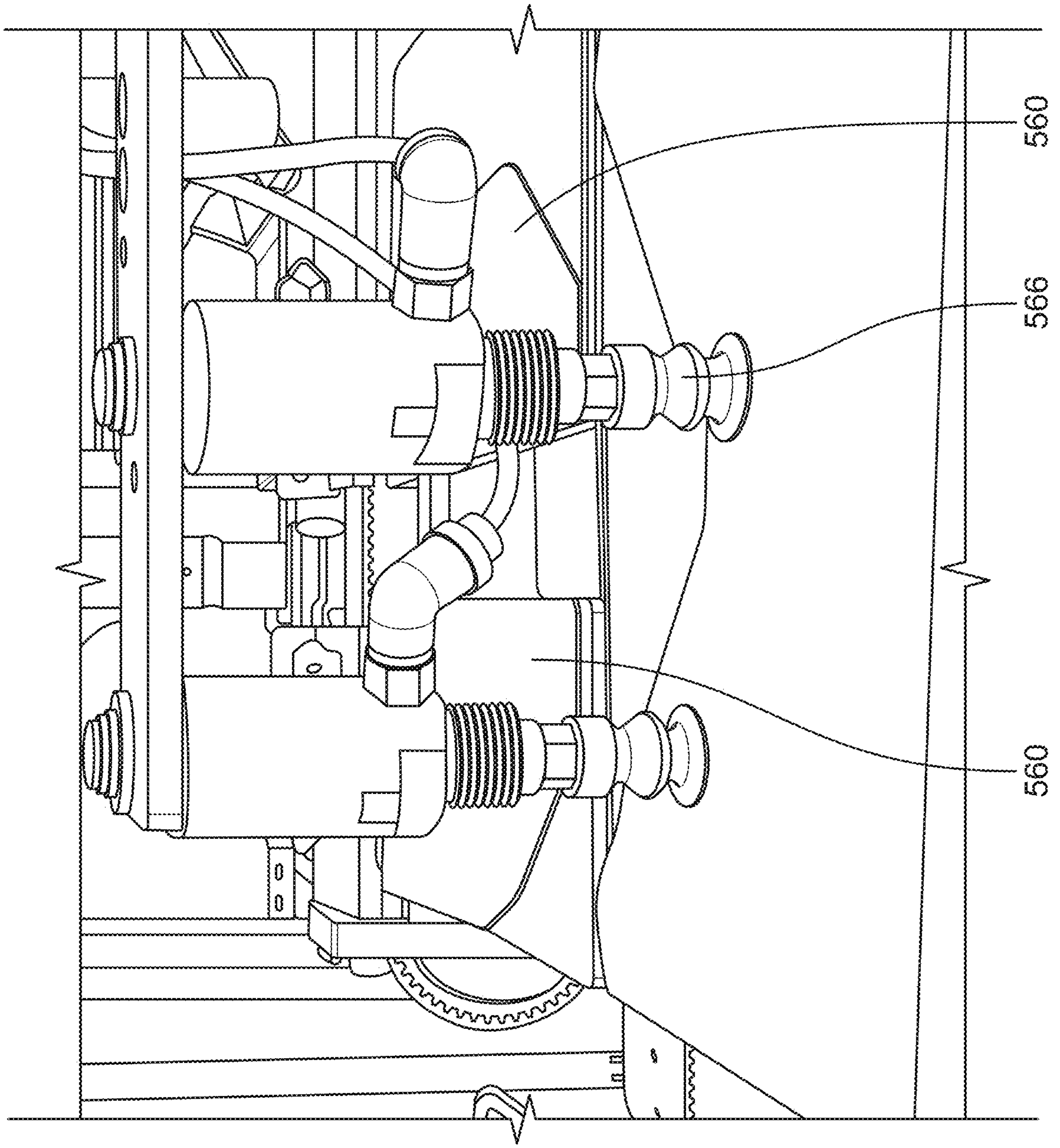
Figure 36:
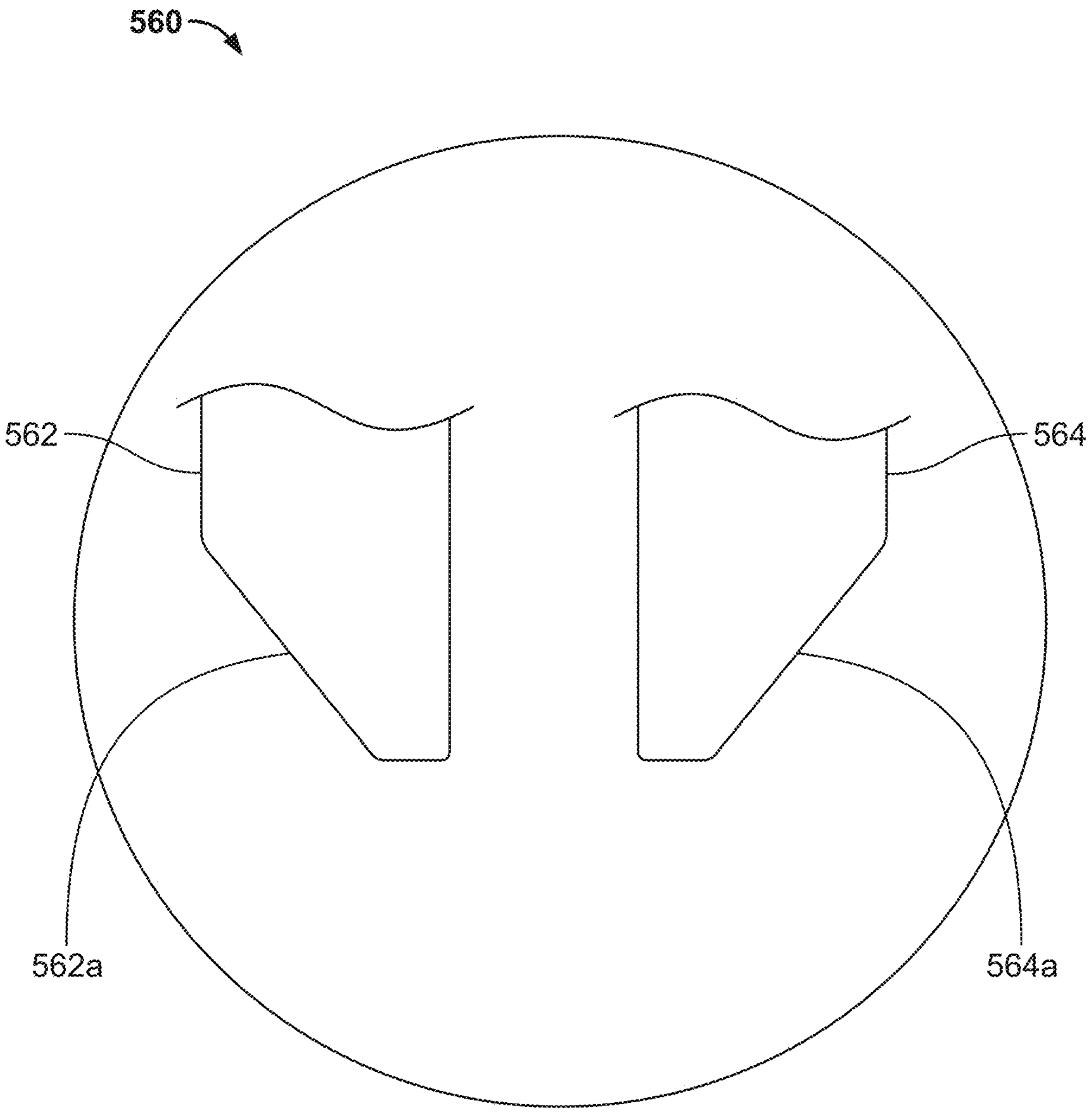

FIGS. 32-36 depict one exemplary embodiment of the various components located within card and envelope coupling zone 220 of conveyor system 202. FIG. 33 shows card and envelope coupling zone 220 in an inoperative state, and FIGS. 32 and 34-35 show card and envelope coupling zone 220 in an operative state with an envelope being manipulated to a position that is ready for greeting card insertion while transported along envelope line 206 (and FIG. 36 shows the configuration of an envelope insertion guide used in the coupling process).

As shown in FIGS. 32 and 34, envelope line 206 includes an indexing conveyor 540 comprised of a conveyor frame 542 (which is not moveable) that supports a single moveable conveyor belt 544. A suction system provides air suction through air holes in conveyor belt 544 so as to pull each envelope downward onto indexing conveyor 540. In this embodiment, the suction system is powered with a vacuum pump connected to the air holes. The suction force is higher along indexing conveyor 540 compared to that of print conveyor 468, which may be achieved through the use of fewer air holes connected to the vacuum pump (not shown in the drawings).

Conveyor system 202 includes various components for automatically manipulating the envelope to a position that is ready for greeting card insertion, as described below.

First, as shown in FIG. 32, an envelope flipping mechanism is configured to flip over each envelope while traveling on indexing conveyor 540—i.e., the envelope is manipulated from a position in which its front face is facing upward (which facilitated printing of the customized envelope content on the envelope) to a position in which its back is facing upward. In this embodiment, the envelope flipping mechanism comprises a vacuum cup arm 546 with pneumatic suction that is operative to (1) pick up the envelope on its front face (as shown in FIG. 32) and rotate 180° counterclockwise to expose the back of the envelope and then (2) rotate 180° clockwise back to its initial position in order to pick up the next envelope.

As shown in FIG. 33, once the envelope has been flipped, a flap opening mechanism is configured to open the envelope flap on the back of the envelope. In this embodiment, the flap opening mechanism comprises air jets 548 that emit a burst of air at a force sufficient to open the envelope flap. The envelope then moves forward on indexing conveyor 540 to a position in which the envelope flap is held open below a physical guide 550. Air jets 552 may also be used to emit a burst of air at a force sufficient to hold the envelope flap open as the envelope flap moves below physical guide 550. At this point, the left edge of the envelope is precisely aligned in the position shown in FIG. 34.

Referring back to FIG. 33, the envelope flap is supported by a support bracket 554 that includes an opening 556 through the bracket. A photo sensor (not shown) mounted above support bracket 554 is aligned with a reflective backer (not shown) positioned below opening 556. The photo sensor is configured to emit a beam of light toward the reflective backer, which reflects the light back to the photo sensor. The photo sensor transmits a signal to control system 200 indicating whether the reflected light was detected. If the photo sensor does not detect the reflected light, which will be the case if the envelope flap breaks the beam of light emitted by the photo sensor toward the reflective backer, then control system 200 determines that the envelope flap has been successfully opened.

As shown in FIG. 34, a mounting bracket 558 is provided that mounts an envelope insertion guide 560 having the general configuration shown in FIG. 36. In this embodiment, envelope insertion guide 560 comprises a first guide section 562 spaced from a second guide section 564. First guide section 562 includes a tapered edge 562*a* that facilitates the insertion of first guide section 562 into the left side of the envelope flap. Similarly, second guide section 564 includes a tapered edge 564*a* that facilitates the insertion of the second guide section 564 into the right side of the envelope flap. It should be understood that other guide configurations may also be used in accordance with the present invention. Mounting bracket 558 is configured to move toward the envelope and position envelope insertion guide 560 above the envelope flap just above the fold line. The spacing between first guide section 562 and second guide section 564 is then adjusted based on the length of the envelope. For example, the spacing may be increased to accommodate larger size envelopes.

As shown in FIGS. 34 and 35, pneumatic suction cups 566 are activated to open the back of the envelope to a sufficient height to enable receipt of the greeting card within the envelope. In this embodiment, a greeting card insertion mechanism (e.g., a card pusher) is configured to move the greeting card traveling on indexing conveyor 520 over to indexing conveyor 540 (i.e., transverse to the direction of card travel) for insertion under envelope insertion guide 560 into the envelope. The greeting card is preferably oriented in the same plane as the envelope to facilitate the insertion process. In some embodiments, additional items may also be inserted into the envelope, such as a gift card, an insert page, and the like. It should be understood that the components used to insert the greeting card into its corresponding envelope are controlled by control system 200 based on the dimensions of the greeting card and envelope contained in the order data.

Of course, it should be understood that other type of components may be used to automatically insert each greeting card into its corresponding envelope within the scope of the present invention.

Envelope Sealing Zone

With reference to FIG. 2, conveyor system 202 includes various components located within envelope sealing zone 222 that enable each envelope (with the greeting card inserted therein) to be automatically sealed during transport along its conveyance path. In some embodiments, the envelope includes a pointed envelope flap having a shape that is generally triangular. In other embodiments, the envelope includes a straight envelope flap or any other type of envelope flap known in the art.

Figure 37:
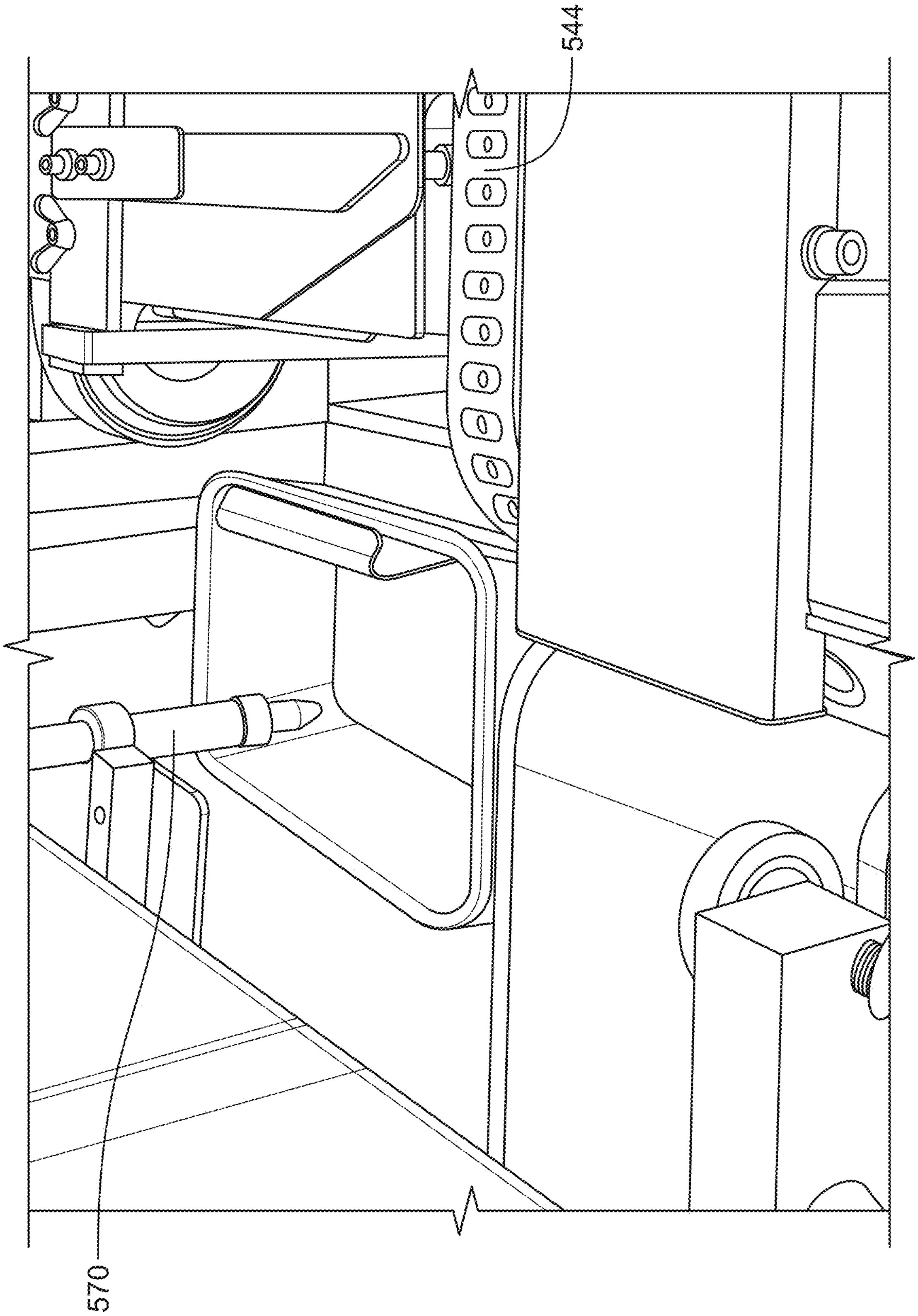
FIG. 37 depicts a top-front perspective view of the envelope line within an exemplary envelope sealing zone of the conveyor system of FIG. 2.

FIG. 37 depicts one exemplary embodiment of the various components located within envelope sealing zone 222 of conveyor system 202. It should be understood that the components used to seal the envelope are controlled by control system 200 based on the size of the envelope. In this embodiment, the components are configured to seal envelopes that include a pointed envelope flap, such as envelope 302 shown in FIGS. 3A-3E. As best shown in FIG. 3A, envelope 302 includes a first adhesive strip 358 positioned along first side 352 of envelope flap 334 and a second adhesive strip 360 positioned along second side 354 of envelope flap 334. Each of first and second adhesive strips 358 and 360 is made of a water-soluble adhesive material, as known in the art. Of course, the length and position of the adhesive strips will vary between different envelopes of varying sizes.

As shown in FIG. 37, a wetting mechanism is provided to wet the first and second adhesive strips on the pointed envelope flap of each envelope. In this embodiment, the wetting mechanism comprises an envelope mister 570 configured to apply moisture as it travels perpendicular to the direction of indexing conveyor 540. For example, with reference to envelope 302 shown in FIG. 3A, envelope mister 570 moves away from indexing conveyor 540 as envelope 302 continues to travel on indexing conveyor 540 so as to apply moisture from point 358*a* to point 358*b* along first adhesive strip 358. Then, envelope mister 570 reverses direction and moves back toward indexing conveyor 540 as envelope 302 continues to travel on indexing conveyor 540 so as to apply moisture from point 360*a* to point 360*b* along second adhesive strip 360.

It should be understood that the rate of travel of envelope mister 570 will vary depending on the slope of the sides of the envelope flap (e.g., first side 352 and second side 354 of envelope 302 shown in FIG. 3A). This slope can be calculated based on the length of the fold line of the envelope flap (e.g., the length of fold line 350 shown in FIG. 3A) and the distance from the fold line to the point of the envelope flap (e.g., the distance from the center point of fold line 350 to point 356 in FIG. 3A), as known to one skilled in the art. In this embodiment, the length of the fold line of the envelope flap is determined from the dimensions of the envelope contained in the order data (and confirmed through sensor measurements obtained along envelope line 206). The distance from the fold line to the point of the envelope flap is determined from sensor data collected by two linear sensor arrays positioned above and below the envelope flap, wherein the envelope flap breaks the beam between the two sensor arrays as the envelope flap moves between them. This enables the sensor arrays to detect the distance from the fold line to various points on the side edges of the envelope flap (e.g., first and second sides 352 and 354 of envelope flap 334 shown n FIG. 3A), wherein the longest distance will be the distance from the fold line to the point of the envelope flap. Control system 200 is able to dynamically calculate the travel path for envelope mister 570 based on these distances and then control envelope mister 570 during travel along the travel path.

Once the first and second adhesive strips on the pointed envelope flap have been wetted, a closing mechanism (not shown) is configured to close the envelope flap so that the moistened water-soluble adhesive material contacts the back of the envelope to thereby secure the envelope flap and seal the greeting card within the envelope. Then, a seal applicator (not shown) is configured to place a seal on the point of the envelope flap (e.g., seal 360 shown in FIG. 3D). It should be understood that control system 200 is able to dynamically calculate the location of the point of the envelope flap based on the same distances used to calculate slope, i.e., the length of the fold line of the envelope flap and the distance from the fold line to the point of the envelope flap.

Finally, the sealed envelope is deposited into a mail bin or other storage container 224 for mailing. In some embodiments, a diverter may be used to divert certain envelopes into one or more separate bins for further processing, such as envelopes that require additional postage (if the additional postage is not applied to the envelope within print zone 214), envelopes that are to be mailed via expedited shipping, envelopes containing a greeting card in which an order record (print job) was not located, or envelopes that are to be held for a determined time period prior to shipping.

Of course, it should be understood that other type of components may be used to automatically seal each customized envelope within the scope of the present invention.

Control System

With reference to FIG. 2, control system 200 is configured to control the operation of conveyor system 202, as described below. In this embodiment, control system 200 includes a computing device connected to a programmable logic controller (PLC). The computing device may comprise a server, a personal computer or any other computing device that is capable of communication (wired or wireless) with server system 110 via communications network 130. The PLC may comprise any process controller adapted for controlling the various components of conveyor system 202, such as the Allen-Bradley Compact GuardLogix® 5380 controller available from Rockwell Automation, Inc. of Milwaukee, Wisconsin.

In general, control system 200 is configured to retrieve order data, as well as card and envelope print files, from server system 110. Control system 200 is also configured to report order status information to server system 100, as described below. Control system 200 is further configured to transmit print information to one or more printers located in print zone 214 of conveyor system 202, as well as communicate (through the PLC) with various components of conveyor system 202. These components may include, for example, a scanning device, one or more printers, a stamp applicator, one or more UV units, a seal applicator, an envelope mister, photo sensors, encoders, air jet systems, vacuum pumps, servo motors and drives, conveyor motors and drives, and any other controlled components within conveyor system 202. Control system 200 is also configured to communicate with the imaging devices located within validation zone 216 of conveyor system 202, as described above.

The functionality of the control software implemented by control system 200 will now be described in connection with the flow chart shown in FIGS. 38A-38C. These steps will be described with respect to a single pre-decorated greeting card and its corresponding envelope during transport along their respective conveyance paths. It should be understood that control system 200 will perform these steps for each greeting card/envelope pair in a mass print run and will provide the required timing and synchronization functions to enable high-speed customization of individual pre-decorated greeting cards and their corresponding envelopes.

Figure 38A:
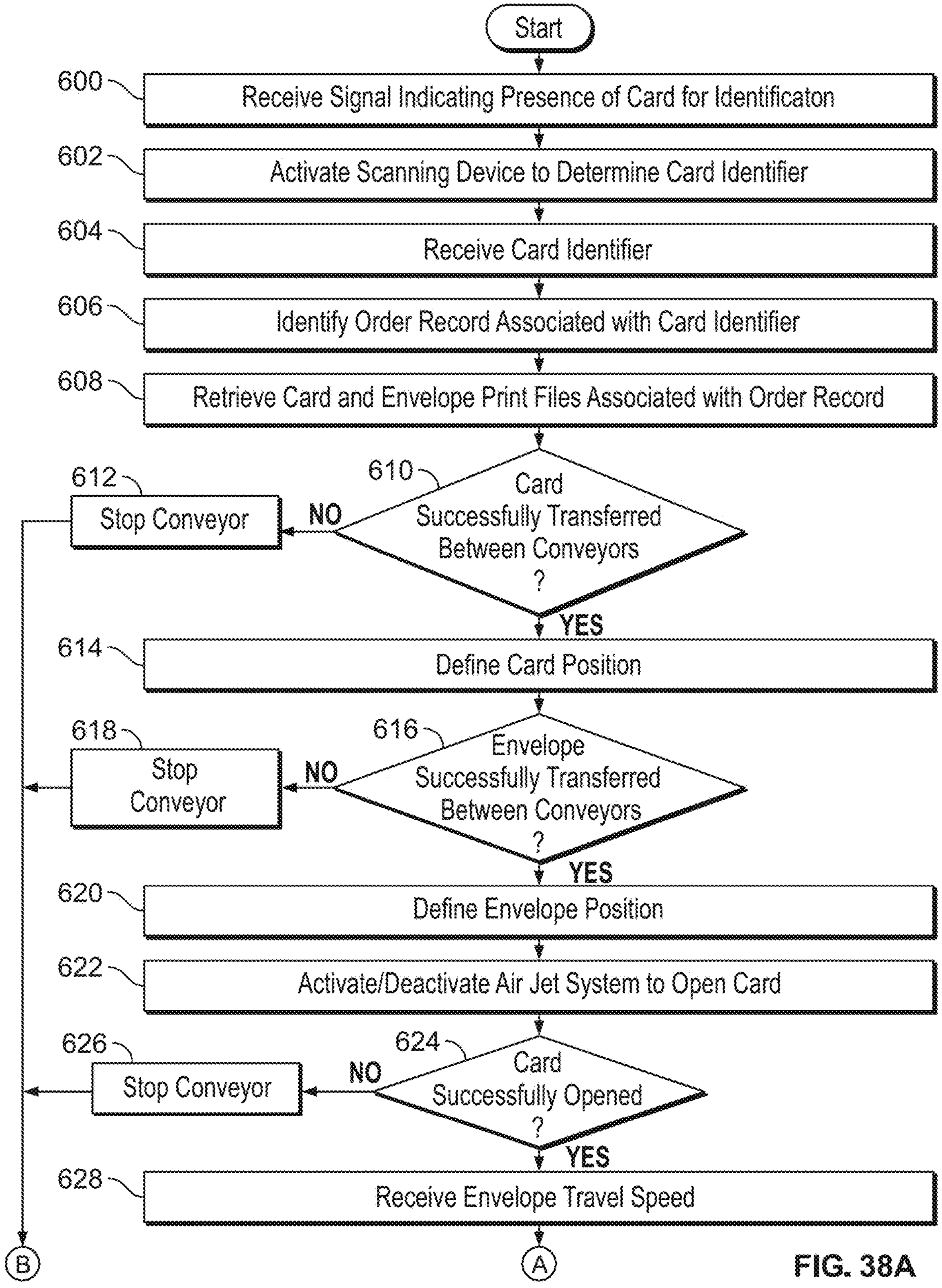
FIGS. 38A-38C are process flow diagrams showing one embodiment of a process for controlling the conveyor system of FIG. 2.

Referring to FIG. 38A, in step 600, control system 200 receives one or more signals from a photo sensor located on card line 204 within card identification zone 210 to identify the presence of the greeting card. In one embodiment, the photo sensor generates signals upon detection of the leading and trailing edges of the greeting card. In step 602, in response to receipt of the leading edge signal, control system 200 transmits an activation signal to a reading device mounted proximate the path of card travel that is operative to read the greeting card to determine the card identifier. In one embodiment, the card identifier comprises the UPC of the greeting card. In step 604, control system 200 receives the card identifier (or information from which the card identifier may be derived) from the reading device.

In step 606, control system 200 identifies an order record for a pre-decorated greeting card associated with the card identifier. In one embodiment, control system 200 communicates with server system 110 via communications network 130 to retrieve an order record containing a UPC that matches the UPC received from the reading device. If there are two or more order records containing the same UPC (i.e., multiple orders for the same pre-decorated greeting card), control system 200 retrieves the oldest order record or, alternatively, an order record associated with a request for expedited fulfillment.

In step 608, control system 200 retrieves the card and envelope print files that are associated with the identified order record. In one embodiment, control system 200 identifies the file names contained in the order record, and communicates with server system 110 via communications network 130 to retrieve the card and envelope print files having the identified file names.

In step 610, control system 200 determines whether the greeting card was successfully transferred from card identification zone 210 to card opening zone 212. In one embodiment, control system 200 makes this determination based on the leading and trailing edge signals received from the photo sensor described above. In step 612, if the signals indicate that the greeting card was not successfully transferred (e.g., if the leading edge signal is received but not the trailing edge signal), it is assumed that the greeting card has jammed and the card conveyor is stopped to enable the jam to be cleared. Control system 200 may also transmit an error indicator to server system 110 so that the status of the order may be updated in order database 112. In step 614, if the signals indicate that the greeting card was successfully transferred (e.g., if both the leading and trailing edge signals are received), control system 200 uses one of the signals (e.g., the trailing edge signal) to define the position of the greeting card on card line 204 as it passes from card identification zone 210 to card opening zone 212.

Similarly, in step 616, control system 200 determines whether the envelope was successfully transferred from card identification zone 210 to card opening zone 212. In one embodiment, control system 200 makes this determination based on one or more signals received from a photo sensor located on envelope line 206 within card identification zone 210 in response to detection of the leading and trailing edges of the envelope. In step 618, if the signals indicate that the envelope was not successfully transferred (e.g., if the leading edge signal is received but not the trailing edge signal), it is assumed that the envelope has jammed and the envelope conveyor is stopped to enable the jam to be cleared. Control system 200 may also transmit an error indicator to server system 110 so that the status of the order may be updated in order database 112. In step 620, if the signals indicate that the envelope was successfully transferred (e.g., if both the leading and trailing edge signals are received), control system 200 uses one of the signals (e.g., the leading edge signal) to define the position of the envelope on envelope line 206 as it passes from card identification zone 210 to card opening zone 212.

In step 622, control system 200 activates and deactivates an air jet system that is operative to open the greeting card on card line 204 within card opening zone 212. Control system 200 determines when to activate and deactivate the air jet system based on the position of the greeting card determined in step 614, the length of the greeting card (which is contained in the order record), and the conveyor speed within card opening zone 212.

In step 624, control system 200 determines whether the greeting card was successfully opened. In one embodiment, control system 200 makes this determination based on one or more signals received from a photo sensor located on card line 204 within card opening zone 212. The photo sensor is operative to emit a beam of light toward a reflective backer (which reflects the light back to the photo sensor) and transmit one or more signals to control system 200 indicating whether the reflected light was detected. In step 626, if the signals indicate that the greeting card was not successfully opened, it is assumed that the greeting card has jammed and the card conveyor is stopped to enable the jam to be cleared. Control system 200 may also transmit an error indicator to server system 110 so that the status of the order may be updated in order database 112. Otherwise, the process proceeds to step 628.

In step 628, control system 200 receives the travel speed of the envelope from an encoder riding on the envelope conveyor and, similarly, a validation module within control system 200 receives the travel speed of the envelope from another encoder riding on the print conveyor. In step 630, control system 200 receives the travel speed of the greeting card from an encoder riding on the print conveyor and, similarly, a validation module within control system 200 receives the travel speed of the greeting card from another encoder riding on the print conveyor.

In step 632, control system 200 receives one or more signals from a photo sensor positioned upstream of the printer on envelope line 206 within print zone 214 to identify the presence of the envelope. In one embodiment, the photo sensor generates signals in response to detection of the leading and trailing edges of the envelope, and control system 200 detects the presence of the envelope based on the leading edge signal. In step 634, in response to receipt of the leading edge signal, control system 200 translates the envelope print file received in step 608 to a raster image and transmits the raster image to a printer positioned proximate the path of envelope travel. The raster image may include, for example, customized envelope content, a machine-readable validation mark, and/or postage indicia, as described above.

In step 638, control system 200 determines whether the envelope is ready for printing. In one embodiment, control system 200 makes this determination based on the leading and trailing edge signals received from the photo sensor described above. Control system 200 may also use the leading and trailing edge signals along with the envelope travel speed to measure the length of each envelope and compare it to the envelope length defined in the order record. In step 640, if the signals indicate that the envelope is not ready for printing, the envelope conveyor is stopped to enable an operator to determine the cause of the problem. Control system 200 may also transmit an error indicator to server system 110 so that the status of the order may be updated in order database 112. In step 642, if the signals indicate that the envelope is ready for printing, control system 200 transmits an activation signal to the printer that is operative to print the raster image on the envelope. The activation signal may include certain printing instructions, such as the rate at which the printer needs to apply ink. In step 644, control system 200 uses one of the signals (e.g., the leading edge signal) to define the position of the envelope on envelope line 206 as it passes under the printer.

In step 646, control system 200 activates and deactivates one or more UV units positioned downstream of the printer on envelope line 206 within print zone 214. These UV units are operative to dry, cure, and/or finish the ink applied by the printer in order to prevent smearing. Control system 200 activates and deactivates the UV units based on the position of the envelope determined in step 644 and the length of the envelope (which is contained in the order record).

Similarly, in step 648, control system 200 receives one or more signals from a photo sensor positioned upstream of the printer on card line 204 within print zone 214 to identify the presence of the greeting card. In one embodiment, the photo sensor generates signals in response to detection of the leading and trailing edges of the greeting card, and control system 200 detects the presence of the envelope based on the trailing edge signal. In step 650, in response to receipt of the trailing edge signal, control system 200 translates the card print file received in step 608 to a raster image and transmits the raster image to a printer positioned proximate the path of card travel. The raster image may include, for example, customized card content and a machine-readable validation mark, as described above.

In step 654, control system 200 determines whether the greeting card is ready for printing. In one embodiment, control system 200 makes this determination based on the leading and trailing edge signals received from the photo sensor described above. Control system 200 may also use the leading and trailing edge signals along with the card travel speed to measure the length of each greeting card and compare it to the card length defined in the order record. In step 656, if the signals indicate that the greeting card is not ready for printing, the card conveyor is stopped to enable an operator to determine the cause of the problem. Control system 200 may also transmit an error indicator to server system 110 so that the status of the order may be updated in order database 112. In step 658, if the signals indicate that the greeting card is ready for printing, control system 200 transmits an activation signal to the printer that is operative to print the raster image on the greeting card. The activation signal may include certain printing instructions, such as the rate at which the printer needs to apply ink. In step 660, control system 200 uses one of the signals (e.g., the trailing edge signal) to define the position of the card on card line 204 as it passes under the printer.

In step 662, control system 200 activates and deactivates one or more UV units positioned downstream of the printer on card line 204 within print zone 214. These UV units are operative to dry, cure, and/or finish the ink applied by the printer in order to prevent smearing. Control system 200 activates and deactivates the UV units based on the position of the greeting card determined in step 660 and the length of the greeting card (which is contained in the order record).

In step 664, control system 200 receives one or more signals from a photo sensor positioned upstream of the stamp applicator on envelope line 206 within print zone 214 to identify the presence of the envelope. In one embodiment, the photo sensor generates signals in response to detection of the leading and trailing edges of the envelope, and control system 200 detects the presence of the envelope based on the trailing edge signal. In step 666, control system 200 transmits an activation signal to the stamp applicator that is operative to apply one or more stamps to the top right corner of the envelope. Of course, it should be understood that steps 660 and 662 would not be required if the postage indicia were printed on the envelope in step 642.

In step 668, control system 200 adjusts the speeds of the card and/or envelope conveyors to align the positions of the card and its corresponding envelope. In one embodiment, control system 200 makes this adjustment based on the positions of the greeting card and envelope determined in steps 660 and 644, respectively.

In step 670, a validation module within control system 200 receives one or more images from one or more imaging devices located in validation zone 216. The validation module analyzes the images to: validate that each greeting card has been correctly paired with its corresponding envelope; validate that the correct customized content has been printed on each greeting card/envelope pair; validate that postage indicia has been correctly applied to each customized envelope; and/or check the print quality of the customized card and envelope content printed on each greeting card and envelope, respectively. Control system 200 may optionally provide the validation information to server system 110 for storage in order database 112 along with the other order data.

In step 672, control system 200 activates and deactivates an air jet system that is operative to close the greeting card on card line 204 within card closing zone 218. Control system 200 determines when to activate and deactivate the air jet system based on the position of the greeting card determined in step 660, the length of the greeting card (which is contained in the order record), and the conveyor speed within card closing zone 218.

In step 674, control system 200 receives one or more signals from a photo sensor located on card line 204 within card closing zone 218 to determine whether the greeting card is ready for insertion into its corresponding envelope. In one embodiment, the photo sensor generates signals in response to detection of the leading and trailing edges of the greeting card, and control system 200 makes this determination based on the leading and trailing edge signals. In step 676, if the signals indicate that the greeting card is not ready for insertion, the card conveyor is stopped to enable an operator to determine the cause of the problem. Control system 200 may also transmit an error indicator to server system 110 so that the status of the order may be updated in order database 112.

In step 678, control system 200 activates the components to manipulate the envelope to a position that is ready for card insertion. In step 680, control system 200 receives one or more signals from a photo sensor located on envelope line 204 within card and envelope coupling zone 220 to determine whether the envelope is ready for insertion of the greeting card. In one embodiment, the photo sensor generates signals in response to detection of the envelope flap in an opened state. In step 682, if the signals indicate that the envelope is not ready for insertion, the envelope conveyor is stopped to enable an operator to determine the cause of the problem. Control system 200 may also transmit an error indicator to server system 110 so that the status of the order may be updated in order database 112.

In step 684, control system 200 controls the components used to insert the customized greeting card into its corresponding envelope based on the sizes of the greeting card and envelope contained in the order data. In step 686, control system 200 controls the components used to seal the envelope. Finally, in step 688, control system 200 communicates with server system 110 via communications network 130 so that the status of the order in order database 112 is updated to indicate that the order has been fulfilled.

Figure 38B:
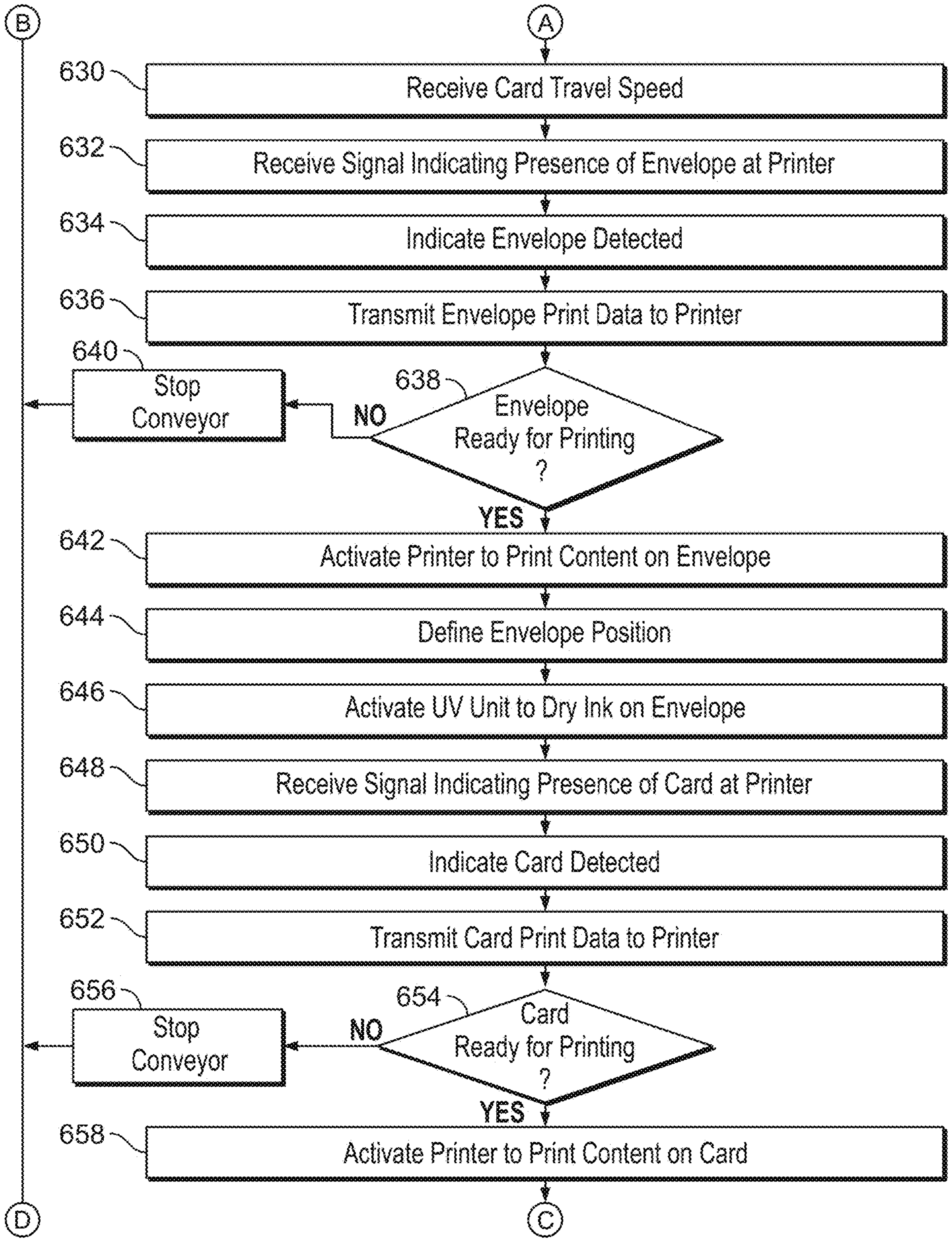
Figure 38C:
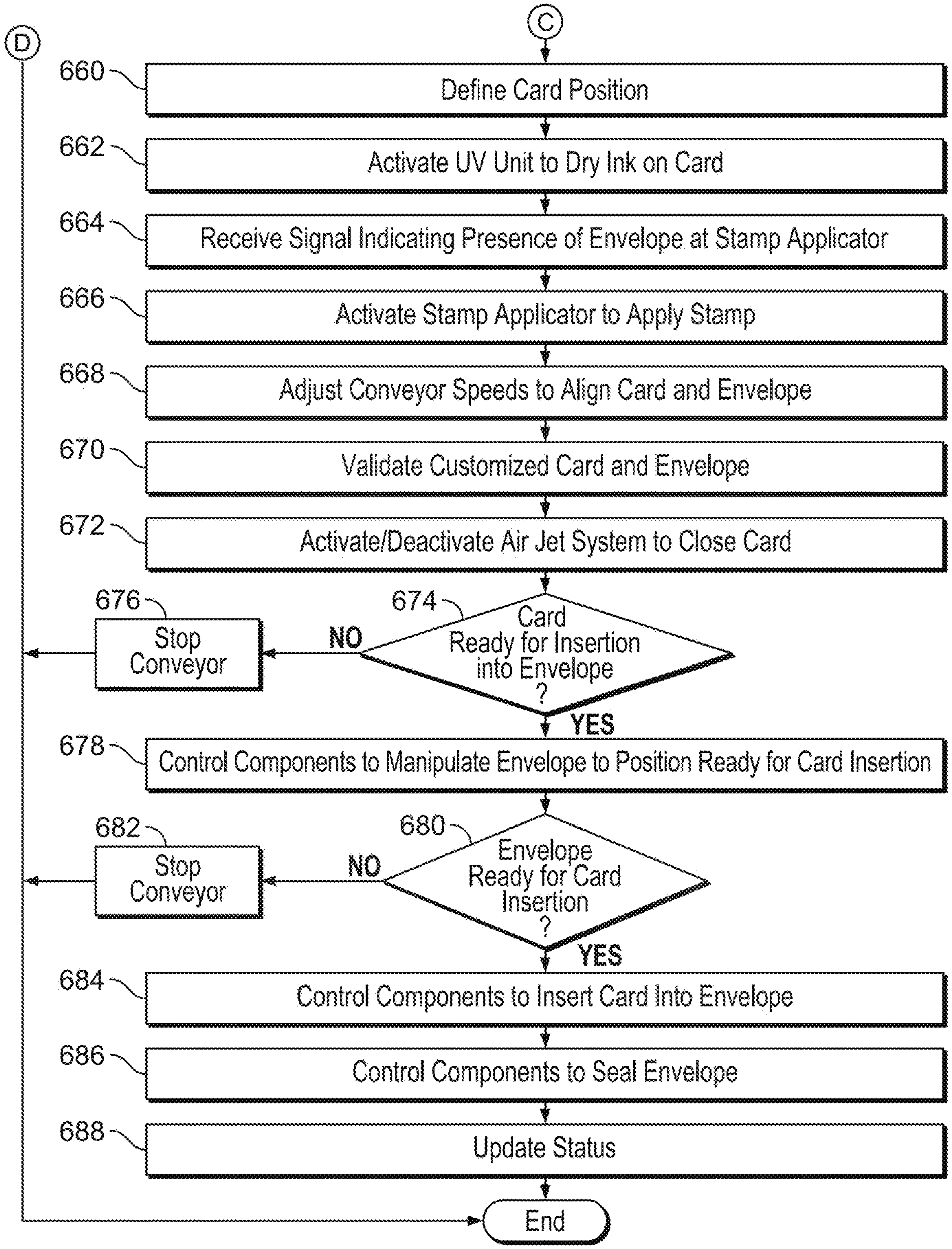

It should be understood that the steps shown in FIGS. 38A-38C and the order in which those steps are performed are not intended to be limiting, and that other process control steps may be implemented within the scope of the present invention. It should also be understood that some of the steps shown in FIGS. 38A-38C may be performed simultaneously, e.g., control system 200 may perform certain operations in relation to card line 204 at the same time that it performs certain operations in relation to envelope line 206. Thus, one skilled in the art will appreciate that a number of different combinations of process control steps may be used to control conveyor system 202.

The system and method of the present invention provides several advantages over prior printing systems that are used to print customized content on greeting cards, such as print-on-demand systems and bulk order printing systems.

For example, the exemplary embodiments described herein enable a consumer to access a website to select a pre-decorated greeting card from an inventory of pre-decorated greeting cards (e.g., the same pre-decorated greeting cards that are available for purchase at retail locations, including those with decorative features secured to the front panel), and input customized content for printing on the selected greeting card and its corresponding envelope. Thus, the system enables customization of individual greeting cards and is not limited to the printing of the same customized content on cardstock blanks to generate a plurality of the same greeting card, as is the case with bulk order printing systems.

Also, the exemplary embodiments described herein include an automated greeting card conveyance system that does not need to be "made ready" for a mass print run of different greeting card/envelope pairs. Because the system registers against the spines of the greeting cards and the top edges of the envelopes, as described above, the system is able to process greeting card/envelope pairs having different sizes and design formats. Also, the system does not assign an order record (i.e., print job) to a greeting card/envelope pair until the UPC is read from the card's barcode and an appropriate order record is identified in the order database—i.e., the order data is not pre-loaded in a specific sequence. Thus, the greeting card/envelope pairs can be loaded on the conveyors in any order and do not need to follow a pre-subscribed sequence. In addition, the printer(s) are able to print customized content on greeting card/envelope pairs in which the customization areas have different sizes and locations on the customization panels, and any decorative features on the front panels of the cards do not interfere with the printing process. Thus, the "zero make ready" system described herein enables the automated customization of multiple greeting card/envelope pairs in a mass print run, which is not possible with print-on-demand systems that are used to print customized content on a single greeting card.

General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the invention and does not pose a limitation on the scope of the invention. No language in the description should be construed as indicating any non-claimed element essential to the practice of the invention.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

Finally, while the present invention has been described and illustrated hereinabove with reference to various exemplary embodiments, it should be understood that various modifications could be made to these embodiments without departing from the scope of the invention. Therefore, the present invention is not to be limited to the specific structural configurations or methodologies of the exemplary embodiments, except insofar as such limitations are included in the following claims.

What is claimed and desired to be secured by Letters Patent is as follows:

1. An automated greeting card customization system, comprising:

a conveyor configured to transport a series of pre-decorated greeting cards along a conveyance path;

a reading device configured to read at least a portion of each of the greeting cards during transport along the conveyance path;

a printer configured to print content on each of the greeting cards during transport along the conveyance path; and a control system in communication with the reading device and the printer, wherein the control system is configured to control customization of each of the greeting cards by (a) determining a card identifier of the greeting card based on information received from the reading device, (b) identifying customized card content associated with an order for the greeting card having the card identifier, and (c) transmitting information to the printer to cause the customized card content to be printed on the greeting card.

2. The system of claim 1, wherein the greeting cards include a first greeting card having a first set of dimensions and a second greeting card having a second set of dimensions, wherein the first set of dimensions is different from the second set of dimensions.

3. The system of claim 2, wherein each of the greeting cards is automatically manipulated on the conveyor during transport through an infeed zone of the conveyance path so as to align an edge of the greeting card against an alignment rail of the conveyor.

4. The system of claim 1, wherein each of the greeting cards includes a machine-readable identification mark that encodes the card identifier of the greeting card, and wherein the reading device is configured to read the machine-readable identification mark of each of the greeting cards during transport along the conveyance path.

5. The system of claim 1, wherein each of the greeting cards includes pre-printed card content on the greeting card, and wherein the printer is configured to print the customized card content within a customization area of the greeting card.

6. The system of claim 1, wherein the customized card content comprises one of user-provided content or system content.

7. The system of claim 1, wherein one or more of the greeting cards includes a paper insert, wherein the customized card content is printed on the paper insert.

8. The system of claim 1, wherein each of the greeting cards comprises a folded greeting card, and wherein the greeting card is arranged in an open position on the conveyor during transport through a print zone of the conveyance path.

9. The system of claim 8, wherein a front panel of the folded greeting card is not coupled to the conveyor during transport through the print zone of the conveyance path.

10. The system of claim 9, wherein one or more of the greeting cards further includes at least one non-planar decorative feature secured to the front panel of the greeting card.

11. The system of claim 1, wherein each of the greeting cards comprises a folded greeting card, and wherein the system further comprises one or both of (a) a card opening mechanism configured to manipulate each of the greeting cards to an open position during transport through a card opening zone of the conveyance path and (b) a card closing mechanism configured to manipulate each of the greeting cards to a closed position during transport through a card closing zone of the conveyance path.

12. The system of claim 1, further comprising:

a second conveyor configured to transport a series of envelopes along a second conveyance path, wherein each of the envelopes corresponds to one of the greeting cards;

a second printer configured to print content on each of the envelopes during transport along the second conveyance path; and wherein the control system is configured to control customization of each of the envelopes by (a) identifying customized envelope content associated with the order for the greeting card corresponding to the envelope and (b) transmitting information to the second printer to cause the customized envelope content to be printed on the envelope.

13. The system of claim 12, wherein the envelopes include a first envelope having a first set of dimensions and a second envelope having a second set of dimensions, wherein the first set of dimensions is different from the second set of dimensions.

14. The system of claim 13, wherein each of the envelopes is automatically manipulated on the second conveyor during transport through an infeed zone of the second conveyance path so as to align an edge of the envelope against an alignment rail of the second conveyor.

15. The system of claim 12, further comprising a postage applicator configured to apply a postage indicia to each of the envelopes during transport along the second conveyance path.

16. The system of claim 15, wherein the postage applicator comprises one of a stamp applicator or the second printer.

17. An automated process for printing customized content on a customization panel of a product, comprising:

transporting a series of products along a conveyance path, wherein each of the products includes a printable customization panel; and controlling customization of each of the products during transport along the conveyance path by (a) reading at least a portion of the product to determine a product code; (b) identifying customized content associated with an order for the product having the product code, and (c) printing the customized content on the customization panel.

18. The automated process of claim 17, further comprising loading the products in any order for transport along the conveyance path.

19. The automated process of claim 17, wherein the products include a first greeting card having a first set of dimensions and a second greeting card having a second set of dimensions, wherein the first set of dimensions is different from the second set of dimensions.

20. The automated process of claim 17, wherein each of the products includes a machine-readable identification mark that encodes the product code, and wherein the reading step comprises reading the machine-readable identification mark of the product to determine the product code.

21. The automated process of claim 17, wherein each of the products comprises a greeting card with pre-printed card content, and wherein the customized content is printed within a customization area of the greeting card.

22. The automated process of claim 17, wherein the customized content comprises one of user-provided content or system content.

23. The automated process of claim 17, wherein each of the products comprises a folded greeting card, and wherein the automated process further comprises one or both of (a) prior to the printing step, manipulating the greeting card to an open position and (b) after the printing step, manipulating the greeting card to a closed position.

24. The automated process of claim 17, wherein the products comprise a plurality of greeting cards, the process further comprising:

transporting a series of envelopes along a second conveyance path, wherein each of the envelopes corresponds to one of the greeting cards; and controlling customization of each of the envelopes during transport along the second conveyance path by (a) identifying customized envelope content associated with the order for the greeting card corresponding to the envelope and (b) printing the customized envelope content on the envelope.

25. The automated process of claim 24, wherein the envelopes include a first envelope having a first set of dimensions and a second envelope having a second set of dimensions, wherein the first set of dimensions is different from the second set of dimensions.

26. The automated process of claim 24, wherein controlling customization of each of the envelopes during transport along the second conveyance path further comprises applying a postage indicia to the envelope.

27. A non-transitory computer readable medium storing instructions that, when executed by a processor of a computing device, cause the processor to perform a plurality of operations comprising:

determining an identifier of a greeting card/envelope pair during transport along a conveyance path, wherein the greeting card/envelope pair comprises a greeting card and an associated envelope;

accessing an order database to identify an order record that contains the identifier;

identifying a print file associated with the order record; and using the print file to cause customized content to be printed on the greeting card/envelope pair during transport along the conveyance path.

28. The non-transitory computer readable medium of claim 27, wherein the conveyance path comprises a first conveyance path for transporting the greeting card and a second conveyance path for transporting the envelope, and wherein the customized content comprises one or both of (a) customized card content that is printed on the greeting card during transport along the first conveyance path and (b) customized envelope content that is printed on the envelope during transport along the second conveyance path.

29. The non-transitory computer readable medium of claim 28, wherein the operations further comprise causing a postage indicia to be applied to the envelope during transport along the second conveyance path.

30. The non-transitory computer readable medium of claim 29, wherein the postage indicia includes a unique postage code, and wherein the order record contains the unique postage code.

* * * * *